US012732603B2

(12) United States Patent
Moon et al.

(10) Patent No.: US 12,732,603 B2
(45) Date of Patent: Sep. 8, 2026

(54) METHOD AND APPARATUS FOR IMAGE ENCODING/DECODING

(71) Applicant: Industry Academy Cooperation Foundation of Sejong University, Seoul (KR)

(72) Inventors: Joo Hee Moon, Seoul (KR); Dong Jae Won, Seoul (KR); Jae Min Ha, Incheon (KR)

(73) Assignee: Industry Academy Cooperation Foundation of Sejong University, Seoul (KR)

(*) Notice: Subject to any disclaimer, the term of this patent is extended or adjusted under 35 U.S.C. 154(b) by 0 days.

(21) Appl. No.: 18/813,221

(22) Filed: Aug. 23, 2024

(65) Prior Publication Data

US 2024/0414326 A1 Dec. 12, 2024

Related U.S. Application Data

(62) Division of application No. 17/420,784, filed as application No. PCT/KR2020/000211 on Jan. 6, 2020, now abandoned.

(30) Foreign Application Priority Data

Jan. 4, 2019 (KR) ........................ 10-2019-0001414
Jan. 4, 2019 (KR) ........................ 10-2019-0001416
(Continued)

(51) Int. Cl.
*H04N 7/12* (2006.01)
*H04N 19/105* (2014.01)
(Continued)

(52) U.S. Cl.
CPC ......... *H04N 19/105* (2014.11); *H04N 19/137* (2014.11); *H04N 19/159* (2014.11); *H04N 19/176* (2014.11)

(58) Field of Classification Search
CPC .. H04N 19/105; H04N 19/137; H04N 19/159; H04N 19/176; H04N 19/52
See application file for complete search history.

(56) References Cited

U.S. PATENT DOCUMENTS 10,298,951 B2 * 5/2019 Chiu ...................... H04N 19/52
10,582,209 B2 * 3/2020 Chen .................... H04N 19/119
(Continued)

FOREIGN PATENT DOCUMENTS

CN 103931173 A 7/2014
CN 104041043 A 9/2014
(Continued)

OTHER PUBLICATIONS

Hashimoto, Tomonori. "CE4: Enhanced Merge with MVD (Test 4.4. 4)." Joint Video Experts Team (JVET) of ITU-T SG 16 WP 3 and ISO/IEC JTC 1/SC 29/WG 11, 13th meeting, Jan. 9-18, 2019, JVET-M0060-WD. (pp. 1-17).
(Continued)

*Primary Examiner* — Gims S Philippe
(74) *Attorney, Agent, or Firm* — NSIP Law

(57) ABSTRACT

A method and an apparatus for image encoding/decoding, according to the present invention, may generate a candidate list of a current block and perform inter-prediction of the current block by using any one of a plurality of candidates belonging to the candidate list. Here, the plurality of candidates comprise at least one from among a spatial candidate, a temporal candidate, and a restoration information-based candidate, and the restoration information-based
(Continued)

candidate may be added from a buffer which stores motion information decoded prior to the current block.

5 Claims, 38 Drawing Sheets

(30) Foreign Application Priority Data

| | | |
|---|---|---|
| Jan. 7, 2019 | (KR) | 10-2019-0001730 |
| Jan. 6, 2020 | (KR) | 10-2020-0001228 |
| Jan. 6, 2020 | (KR) | 10-2020-0001229 |
| Jan. 6, 2020 | (KR) | 10-2020-0001230 |
| Jan. 6, 2020 | (KR) | 10-2020-0001231 |

(51) Int. Cl.

| | |
|---|---|
| ***H04N 19/137*** | (2014.01) |
| ***H04N 19/159*** | (2014.01) |
| ***H04N 19/176*** | (2014.01) |

(56) References Cited

U.S. PATENT DOCUMENTS

| | | | | |
|---|---|---|---|---|
| 10,812,791 | B2 * | 10/2020 | Chien | H04N 19/105 |
| 11,381,807 | B2 * | 7/2022 | Yu | H04N 19/159 |
| 2013/0114717 | A1 | 5/2013 | Zheng et al. | |
| 2013/0272412 | A1 | 10/2013 | Seregin et al. | |
| 2013/0294513 | A1 | 11/2013 | Seregin et al. | |
| 2014/0341284 | A1 | 11/2014 | Kim et al. | |
| 2016/0295240 | A1 | 10/2016 | Kim et al. | |
| 2019/0356922 | A1 * | 11/2019 | Park | H04N 19/109 |
| 2020/0059658 | A1 | 2/2020 | Chien et al. | |
| 2020/0169745 | A1 | 5/2020 | Han et al. | |
| 2020/0186794 | A1 * | 6/2020 | Chao | H04N 19/105 |
| 2020/0267408 | A1 * | 8/2020 | Lee | H04N 19/521 |
| 2021/0185311 | A1 | 6/2021 | Fukushima et al. | |
| 2021/0266560 | A1 * | 8/2021 | Jang | H04N 19/46 |
| 2021/0314560 | A1 | 10/2021 | Lai et al. | |

FOREIGN PATENT DOCUMENTS

| | | | |
|---|---|---|---|
| CN | 104170387 | A | 11/2014 |
| CN | 104685883 | A | 6/2015 |
| CN | 107211156 | A | 9/2017 |
| JP | 2013-098745 | A | 5/2013 |
| JP | 2013-118625 | A | 6/2013 |
| JP | 2017-85608 | A | 5/2017 |
| KR | 10-1197176 | B1 | 11/2012 |
| KR | 10-2013-0067280 | A | 6/2013 |
| KR | 10-2016-0132893 | A | 11/2016 |
| KR | 10-2017-0059423 | A | 5/2017 |
| KR | 10-2018-0000303 | A | 1/2018 |
| KR | 10-2018-0063094 | A | 6/2018 |
| WO | WO 2017/043734 | A1 | 3/2017 |
| WO | WO 2017/058633 | A1 | 4/2017 |

OTHER PUBLICATIONS

Korean Office Action issued on Jun. 9, 2025, in corresponding Korean Patent Application No. 10-2020-0001230. (4pages in Korean).

Korean Office Action issued on Sep. 7, 2025, in corresponding Korean Patent Application No. 10-2020-0001231. (4pages in Korean).

Indian Office Action Issued on Jan. 31, 2025, in Counterpart Indian Patent Application No. 202318048403 (6 Pages in English).

Indian Office Action Issued on Jan. 31, 2025, in Counterpart Indian Patent Application No. 202318048404 (7 Pages in English).

Indian Office Action Issued on Jan. 31, 2025, in Counterpart Indian Patent Application No. 202318048407 (7 Pages in English).

Indian Office Action Issued on Jan. 31, 2025, in Counterpart Indian Patent Application No. 202318048406 (7 Pages in English).

Indian Office Action Issued on Jan. 31, 2025, in Counterpart Indian Patent Application No. 202318048402 (7 Pages in English).

Indian Office Action Issued on Jan. 31, 2025, in Counterpart Indian Patent Application No. 202318048417 (7 Pages in English).

Chinese Office Action Issued on Feb. 14, 2025, in Counterpart Chinese Patent Application No. 202080007897.4 (9 Pages in English, 7 Pages in Chinese).

Indian Office Action Issued on Feb. 17, 2025, in Counterpart Indian Patent Application No. 202318048420 (6 Pages in English).

Indian Office Action Issued on Feb. 17, 2025, in Counterpart Indian Patent Application No. 202318048421 (6 Pages in English).

Bross, et al. "Versatile video coding (draft 5)." JVET-K1001-v7, *Joint Video Experts Team (JVET) of ITU-T SG 16 WP 3 and ISO/IEC JTC 1/SC 29/WG 11 11th Meeting*: Ljubljana, SI, Jul. 10-18, 2018 (141 pages in English).

Zhang, et al. "CE4: History-based Motion Vector Prediction (Test 4.4. 7)." *JVET-L0266-v2, Joint Video Experts Team (JVET) of ITU-T SG 16 WP 3 and ISO/IEC JTC 1/SC 29/WG 11 12th Meeting*: Macao, CN, Oct. 3-12, 2018. (6 pages in English).

Park et al., "CE4-related: History-Based Motion Vector Prediction considering parallel processing" *JVET-L0158 Joint Video Experts Team (JVET) of ITU-T SG 16 WP 3 and ISO/IEC JTC 1/SC 29/WG 11 12th Meeting*: Macau, CN, Oct. 8-12, 2018 (6 pages in English).

Korean Office Action issued on Jan. 13, 2021, in counterpart Korean Patent Application No. 10-2020-0001228 (4 pages in Korean).

Korean Office Action issued on Jan. 14, 2021, in counterpart Korean Patent Application No. 10-2020-0001229 (4 pages in English).

Chinese Office Action Issued on Sep. 27, 2025, in Counterpart Chinese Patent Application No. 202080007897.4 (7 Pages in English, 7 Pages in Chinese).

Cao, Teng-Fei et al., "Half Depths Decision Algorithm for HEVC Coding Units", Computer Systems & Applications, ISSN 1003-3254, Coden Csaobn, 2018, 27(7), Jun. 27, 2018. (pp. 167-172).

Sullivan, Gary J. et al., "JVET Ad hoc group report: Project management", Joint Video Experts Team (JVET) of ITU-T SG 16 WP 3 and ISO/IEC JTC 1/SC 29/WG 11, Document: JVET-L0001-v1, 12th Meeting: Macao, CN, Oct. 3-12, 2018. (pp. 1-3).

Chinese Notice of Allowance issued on Apr. 14, 2026, in counterpart Chinese Patent Application No. 202080007897.4 (4 pages in Chinese, 4 pages in English).

* cited by examiner

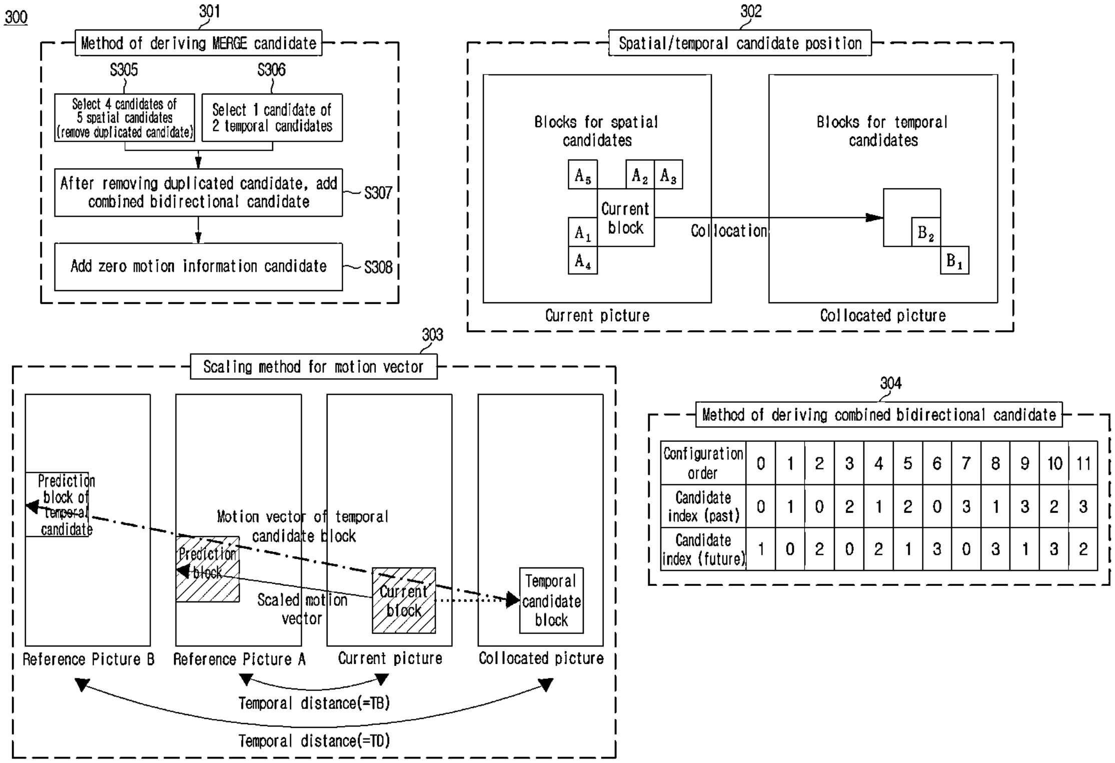

301 Method of deriving MERGE candidate

S305 Select 4 candidates of 5 spatial candidates (remove duplicated candidate)

S306 Select 1 candidate of 2 temporal candidates

S307 After removing duplicated candidate, add combined bidirectional candidate

S308 Add zero motion information candidate

302 Spatial/temporal candidate position

Blocks for spatial candidates $A_5$ $A_2$ $A_3$ Current block $A_1$ $A_4$

Collocation

Blocks for temporal candidates $B_2$ $B_1$

Current picture

Collocated picture

303 Scaling method for motion vector

Prediction block of temporal candidate

Motion vector of temporal candidate block

Prediction block

Scaled motion vector

Current block

Temporal candidate block

Reference Picture B

Reference Picture A

Current picture

Collocated picture

Temporal distance(=TB)

Temporal distance(=TD)

304 Method of deriving combined bidirectional candidate

| Configuration order | 0 | 1 | 2 | 3 | 4 | 5 | 6 | 7 | 8 | 9 | 10 | 11 |
|---|---|---|---|---|---|---|---|---|---|---|---|---|
| Candidate index (past) | 0 | 1 | 0 | 2 | 1 | 2 | 0 | 3 | 1 | 3 | 2 | 3 |
| Candidate index (future) | 1 | 0 | 2 | 0 | 2 | 1 | 3 | 0 | 3 | 1 | 3 | 2 |

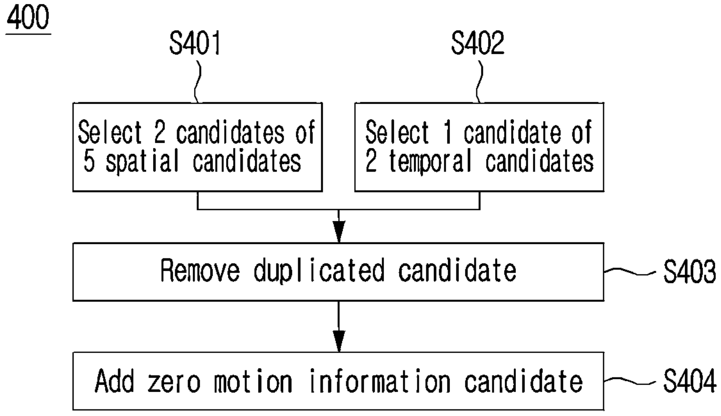

FIG. 4

S401 Select 2 candidates of 5 spatial candidates

S402 Select 1 candidate of 2 temporal candidates

S403 Remove duplicated candidate

S404 Add zero motion information candidate

1500

1600

| Idx | List 0 | List 1 |
|---|---|---|
| 0 | MV:(1,1) Refidx: 1 | MV:(-) Refidx: -1 |
| 1 | MV:(3,-1) Refidx: 0 | MV:(-2,-4) Refidx: 2 |
| 2 | MV:(-) Refidx: -1 | MV:(-) Refidx: -1 |
| 3 | MV:(-) Refidx: -1 | MV:(-) Refidx: -1 |
| 4 | MV:(-) Refidx: -1 | MV:(-) Refidx: -1 |
| 5 | MV:(-) Refidx: -1 | MV:(-) Refidx: -1 |

➡

| Idx | List 0 | List 1 | |
|---|---|---|---|
| 0 | MV:(1,1) Refidx: 1 | MV:(-) Refidx: -1 | |
| 1 | MV:(3,-1) Refidx: 0 | MV:(-2,-4) Refidx: 2 | |
| 2 | MV:(1.5,0) Refidx: 1 | MV:(-2,-4) Refidx: 2 | → Average of No. 0,1 candidates |
| 3 | MV:(1.25,0.5) Refidx: 1 | MV:(-2,-4) Refidx: 2 | → Average of No. 0,2 candidates |
| 4 | MV:(2.25,0.5) Refidx: 0 | MV:(-2,-4) Refidx: 2 | → Average of No. 1,2 candidates |
| 5 | MV:(-) Refidx: -1 | MV:(-) Refidx: -1 | |

1700

| Idx | List 0 | List 1 |
|---|---|---|
| 0 | MV:(1,1) Refidx: 1 | MV:(-) Refidx: -1 |
| 1 | MV:(3,-1) Refidx: 0 | MV:(-2,-4) Refidx: 2 |
| 2 | MV:(1,1) Refidx: 1 | MV:(-) Refidx: -1 |
| 3 | MV:(-) Refidx: -1 | MV:(-) Refidx: -1 |
| 4 | MV:(-) Refidx: -1 | MV:(-) Refidx: -1 |
| 5 | MV:(-) Refidx: -1 | MV:(-) Refidx: -1 |

➡

| Idx | List 0 | List 1 | |
|---|---|---|---|
| 0 | MV:(1,1) Refidx: 1 | MV:(-) Refidx: -1 | |
| 1 | MV:(3,-1) Refidx: 0 | MV:(-2,-4) Refidx: 2 | |
| 2 | MV:(1.5,0) Refidx: 1 | MV:(-2,-4) Refidx: 2 | → Average of No. 0,1 candidates |
| 3 | MV:(1.25,0.5) Refidx: 1 | MV:(-2,-4) Refidx: 2 | → Average of No. 0,2 candidates |
| 4 | MV:(2.25,0.5) Refidx: 0 | MV:(-2,-4) Refidx: 2 | → Average of No. 1,2 candidates |
| 5 | MV:(-) Refidx: -1 | MV:(-) Refidx: -1 | |

| MV Merge/AMVP list | | |
|---|---|---|
| Idx | List 0 | List 1 |
| 0 | MV: (1, 1)<br>MVD: (2, -3)<br>Refidx: 1 | MV: (-)<br>MVD: (-)<br>Refidx: -1 |
| 1 | MV: (3, -1)<br>MVD: (0, 0)<br>Refidx: 0 | MV: (-2, -4)<br>MVD: (-1, -3)<br>Refidx: 2 |
| 2 | MV: (-)<br>MVD: (-)<br>Refidx: -1 | MV: (-)<br>MVD: (-)<br>Refidx: -1 |
| 3 | MV: (-)<br>MVD: (-)<br>Refidx: -1 | MV: (-)<br>MVD: (-)<br>Refidx: -1 |
| 4 | MV: (-)<br>MVD: (-)<br>Refidx: -1 | MV: (-)<br>MVD: (-)<br>Refidx: -1 |
| 5 | MV: (-)<br>MVD: (-)<br>Refidx: -1 | MV: (-)<br>MVD: (-)<br>Refidx: -1 |

| MV Merge/AMVP list | | |
|---|---|---|
| Idx | List 0 | List 1 |
| 0 | MV: (1, 1)<br>MVD: (2, -3)<br>Refidx: 1 | MV: (-)<br>MVD: (-)<br>Refidx: -1 |
| 1 | MV: (3, -1)<br>MVD: (0, 0)<br>Refidx: 0 | MV: (-2, -4)<br>MVD: (-1, -3)<br>Refidx: 2 |
| 2 | MV: (3, -2)<br>MVD: (0, 0)<br>Refidx: 1 | MV: (-)<br>MVD: (-)<br>Refidx: -1 |
| 3 | MV: (3, -1)<br>MVD: (0, 0)<br>Refidx: 0 | MV: (-3, -7)<br>MVD: (0, 0)<br>Refidx: 2 |
| 4 | MV: (-)<br>MVD: (-)<br>Refidx: -1 | MV: (-)<br>MVD: (-)<br>Refidx: -1 |
| 5 | MV: (-)<br>MVD: (-)<br>Refidx: -1 | MV: (-)<br>MVD: (-)<br>Refidx: -1 |

| MV Merge/AMVP list | | |
|---|---|---|
| Idx | List 0 | List 1 |
| 0 | MV: (1, 1)<br>MVD: (2, -3)<br>Refidx: 1 | MV: (-)<br>MVD: (-)<br>Refidx: -1 |
| 1 | MV: (3, -1)<br>MVD: (0, 0)<br>Refidx: 0 | MV: (-2, -4)<br>MVD: (-1, -3)<br>Refidx: 2 |
| 2 | MV: (3, -2)<br>MVD: (0, 0)<br>Refidx: 1 | MV: (-)<br>MVD: (-)<br>Refidx: -1 |
| 3 | MV: (3, -1)<br>MVD: (0, 0)<br>Refidx: 0 | MV: (-3, -7)<br>MVD: (0, 0)<br>Refidx: 2 |
| 4 | MV: (-2, -6)<br>MVD: (1, 2)<br>Refidx: 0 | MV: (3, 2)<br>MVD: (0, 0)<br>Refidx: 1 |
| 5 | MV: (-5, -2)<br>MVD: (2, 3)<br>Refidx: 1 | MV: (-7, -5)<br>MVD: (3, -2)<br>Refidx: 2 |

| MVD Merge/AMVP list | | |
|---|---|---|
| Idx | List 0 | List 1 |
| 0 | MVD: (2, -3) | MVD: (0, 0) |
| 1 | MVD: (0, 0) | MVD: (-1, -3) |
| 2 | MVD: (1, 2) | MVD: (0, 0) |
| 3 | MVD: (2, 3) | MVD: (3, -2) |

| RPS A | | |
|---|---|---|
| Reference picture index | List 0 picture POC | List 1 picture POC |
| 0 | 0 | 0 |
| 1 | 1 | 1 |
| 2 | 2 | 2 |
| 3 | 3 | 4 |
| 4 | 6 | 8 |

| RPS B | | |
|---|---|---|
| Reference picture index | List 0 picture POC | List 1 picture POC |
| 0 | 0 | 0 |
| 1 | 1 | 1 |
| 2 | 2 | 2 |
| 3 | 3 | 3 |
| 4 | 4 | 4 |

| RPS C | | |
|---|---|---|
| Reference picture index | List 0 picture POC | List 1 picture POC |
| 0 | 0 | 0 |
| 1 | 1 | 1 |
| 2 | 2 | 2 |
| 3 | 3 | - |
| 4 | 4 | - |

| RPS D | | |
|---|---|---|
| Reference picture index | List 0 picture POC | List 1 picture POC |
| 0 | 0 | 3 |
| 1 | 1 | 4 |
| 2 | 3 | 1 |
| 3 | 2 | - |
| 4 | 4 | - |

| Binarization method of prediction direction information | | | | |
|---|---|---|---|---|
| Prediction direction | Binarization | | | |
| | First RPS Check = False | | First RPS Check = True | |
| | Bi-pred limit X | Bi-pred limit O | Bi-pred limit X | Bi-pred limit O |
| List 0 | 00 | 0 | 0 | - |
| List 1 | 01 | 1 | - | - |
| Bi | 1 | - | 1 | - |

| Binarization method of reference picture index information | | | | | |
|---|---|---|---|---|---|
| Reference picture index | Binarization | | | | |
| | First RPS Check = True | First RPS Check = False | | | |
| | | Second RPS Check = False | Second RPS Check = True | | |
| | | | Third RPS Check = True | Third RPS Check = False | |
| | | | | RPS common POC | RPS non-common POC |
| 0 | 0 | | | 00 | 10 |
| 1 | 10 | | | 010 | 11 |
| 2 | 110 | | | 011 | - |
| 3 | 1110 | | | - | - |
| 4 | 1111 | | | - | - |

| Context idx | 0 | 1 | 2 | 3 | 4 |
|---|---|---|---|---|---|
| MPS | 60% | 65% | 70% | 80% | 95% |
| LPS | 40% | 35% | 30% | 20% | 5% |

2800

2900

Intra prediction unit of image encoding device

Reconstructed information
Original information

2901
Reference pixel generation unit

2902
Optimal intra prediction mode determination unit

Prediction block

| idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 87 | 82 | 76 | 71 | 69 | 66 | 61 | 59 | 54 | 53 | 41 | 30 | 20 | 10 |
| Prob of 0(%) | 5 | 9 | 13 | 18 | 24 | 29 | 31 | 34 | 39 | 41 | 46 | 47 | 59 | 70 | 80 | 90 |

| idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 87 | 82 | 76 | 71 | 69 | 66 | 61 | 59 | 54 | 53 | 41 | 30 | 20 | 10 |
| Prob of 0(%) | 5 | 9 | 13 | 18 | 24 | 29 | 31 | 34 | 39 | 41 | 46 | 47 | 59 | 70 | 80 | 90 |

| idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 87 | 82 | 76 | 73 | 69 | 66 | 61 | 59 | 54 | 53 | 41 | 30 | 20 | 10 |
| Prob of 0(%) | 5 | 9 | 13 | 18 | 24 | 27 | 31 | 34 | 39 | 41 | 46 | 47 | 59 | 70 | 80 | 90 |

| idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 87 | 82 | 76 | 71 | 69 | 66 | 63 | 59 | 54 | 53 | 41 | 30 | 20 | 10 |
| Prob of 0(%) | 5 | 9 | 13 | 18 | 24 | 29 | 31 | 34 | 37 | 41 | 46 | 47 | 59 | 70 | 80 | 90 |

METHOD AND APPARATUS FOR IMAGE ENCODING/DECODING

CROSS REFERENCE TO RELATED APPLICATIONS

This application is a division of application Ser. No. 17/420,784 filed on Jul. 6, 2021, which is a U.S. National Stage Application of International Application No. PCT/KR2020/000211, filed on Jan. 6, 2020, which claims the benefit under 35 USC 119 (a) and 365 (b) of Korean Patent Application No. 10-2019-0001414 and 10-2019-0001416, filed on Jan. 4, 2019, Korean Patent Application No. 10-2019-0001730, filed Jan. 7, 2019 and Korean Patent Application No. 10-2020-0001228, 10-2020-0001230, 10-2020-0001231 and 10-2020-0001229, all filed on Jan. 6, 2020 in the Korean Intellectual Property Office, the entire disclosure of which is incorporated herein by reference for all purposes.

TECHNICAL FIELD

The present disclosure relates to an image encoding/decoding method and device.

BACKGROUND ART

Recently, a demand for multimedia data such as a video has rapidly increased on the Internet. But, a speed at which bandwidth of a channel has developed cannot follow the quantity of multimedia data which has rapidly increased. Accordingly, VCEG (Video Coding Expert Group) of ITU-T, the International Standard Organization, and MPEG (Moving Picture Expert Group) of ISO/IEC enacted HEVC (High Efficiency Video Coding) version 1, a video compression standard, on February 2014.

HEVC defines technologies such as intra prediction, inter prediction, transform, quantization, entropy encoding and an in-loop filter, etc.

DISCLOSURE

Technical Problem

The present disclosure is to suggest a method in which prediction efficiency may be improved by effectively deriving motion information used in generating a MERGE/AMVP candidate list.

The present disclosure is to provide a method and a device of searching a motion vector predictor for a current block among reconstructed motion information around a current block when a prediction block of a current block is generated.

The present disclosure is to provide a method and a device of effectively transmitting motion information of a current block.

The present disclosure is to provide a method and a device of predicting a current block more effectively by using reconstructed information in a current picture.

The present disclosure is to provide a method and a device of encoding/decoding a transform coefficient of a current block.

Technical Solution

An image encoding/decoding method and device according to the present disclosure may generate a candidate list of a current block and perform inter prediction of the current block by using any one of a plurality of candidates belonging to the candidate list.

In an image encoding/decoding method and device according to the present disclosure, the plurality of candidates may include at least one of a spatial candidate, a temporal candidate or a reconstructed information-based candidate and a reconstructed information-based candidate may be added from a buffer which stores motion information decoded before the current block.

In an image encoding/decoding method and device according to the present disclosure, motion information stored in the buffer may be added to the candidate list in an order of motion information stored later in the buffer or may be added to the candidate list in an order of motion information stored first in the buffer.

In an image encoding/decoding method and device according to the present disclosure, the number or order of which motion information stored in the buffer is added to the candidate list may be differently determined according to an inter prediction mode of the current block.

In an image encoding/decoding method and device according to the present disclosure, the candidate list may be filled by using motion information stored in the buffer until the maximum number of candidates in the candidate list is reached or may be filled by using motion information stored in the buffer until the number subtracting 1 from the maximum number of candidates is reached.

In an image encoding/decoding method and device according to the present disclosure, the buffer may be initialized in a unit of any one of a coding tree unit (CTU), a CTU row, a slice or a picture.

A computer readable recording medium according to the present disclosure may store a bitstream to be decoded by an image decoding method.

In a computer readable recording medium according to the present disclosure, the image decoding method may include generating a candidate list of a current block and performing inter prediction of the current block by using any one of a plurality of candidates belonging to the candidate list.

In a computer readable recording medium according to the present disclosure, the plurality of candidates may include at least one of a spatial candidate, a temporal candidate or a reconstructed information-based candidate and a reconstructed information-based candidate may be added from a buffer which stores motion information decoded before the current block.

In a computer readable recording medium according to the present disclosure, motion information stored in the buffer may be added to the candidate list in an order of motion information stored later in the buffer or may be added to the candidate list in an order of motion information stored first in the buffer.

In a computer readable recording medium according to the present disclosure, the number or order of which motion information stored in the buffer is added to the candidate list may be differently determined according to an inter prediction mode of the current block.

In a computer readable recording medium according to the present disclosure, the candidate list may be filled by using motion information stored in the buffer until the maximum number of candidates in the candidate list is reached or may be filled by using motion information stored in the buffer until the number subtracting 1 from the maximum number of candidates is reached.

In a computer readable recording medium according to the present disclosure, the buffer may be initialized in a unit of any one of a coding tree unit (CTU), a CTU row, a slice or a picture.

An image encoding/decoding method and device according to the present disclosure may generate a candidate list of a current block and perform inter prediction of the current block by using any one of a plurality of candidates belonging to the candidate list.

In an image encoding/decoding method and device according to the present disclosure, the plurality of candidates may include a temporal candidate in a unit of a sub-block. The temporal candidate in a unit of a sub-block may be a candidate for deriving motion information per sub-block of the current block and may have motion information of a target block which is temporally adjacent to the current block.

In an image encoding/decoding method and device according to the present disclosure, the sub-block may be a N×M block having a fixed size which is preset in a decoding device.

In an image encoding/decoding method and device according to the present disclosure, a sub-block of the target block may be determined as a block at a position which is shifted by a predetermined temporal motion vector from a position of a sub-block of the current block.

In an image encoding/decoding method and device according to the present disclosure, the temporal motion vector may be set by using only a surrounding block at a specific position among spatial surrounding blocks of the current block and a surrounding block at the specific position may be a left block of the current block.

In an image encoding/decoding method and device according to the present disclosure, the temporal motion vector may be set only when a reference picture of a surrounding block at the specific position is the same as a target picture to which the target block belongs.

A computer readable recording medium according to the present disclosure may store a bitstream to be decoded by an image decoding method.

In a computer readable recording medium according to the present disclosure, the image decoding method may include generating a candidate list of a current block and performing inter prediction of the current block by using any one of a plurality of candidates belonging to the candidate list.

In a computer readable recording medium according to the present disclosure, the plurality of candidates may include a temporal candidate in a unit of a sub-block. The temporal candidate in a unit of a sub-block may be a candidate for deriving motion information per sub-block of the current block and may have motion information of a target block which is temporally adjacent to the current block.

In a computer readable recording medium according to the present disclosure, the sub-block may be a N×M block having a fixed size which is preset in a decoding device.

In a computer readable recording medium according to the present disclosure, a sub-block of the target block may be determined as a block at a position which is shifted by a predetermined temporal motion vector from a position of a sub-block of the current block.

In a computer readable recording medium according to the present disclosure, the temporal motion vector may be set by using only a surrounding block at a specific position among spatial surrounding blocks of the current block and a surrounding block at the specific position may be a left block of the current block.

In a computer readable recording medium according to the present disclosure, the temporal motion vector may be set only when a reference picture of a surrounding block at the specific position is the same as a target picture to which the target block belongs.

An image encoding/decoding method and device according to the present disclosure may configure a merge candidate list of a current block, set any one of a plurality of merge candidates belonging to a merge candidate list as motion information of a current block, derive a final motion vector of the current block by adding a predetermined motion vector difference value (MVD) to a motion vector among motion information of a current block and generate a prediction block of the current block by performing motion compensation based on the final motion vector.

In an image encoding/decoding method and device according to the present disclosure, the merge candidate list may be configured with k merge candidates and k may be a natural number such as 4, 5, 6, or more.

In an image encoding/decoding method and device according to the present disclosure, motion information of the current block may be set by using any one of a first merge candidate or a second merge candidate belonging to the merge candidate list according to merge candidate index information which is transmitted from an encoding device.

In an image encoding/decoding method and device according to the present disclosure, the motion vector difference value may be derived based on a predetermined offset vector and the offset vector may be derived based on at least one of a length or a direction of the offset vector.

In an image encoding/decoding method and device according to the present disclosure, a length of the offset vector may be determined based on at least one of a distance index or a predetermined flag and the flag may mean information indicating whether a motion vector uses integer pixel precision in a merge mode of the current block.

In an image encoding/decoding method and device according to the present disclosure, a direction of the offset vector may be determined based on a direction index and the direction may mean any one of a left, right, top, bottom, top-left, bottom-left, top-right or bottom-right direction.

In an image encoding/decoding method and device according to the present disclosure, the offset vector may be modified by considering a POC difference between a reference picture of the current block and a current picture to which the current block belongs.

An image encoding/decoding method and device according to the present disclosure may determine a prediction block of a current block belonging to the current picture by using a pre-reconstructed region in a current picture, encode/decode a transform block of the current block and reconstruct the current block based on the prediction block and the transform block.

In an image encoding/decoding method and device according to the present disclosure, determining the prediction block may include determining a candidate for deriving motion information of the current block, configuring a candidate list of the current block based on the candidate, and determining motion information of the current block from the candidate list.

In an image encoding/decoding method and device according to the present disclosure, the candidate may mean motion information of a surrounding block which is spatially adjacent to the current block.

In an image encoding/decoding method and device according to the present disclosure, there may be a limit that the prediction block belongs to the same coding tree unit (CTU) or CTU row as the current block.

In an image encoding/decoding method and device according to the present disclosure, motion information of the surrounding block may be selectively added to the candidate list based on whether a size of the current block is greater than a predetermined threshold size.

In an image encoding/decoding method and device according to the present disclosure, the candidate list may additionally include motion information stored in a buffer of an encoding/decoding device.

In an image encoding/decoding method and device according to the present disclosure, the current block is divided into a plurality of sub-blocks and encoding/decoding the transform block may include encoding/decoding sub-block information for a sub-block of the current block and encoding/decoding at least one of greater 0 coefficient information, greater 1 coefficient information, Parity information or greater 3 coefficient information for a current coefficient in the sub-block when there is at least one non-zero coefficient in the sub-block according to the sub-block information.

In an image encoding/decoding method and device according to the present disclosure, number information for the sub-block may be encoded/decoded and the number information may mean the maximum number of coefficient information allowed for the sub-block.

In an image encoding/decoding method and device according to the present disclosure, the coefficient information may include at least one of the greater 0 coefficient information, the greater 1 coefficient information, the Parity information or the greater 3 coefficient information.

In an image encoding/decoding method and device according to the present disclosure, the number information may increase/decrease by 1 whenever at least one of the greater 0 coefficient information, the greater 1 coefficient information, the Parity information or the greater 3 coefficient information is encoded/decoded, respectively.

Technical Effects

According to the present disclosure, prediction efficiency may be improved by effectively deriving motion information used in generating a MERGE/AMVP candidate list.

The present disclosure may improve coding efficiency by selecting a motion vector predictor by using reconstructed motion information around a current block and effectively transmitting motion information.

The present disclosure may improve accuracy of a prediction signal by searching motion information of a block even in a current picture, not a previous reconstructed picture, and provide an image encoding/decoding method and device which transmit a transform coefficient thereby more effectively.

DESCRIPTION OF DIAGRAMS

FIG. 3 is a diagram for describing a method of deriving candidate motion information of a SKIP, MERGE mode.

FIG. 4 is a flow chart showing a method of deriving candidate motion information of an AMVP mode.

FIG. 19 is an example table for describing a method of configuring a Merge/AMVP candidate list for a motion vector according to an embodiment of the present disclosure.

FIG. 20 is an example table for describing a method of configuring a Merge/AMVP candidate list for MVD according to an embodiment of the present disclosure.

FIG. 25 is a table showing a configuration example of a reference picture set according to an embodiment of the present disclosure.

FIG. 26 is a table describing a method of adaptively determining binarization of an inter prediction direction and reference picture index information according to an embodiment of the present disclosure according to a configuration state of a reference picture set.

FIG. 27 is a table showing information on initial occurrence probability of MPS, LPS according to a context of a corresponding bin when a bin of inter prediction direction information according to an embodiment of the present disclosure is transmitted.

BEST MODE

Figure 1:
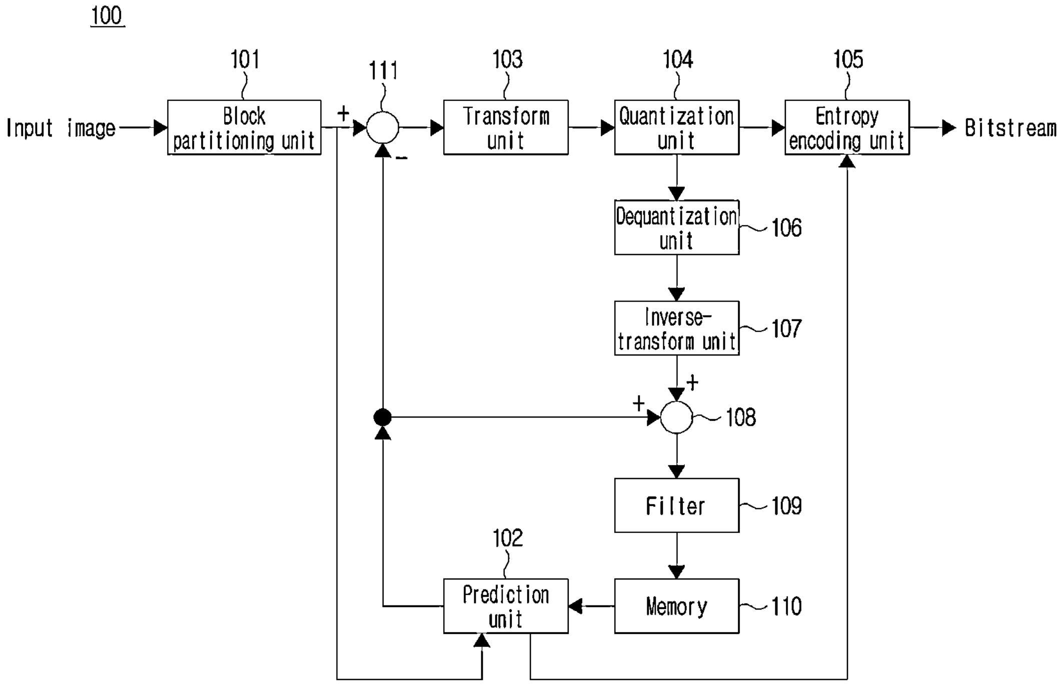
FIG. 1 is a flow chart simplifying an image encoding device.

An image encoding/decoding method and device according to the present disclosure may generate a candidate list of a current block and perform inter prediction of the current block by using any one of a plurality of candidates belonging to the candidate list.

In an image encoding/decoding method and device according to the present disclosure, the plurality of candidates may include at least one of a spatial candidate, a temporal candidate or a reconstructed information-based candidate and a reconstructed information-based candidate may be added from a buffer which stores motion information decoded before the current block.

In an image encoding/decoding method and device according to the present disclosure, motion information stored in the buffer may be added to the candidate list in an order of motion information stored later in the buffer or may be added to the candidate list in an order of motion information stored first in the buffer.

In an image encoding/decoding method and device according to the present disclosure, the number or order of which motion information stored in the buffer is added to the candidate list may be differently determined according to an inter prediction mode of the current block.

In an image encoding/decoding method and device according to the present disclosure, the candidate list may be filled by using motion information stored in the buffer until the maximum number of candidates in the candidate list is reached or may be filled by using motion information stored in the buffer until the number subtracting 1 from the maximum number of candidates is reached.

In an image encoding/decoding method and device according to the present disclosure, the buffer may be initialized in a unit of any one of a coding tree unit (CTU), a CTU row, a slice or a picture.

A computer readable recording medium according to the present disclosure may store a bitstream to be decoded by an image decoding method.

In a computer readable recording medium according to the present disclosure, the image decoding method may include generating a candidate list of a current block and performing inter prediction of the current block by using any one of a plurality of candidates belonging to the candidate list.

In a computer readable recording medium according to the present disclosure, the plurality of candidates may include at least one of a spatial candidate, a temporal candidate or a reconstructed information-based candidate and a reconstructed information-based candidate may be added from a buffer which stores motion information decoded before the current block.

In a computer readable recording medium according to the present disclosure, motion information stored in the buffer may be added to the candidate list in an order of motion information stored later in the buffer or may be added to the candidate list in an order of motion information stored first in the buffer.

In a computer readable recording medium according to the present disclosure, the number or order of which motion information stored in the buffer is added to the candidate list may be differently determined according to an inter prediction mode of the current block.

In a computer readable recording medium according to the present disclosure, the candidate list may be filled by using motion information stored in the buffer until the maximum number of candidates in the candidate list is reached or may be filled by using motion information stored in the buffer until the number subtracting 1 from the maximum number of candidates is reached.

In a computer readable recording medium according to the present disclosure, the buffer may be initialized in a unit of any one of a coding tree unit (CTU), a CTU row, a slice or a picture.

An image encoding/decoding method and device according to the present disclosure may generate a candidate list of a current block and perform inter prediction of the current block by using any one of a plurality of candidates belonging to the candidate list.

In an image encoding/decoding method and device according to the present disclosure, the plurality of candidates may include a temporal candidate in a unit of a sub-block. The temporal candidate in a unit of a sub-block may be a candidate for deriving motion information per sub-block of the current block and may have motion information of a target block which is temporally adjacent to the current block.

In an image encoding/decoding method and device according to the present disclosure, the sub-block may be a N×M block having a fixed size which is preset in a decoding device.

In an image encoding/decoding method and device according to the present disclosure, a sub-block of the target block may be determined as a block at a position which is shifted by a predetermined temporal motion vector from a position of a sub-block of the current block.

In an image encoding/decoding method and device according to the present disclosure, the temporal motion vector may be set by using only a surrounding block at a specific position among spatial surrounding blocks of the current block and a surrounding block at the specific position may be a left block of the current block.

In an image encoding/decoding method and device according to the present disclosure, the temporal motion vector may be set only when a reference picture of a surrounding block at the specific position is the same as a target picture to which the target block belongs.

A computer readable recording medium according to the present disclosure may store a bitstream to be decoded by an image decoding method.

In a computer readable recording medium according to the present disclosure, the image decoding method may include generating a candidate list of a current block and performing inter prediction of the current block by using any one of a plurality of candidates belonging to the candidate list.

In a computer readable recording medium according to the present disclosure, the plurality of candidates may include a temporal candidate in a unit of a sub-block. The temporal candidate in a unit of a sub-block may be a candidate for deriving motion information per sub-block of the current block and may have motion information of a target block which is temporally adjacent to the current block.

In a computer readable recording medium according to the present disclosure, the sub-block may be a N×M block having a fixed size which is preset in a decoding device.

In a computer readable recording medium according to the present disclosure, a sub-block of the target block may be determined as a block at a position which is shifted by a predetermined temporal motion vector from a position of a sub-block of the current block.

In a computer readable recording medium according to the present disclosure, the temporal motion vector may be set by using only a surrounding block at a specific position among spatial surrounding blocks of the current block and a surrounding block at the specific position may be a left block of the current block.

In a computer readable recording medium according to the present disclosure, the temporal motion vector may be set only when a reference picture of a surrounding block at the specific position is the same as a target picture to which the target block belongs.

An image encoding/decoding method and device according to the present disclosure may configure a merge candidate list of a current block, set any one of a plurality of merge candidates belonging to a merge candidate list as motion information of a current block, derive a final motion vector of the current block by adding a predetermined motion vector difference value (MVD) to a motion vector among motion information of a current block and generate a prediction block of the current block by performing motion compensation based on the final motion vector.

In an image encoding/decoding method and device according to the present disclosure, the merge candidate list may be configured with k merge candidates and k may be a natural number such as 4, 5, 6, or more.

In an image encoding/decoding method and device according to the present disclosure, motion information of the current block may be set by using any one of a first merge candidate or a second merge candidate belonging to the merge candidate list according to merge candidate index information which is transmitted from an encoding device.

In an image encoding/decoding method and device according to the present disclosure, the motion vector difference value may be derived based on a predetermined offset vector and the offset vector may be derived based on at least one of a length or a direction of the offset vector.

In an image encoding/decoding method and device according to the present disclosure, a length of the offset vector may be determined based on at least one of a distance index or a predetermined flag and the flag may mean information indicating whether a motion vector uses integer pixel precision in a merge mode of the current block.

In an image encoding/decoding method and device according to the present disclosure, a direction of the offset vector may be determined based on a direction index and the direction may mean any one of a left, right, top, bottom, top-left, bottom-left, top-right or bottom-right direction.

In an image encoding/decoding method and device according to the present disclosure, the offset vector may be modified by considering a POC difference between a reference picture of the current block and a current picture to which the current block belongs.

An image encoding/decoding method and device according to the present disclosure may determine a prediction block of a current block belonging to the current picture by using a pre-reconstructed region in a current picture, encode/decode a transform block of the current block and reconstruct the current block based on the prediction block and the transform block.

In an image encoding/decoding method and device according to the present disclosure, determining the prediction block may include determining a candidate for deriving motion information of the current block, configuring a candidate list of the current block based on the candidate and determining motion information of the current block from the candidate list.

In an image encoding/decoding method and device according to the present disclosure, the candidate may mean motion information of a surrounding block which is spatially adjacent to the current block.

In an image encoding/decoding method and device according to the present disclosure, there may be a limit that the prediction block belongs to the same coding tree unit (CTU) or CTU row as the current block.

In an image encoding/decoding method and device according to the present disclosure, motion information of the surrounding block may be selectively added to the candidate list based on whether a size of the current block is greater than a predetermined threshold size.

In an image encoding/decoding method and device according to the present disclosure, the candidate list may additionally include motion information stored in a buffer of an encoding/decoding device.

In an image encoding/decoding method and device according to the present disclosure, the current block is divided into a plurality of sub-blocks and encoding/decoding the transform block may include encoding/decoding sub-block information for a sub-block of the current block and encoding/decoding at least one of greater 0 coefficient information, greater 1 coefficient information, Parity information or greater 3 coefficient information for a current coefficient in the sub-block when there is at least one non-zero coefficient in the sub-block according to the sub-block information.

In an image encoding/decoding method and device according to the present disclosure, number information for the sub-block may be encoded/decoded and the number information may mean the maximum number of coefficient information allowed for the sub-block.

In an image encoding/decoding method and device according to the present disclosure, the coefficient information may include at least one of the greater 0 coefficient information, the greater 1 coefficient information, the Parity information or the greater 3 coefficient information.

In an image encoding/decoding method and device according to the present disclosure, the number information may increase/decrease by 1 whenever at least one of the greater 0 coefficient information, the greater 1 coefficient information, the Parity information or the greater 3 coefficient information is encoded/decoded, respectively.

MODE FOR INVENTION

Referring to a diagram attached in this specification, an embodiment of the present disclosure is described in detail so that a person with ordinary skill in the art to which the inventions pertain may easily carry it out. But, the present disclosure may be implemented in a variety of different shapes and is not limited to an embodiment which is described herein. And, a part irrelevant to a description is omitted and a similar diagram sign is attached to a similar part through the specification to clearly describe the present disclosure in a diagram.

In this specification, when a part is referred to as being 'connected to' other part, it includes a case that it is electrically connected while intervening another element as well as a case that it is directly connected.

In addition, in this specification, when a part is referred to as 'including' a component, it means that other components may be additionally included without excluding other components, unless otherwise specified.

In addition, a term such as first, second, etc. may be used to describe various components, but the components should not be limited by the terms. The terms are used only to distinguish one component from other components.

In addition, in an embodiment on a device and a method described in this specification, some configurations of a device or some steps of a method may be omitted. In addition, the order of some configurations of a device or some steps of a method may be changed. In addition, another configuration or another step may be inserted in some configurations of a device or some steps of a method.

In addition, some configurations or some steps in a first embodiment of the present disclosure may be added to a second embodiment of the present disclosure or may be replaced with some configurations or some steps in a second embodiment.

In addition, as construction units shown in an embodiment of the present disclosure are independently shown to represent different characteristic functions, it does not mean that each construction unit is configured in a separate hardware or one software construction unit. In other words, each construction unit may be described by being enumerated as each construction unit for convenience of description, and at least two construction units among each construction unit may be combined to configure one construction unit or one construction unit may be divided into a plurality of construction units to perform a function. Such an integrated embodiment and separated embodiment in each construction unit are also included in a scope of a right on the present disclosure as long as they are not beyond the essence of the present disclosure.

In this specification, a block may be variously represented as a unit, a region, a unit, a partition, etc. and a sample may be variously represented as a pixel, a pel, a pixel, etc.

Hereinafter, referring to the attached diagrams, an embodiment of the present disclosure will be described in more detail. In describing the present disclosure, an overlapping description for the same component is omitted.

FIG. 1 is a block flow chart simplifying a configuration of an image encoding device. As a device encoding an image, an image encoding device may largely include a block partitioning unit, a prediction unit, a transform unit, a quantization unit, an entropy encoding unit, a dequantization unit, an inverse transform unit, an add unit, an in-loop filter unit, a memory unit and a subtraction unit.

A block partitioning unit 101 partitions a block to be encoded in the maximum size (hereinafter, referred to as the maximum coding block) into a block to be encoded in the minimum size (hereinafter, referred to as the minimum coding block). There are a variety of block partitioning methods. Quad-tree partitioning (hereinafter, referred to as QT (Quad-Tree) partitioning) is partitioning which accurately partitions a current coding block into four. Binary-tree partitioning (hereinafter, referred to as BT (Binary-Tree) partitioning) is partitioning which accurately partitions a coding block into two in a horizontal direction or in a vertical direction. Ternary-tree partitioning is partitioning which partitions a coding block into three in any one of a horizontal direction or in a vertical direction. When a coding block is partitioned in a horizontal direction, a ratio of a height of partitioned blocks may be {1:n:1}. Alternatively, when a coding block is partitioned in a vertical direction, a ratio of a width of partitioned blocks may be {1:n:1}. In this case, n may be a natural number such as 1, 2, 3, or more. There may be other various partitioning methods. In addition, it is possible to perform partitioning by considering several partitioning methods at the same time.

A prediction unit 102 generate a prediction block by using a surrounding pixel of a block to be currently predicted in a current original block (hereinafter, referred to as a prediction block) or pixels in a reference picture which is already encoded/decoded. For a prediction block, 1 or more prediction blocks may be generated in a coding block. When the number of prediction blocks in a coding block is one, a prediction block has the same shape as a coding block. As a prediction technology for a video signal is largely configured with intra prediction and inter prediction, intra prediction is a method in which a prediction block is generated by using surrounding pixels of a current block and inter prediction is a method in which a prediction block is generated by finding a block which is most similar to a current block in a reference picture which is already encoded/decoded. Afterwards, the optimal prediction mode of a prediction block is determined by using a variety of methods such as RDO (Rate-Distortion Optimization), etc. for a residual block resulting from subtracting a prediction block from an original block. A formula for calculating a RDO cost is the same as Equation 1.

$$J(\Phi, \lambda) = D(\Phi) + \lambda R(\Phi) \qquad \text{[Equation 1]}$$

D, R, J are respectively degradation caused by quantization, a rate of a compressed stream and a RD cost, $\phi$ is an encoding mode and $\lambda$ is a Lagrangian multiplier, which are used as a coefficient for scale modification to match a unit between the amount of errors and the amount of bits. To be selected as the optimal encoding mode in an encoding process, J when a corresponding mode is applied, i.e., a RD-cost value, should be smaller than when other mode is applied, and in Equation for finding a RD-cost value, it is calculated by considering a bit ratio and an error at the same time.

An intra prediction unit (not shown) may generate a prediction block based on reference pixel information around a current block which is pixel information in a current picture. When a prediction mode of a surrounding block of a current block on which intra prediction is to be performed is inter prediction, a reference pixel included in a surrounding block to which inter prediction is applied may be replaced with a reference pixel in other surrounding block to which intra prediction is applied. In other words, when a reference pixel is unavailable, unavailable reference pixel information may be used by being replaced with at least one reference pixel of available reference pixels.

In intra prediction, a prediction mode may have a directional prediction mode which uses reference pixel information according to a prediction direction and a nondirectional mode which does not use directional information when prediction is performed. A mode for predicting luma information may be different from a mode for predicting chroma information and intra prediction mode information used to predict luma information or predicted luma signal information may be utilized to predict chroma information.

An intra prediction unit may include an adaptive intra smoothing (AIS) filter, a reference pixel interpolation unit and a DC filter. As a part performing filtering for a reference pixel of a current block, an AIS filter may adaptively determine whether a filter is applied according to a prediction mode in a current prediction unit. When a prediction mode of a current block is a mode which does not perform AIS filtering, an AIS filter may not be applied.

When a prediction mode in a prediction unit is a prediction unit in which intra prediction is performed based on a pixel value interpolating a reference pixel, a reference pixel interpolation unit in an intra prediction unit may interpolate a reference pixel to generate a reference pixel at a position of a fractional unit. When a prediction mode in a current prediction unit is a prediction mode which generates a prediction block without interpolating a reference pixel, a reference pixel may not be interpolated. A DC filter may generate a prediction block through filtering when a prediction mode of a current block is a DC mode.

An inter prediction unit (not shown) generates a prediction block by using motion information and a pre-reconstructed reference image stored in a memory 110. Motion information, for example, may include a motion vector, a reference picture index, a list 1 prediction flag, a list 0 prediction flag, etc.

An inter prediction unit may derive a prediction block based on information of at least one picture of a previous picture or a subsequent picture of a current picture. In addition, a prediction block of a current block may be derived based on information of some regions which are encoded in a current picture. An inter prediction unit according to an embodiment of the present disclosure may include a reference picture interpolation unit, a motion prediction unit and a motion compensation unit.

In a reference picture interpolation unit, reference picture information may be provided from a memory 110 and pixel information equal to or less than an integer pixel may be generated in a reference picture. For a luma pixel, a DCT-based 8-tap interpolation filter with a different filter coefficient may be used to generate pixel information equal to or less than an integer pixel in a ¼ pixel unit. For a chroma signal, a DCT-based 4-tap interpolation filter with a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a ½ or ¼ pixel unit based on an interpolated pixel. In a motion prediction unit, a prediction block of a current block may be predicted by making a motion prediction method different. As a motion prediction method, various methods such as a skip mode, a merge mode, an AMVP (Advanced Motion Vector Prediction) mode, etc. may be used.

Figure 2:
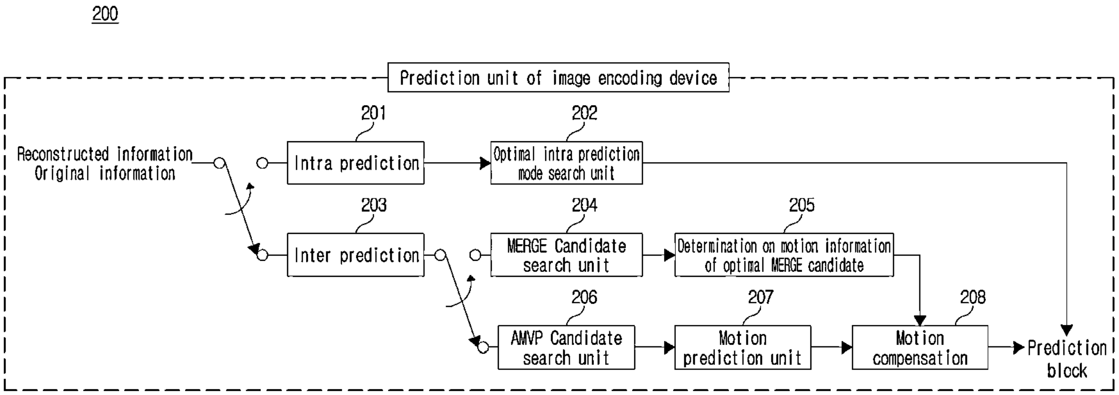
FIG. 2 is a diagram for describing a prediction unit of an image encoding device in detail.

FIG. 2 is a flow chart describing a flow in a prediction unit of an image encoding device. When intra prediction is performed by using original information and reconstructed information 201, the optimal intra prediction mode is determined by using a RD-cost value per each prediction mode 202 and a prediction block is generated. When inter prediction is performed by using original information and reconstructed information 203, a RD-cost value is calculated for a SKIP mode, a MERGE mode and an AMVP mode. In a MERGE candidate search unit 204, a candidate motion information set for a SKIP mode and a MERGE mode is configured. Among a corresponding candidate motion information set, the optimal motion information is determined by using a RD-cost value 205. In an AMVP candidate search unit 206, a candidate motion information set for an AMVP mode is configured. Motion prediction is performed by using corresponding candidate motion information sets 207 and the optimal motion information is determined. A prediction block is generated by performing motion compensation 208 by using the optimal motion information determined in each mode.

The above-described inter prediction may be configured with 3 modes (a SKIP mode, a MERGE mode, an AMVP mode). Each prediction mode may find a prediction block of a current block by using motion information (prediction direction information, reference picture information, a motion vector) and there may be an additional prediction mode using motion information.

A SKIP mode determines the optimal prediction information by using motion information of a pre-reconstructed region. A motion information candidate group is configured in a reconstructed region to generate a prediction block by using a candidate with the minimum RD-cost value among a corresponding candidate group as prediction information, and in this case, a method of configuring a motion information candidate group is the same as a method of configuring a motion information candidate group of a MERGE mode, so it is omitted in this description.

A MERGE mode is the same as a SKIP mode in that the optimal prediction information is determined by using motion information of a pre-reconstructed region. But, they are different in that a SKIP mode searches motion information which makes a prediction error zero in a motion information candidate group and a MERGE mode searches motion information that a prediction error is non-zero in a motion information candidate group. Like a SKIP mode, a motion information candidate group is configured in a reconstructed region to generate a prediction block by using a candidate with the minimum RD-cost value among a corresponding candidate group as prediction information.

301 in FIG. 3 represents a method of generating a motion information candidates of a SKIP mode and a MERGE mode. The maximum number of motion information candidates may be equally determined in an image encoding device and an image decoding device and corresponding number information may be pre-transmitted in a higher header of an image encoding device (a higher header means parameters transmitted from a higher set of a block such as a video parameter set, a sequence parameter set, a picture parameter set, etc.). In a description of Step S305 and Step S306, only when a spatial candidate block and a temporal candidate block are encoded by an inter prediction mode, motion information derived by using corresponding motion information is included in a motion information candidate group. In Step S305, 4 candidates of 5 spatial candidate blocks around a current block are selected in the same picture. A position of a spatial candidate refers to 302 of FIG. 3 and a position of each candidate may be changed into any block in a reconstructed region. Motion information of a spatial candidate block which may be used first is determined as a spatial candidate by considering spatial candidates in an order of $A_1$, $A_2$, $A_3$, $A_4$, $A_5$. But, it is just an example of a priority, and a priority may be $A_2$, $A_1$, $A_3$, $A_4$, $A_5$ or $A_2$, $A_1$, $A_4$, $A_3$, $A_5$. When there is duplicated motion information, only motion information of a candidate with a high priority is considered. In Step S306, 1 candidate of 2 temporal candidate blocks is selected. A position of a temporal candidate refers to 302 of FIG. 3 and a position of each candidate is determined based on a block at the same position as a current block of a current picture in a collocated picture. In this case, a collocated picture may be set among reconstructed pictures under the same conditions in an image encoding device and an image decoding device. Motion information of a candidate block which may be used first is determined as a temporal candidate by considering temporal candidates in an order of $B_1$, $B_2$ block. A method of determining motion information of a temporal candidate refers to 303 of FIG. 3. Motion information of a candidate block ($B_1$, $B_2$) in a collocated picture indicates a prediction block in reference picture B. (But, a reference picture of each candidate block may be different each other. In this description, for convenience, it is expressed as reference picture B.) For a corresponding motion vector, a motion vector of temporal candidate motion information is determined by scaling a motion vector of a candidate block as much as a corresponding ratio after calculating a ratio of a distance between a current picture and reference picture A compared with a distance between a collocated picture and reference picture B. Equation 2 means a scaling Equation.

$$MV_{scale} = \left(\left(\left(TB \times \frac{2^{14} + (TD \gg 1)}{TD} + 2^5\right) \gg 6\right) \times MV + (2^7 - 1)\right) \gg 2^3 \quad \text{[Equation 2]}$$

MV means a motion vector of temporal candidate block motion information, $MV_{scale}$ means a scaled motion vector, TB means a temporal distance between a collocated picture and reference picture B and TD means a temporal distance between a current picture and reference picture A. In addition, reference picture A and reference picture B may be the same reference picture. Like this, motion information of a temporal candidate is derived by determining a scaled motion vector as a motion vector of a temporal candidate and determining a reference picture of a current picture as reference picture information of temporal candidate motion information. Step S307 is performed only when the maximum number of motion information candidates is not filled in Step S305, S306 and is a step in which a new bidirectional motion information candidates is added by a combination of motion information candidates derived in a previous step. A bidirectional motion information candidate is made by bringing each of motion information in a past or future direction which is derived before and combining them as a new candidate. Table 304 of FIG. 3 represents a priority of a bidirectional motion information candidate combination. Besides a combination in this table, an additional combination may be used and this table just represents one example. When the maximum number of motion information candidates is not filled although a bidirectional motion information candidate is used, Step S307 is performed. In Step S308, a motion vector of a motion information candidate is fixed as a zero motion vector and the maximum number of motion information candidates is filled by making a reference picture according to a prediction direction different.

An AMVP mode determines the optimal motion information through motion estimation per reference picture according to a prediction direction. In this case, a prediction direction may be a unidirectional direction using only one of a past/future direction or may be a bidirectional direction using both past and future directions. A prediction block is generated by performing motion compensation by using the optimal motion information determined by motion estimation. In this case, a motion information candidate group for motion estimation is derived per reference picture according to a prediction direction. A corresponding motion information candidate group is used as a start point of motion estimation. A method of deriving a motion information candidate group for motion estimation of an AMVP mode refers to FIG. 4.

The maximum number of motion information candidates may be equally determined in an image encoding device and an image decoding device and corresponding number information may be pre-transmitted from a higher header of an image encoding device. In a description of Step S401 and Step S402, only when a spatial candidate block and a temporal candidate block are encoded by an inter prediction mode, motion information derived by using corresponding motion information is included in a motion information candidate group. In step S401, unlike a description in step S305, the number derived as a spatial candidate (2) may be different and a priority for selecting a spatial candidate may be also different. The remaining description is the same as that in step S305. Step S402 is the same as a description in step S306. In step S403, when there is duplicated motion information among candidates derived so far, it is removed. Step S404 is the same as a description in step S308. Among motion information candidates derived in this way, a motion information candidate with the minimum RD-cost value is selected as the optimal motion information candidate to obtain the optimal motion information of an AMVP mode through a process of motion estimation based on corresponding motion information.

A transform unit 103 generates a transform block by transforming a residual block which is a difference between an original block and a prediction block. A transform block is the smallest unit to be used for a process of transform and quantization. A transform unit generates a transform block having a transform coefficient by transforming a residual signal into a frequency domain. In this case, as a method of transforming a residual signal into a frequency domain, a variety of transform methods such as DCT (Discrete Cosine Transform) based transform, DST (Discrete Sine Transform), KLT (Karhunen Loeve Transform), etc. may be used and a transform coefficient is generated by transforming a residual signal into a frequency domain by using it. A matrix operation is performed by using a basis vector to use a transform method conveniently. Transform methods may be variously mixed and used in a matrix operation according to in which prediction mode a prediction block is encoded. For example, in intra prediction, discrete cosine transform may be used in a horizontal direction and discrete sine transform may be used in a vertical direction according to a prediction mode.

A quantization unit 104 generates a quantized transform block by quantizing a transform block. In other words, a quantization unit generates a quantized transform block (Quantized Transform Coefficient) having a quantized transform coefficient by quantizing transform coefficients of a transform block generated from a transform unit 103. As a quantization method, DZUTQ (Dead Zone Uniform Threshold Quantization) or Quantization Weighted Matrix, etc. may be used, but a variety of quantization methods such as quantization improving it may be used.

On the other hand, it was shown and described above that an image encoding device includes a transform unit and a quantization unit, but a transform unit and a quantization unit may be selectively included. In other words, an image encoding device may generate a transform block by transforming a residual block without perform a quantization process, may perform only a quantization process without transforming a residual block into a frequency coefficient or may not perform both a transform and quantization process. Although all or somert of processes of a transform unit and a quantization unit are not performed in an image encoding device, a block input to an entropy encoding unit is generally referred to as 'a quantized transform block'.

An entropy encoding unit 105 outputs a bitstream by encoding a quantized transform block. In other words, an entropy encoding unit encodes coefficients of a quantized transform block output from a quantization unit by using various encoding methods such as entropy encoding, etc. and generates and outputs a bitstream including additional information which is needed to decode a corresponding block in the after-described image decoding device (e.g., information on a prediction mode (motion information determined in a prediction unit or intra prediction mode information, etc. may be included in information on a prediction mode), a quantization coefficient, etc.)

A dequantization unit 106 reconstructs a dequantized transform block by inversely performing a quantization method which is used in quantization for a quantized transform block.

An inverse transform unit 107 reconstructs a residual block by inverse-transforming a dequantized transform block by using the same method as a method used in transform, and performs inverse-transform by inversely performing a transform method used in a transform unit.

On the other hand, a dequantization unit and an inverse transform unit may perform dequantization and inverse-transform by inversely using a quantization method and a transform method used in a quantization unit and a transform unit. In addition, when a transform unit and a quantization unit perform only quantization and does not perform transform, only dequantization may be performed and inverse-transform may not be performed. When both transform and quantization are not performed, a dequantization unit and an inverse transform unit may not perform both inverse-transform and dequantization or may be omitted without being included in an image encoding device.

An addition unit 108 reconstructs a current block by adding a residual signal generated in an inverse transform unit and a prediction block generated by prediction.

A filter unit 109 is a process in which after all blocks in a current picture are reconstructed, filtering is additionally performed across a picture, and there are deblocking filtering, SAO (Sample Adaptive Offset), ALF (Adaptive Loop Filter), etc. Deblocking filtering refers to an operation of reducing block distortion which is generated while an image is encoded in a block unit and SAO (Sample Adaptive Offset) refers to an operation of minimizing a difference between a reconstructed image and an original image by subtracting or adding a specific value from or to a reconstructed pixel. ALF (Adaptive Loop Filter) may be performed based on a value resulting from comparing a filtered reconstructed image with an original image. Pixels included in an image may be divided into predetermined groups, one filter to be applied to a corresponding group may be determined and filtering may be performed discriminately per group. Information related to whether an ALF is applied may be transmitted per coding unit (CU) and a shape and/or a filter coefficient of an ALF filter to be applied may be different according to each block. In addition, an ALF filter in the same shape (fixed shape) may be applied regardless of a feature of a block to be applied.

A memory 110 may store a reconstructed current block through additional filtering in an in-loop filter unit after adding a residual signal generated in an inverse transform unit and a prediction block generated by prediction, and it may be used to predict a subsequent block or a subsequent picture, etc.

A subtraction unit 111 generates a residual block by subtracting a prediction block from a current original block.

Figure 5:
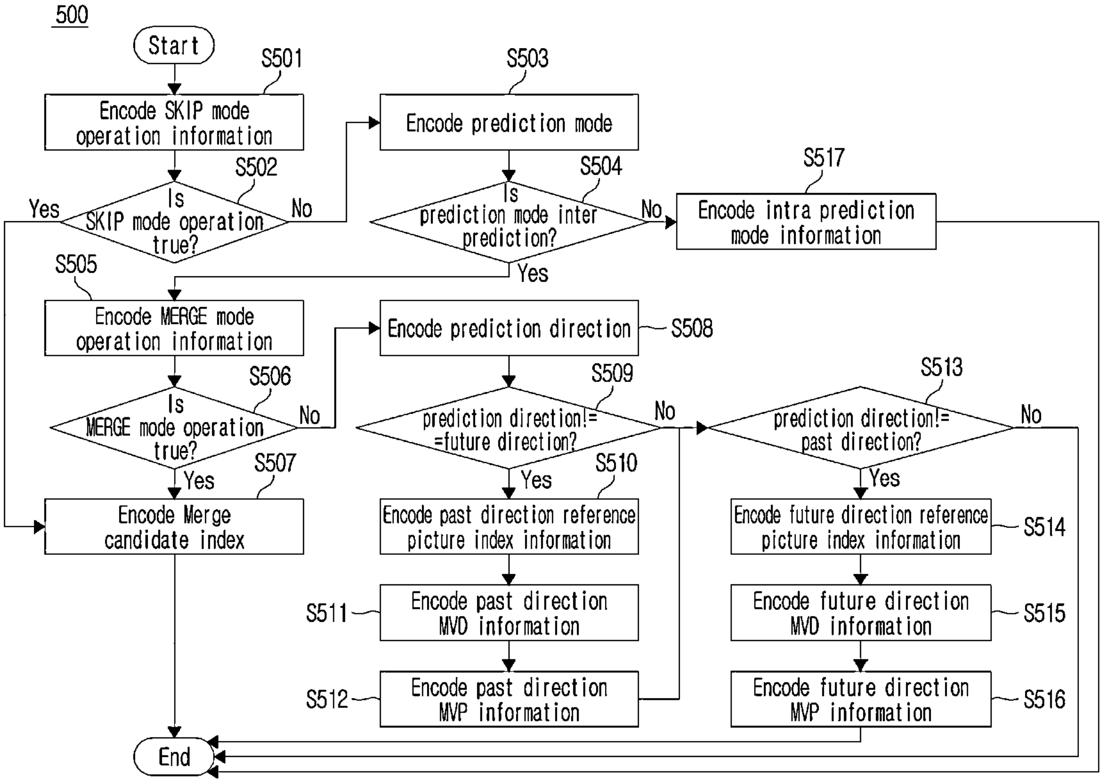
FIG. 5 is a flow chart showing a method of encoding prediction information.

FIG. 5 is a flow chart showing an encoding flow of coding information in an entropy encoding unit in an image encoding device. In step S501, operation information of a SKIP mode is encoded. In step S502, whether a SKIP mode operates is determined. When a SKIP mode operates in step S502, this flow chart is finished after encoding MERGE candidate index information for a SKIP mode in step S507. When a SKIP mode does not operate in step S502, a prediction mode is encoded in step S503. In step S503, whether a prediction mode is an inter prediction or intra prediction mode is determined. When a prediction mode is an inter prediction mode in step S504, operation information of a MERGE mode is encoded in step S505. In step S506, whether a MERGE mode operates is determined. When a MERGE mode operates in step S506, this flow chart is finished after moving to step S507 and encoding MERGE candidate index information for a MERGE mode. When a MERGE mode does not operate in step S506, a prediction direction is encoded in step S508. In this case, a prediction direction may be one of a past direction, a future direction, or a bidirectional direction. In step S509, whether a prediction direction is a future direction or not is determined. When a prediction direction is not a future direction in step S509, reference picture index information in a past direction is encoded in step S510. In step S511, MVD (Motion Vector Difference) information in a past direction is encoded. In step S512, MVP (Motion Vector Predictor) information in a past direction is encoded. When a prediction direction is a future direction or a bidirectional direction in step S509 or when step S512 ends, whether a prediction direction is a past direction or not is determined in step S513. When a prediction direction is not a past direction in step S513, reference picture index information in a future direction is encoded in step S514. In step S515, MVD information in a future direction is encoded. In step S516, this flow chart is finished after encoding MVP information in a future direction. When a prediction mode is an intra prediction mode in step S504, this flow chart is finished after encoding intra prediction mode information in step S517.

Figure 6:
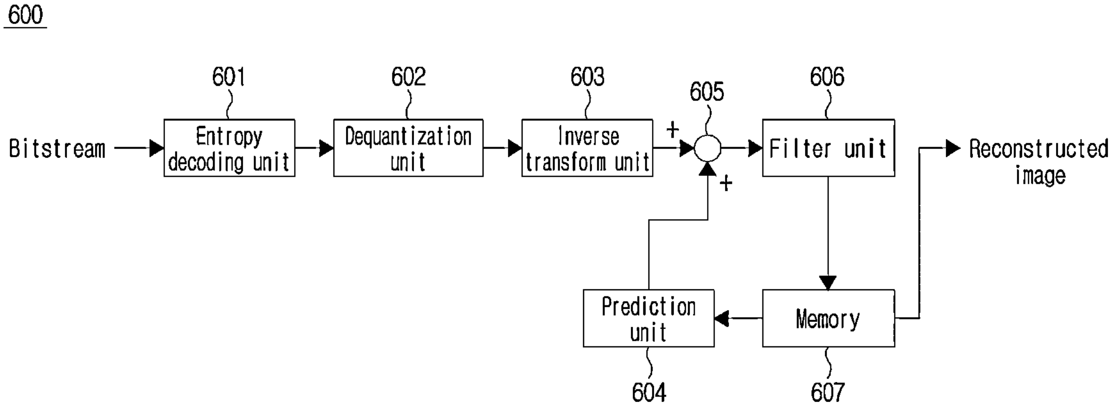
FIG. 6 is a flow chart simplifying an image decoding device.

FIG. 6 is a block flow chart simplifying a configuration of an image decoding device 600.

An image decoding device 600 is a device of decoding an image and may largely include a block entropy decoding unit, a dequantization unit, an inverse transform unit, a prediction unit, an addition unit, an in-loop filter unit and a memory. A coding block in an image encoding device is referred to as a decoding block in an image decoding device.

An entropy decoding unit 601 reads a quantized transform coefficient and a variety of information needed to decode a corresponding block by interpreting a bitstream transmitted from an image encoding device.

A dequantization unit 602 reconstructs a dequantized block having a dequantized coefficient by inversely performing a quantization method used in quantization for a quantization coefficient decoded in an entropy decoding unit.

An inverse transform unit 603 reconstructs a residual block having a difference signal by inversely transforming a dequantized transform block by using the same method as a method used in transform, and performs inverse-transform by inversely performing a transform method used in a transform unit.

A prediction unit 604 generates a prediction block by using prediction mode information decoded in an entropy decoding unit, which uses the same method as a prediction method performed in a prediction unit of an image encoding device.

An addition unit 605 reconstructs a current block by adding a residual signal reconstructed in an inverse transform unit and a prediction block generated by prediction.

A filter unit 606 is a process in which after all blocks in a current picture are reconstructed, additional filtering is performed across a picture, there are deblocking filtering, SAO (Sample Adaptive Offset), ALF, etc. and a detailed description is the same as described in an in-loop filter unit of the above-described image encoding device.

A memory 607 may store a reconstructed current block through additional filtering in an in-loop filter unit after adding a residual signal generated in an inverse transform unit and a prediction block generated by prediction, and it may be used to predict a subsequent block or a subsequent picture, etc.

Figure 7:
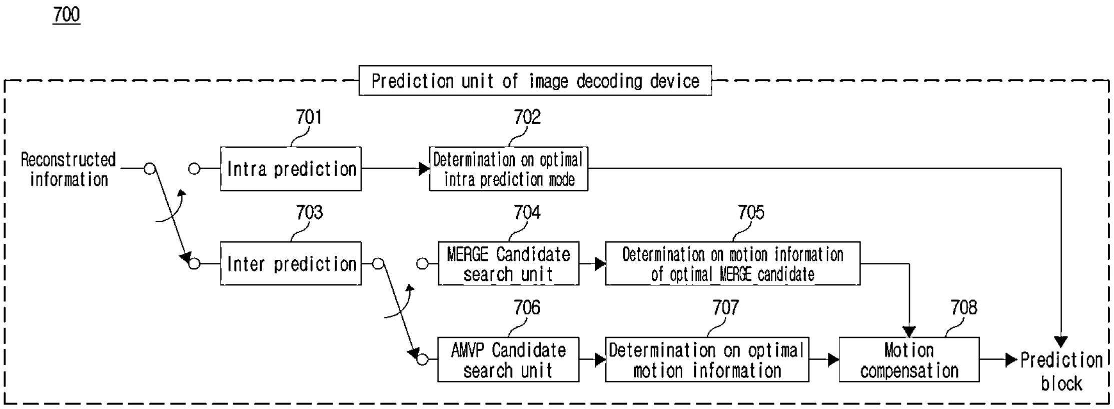
FIG. 7 is a diagram for describing a prediction unit of an image decoding device.

FIG. 7 is a flow chart describing a flow in a prediction unit of an image decoding device. When a prediction mode is intra prediction, the optimal intra prediction mode information is determined 701 and a prediction block is generated by performing intra prediction 702. When a prediction mode is inter prediction, the optimal prediction mode of SKIP, MERGE, AMVP mode is determined 703. When it is decoded in a SKIP mode or a MERGE mode, a candidate motion information set for a SKIP mode and a MERGE mode is configured in a MERGE candidate search unit 704. Among a corresponding candidate motion information set, the optimal motion information is determined 705 by using a transmitted candidate index (e.g., a merge index). When it is decoded in an AMVP mode, a candidate motion information set for an AMVP mode is configured in an AMVP candidate search unit 706. Among corresponding candidate motion information candidates, the optimal motion information is determined 707 by using a transmitted candidate index (e.g., MVP information). Afterwards, a prediction block is generated by performing motion compensation 708 by using the optimal motion information determined in each mode.

Figure 8:
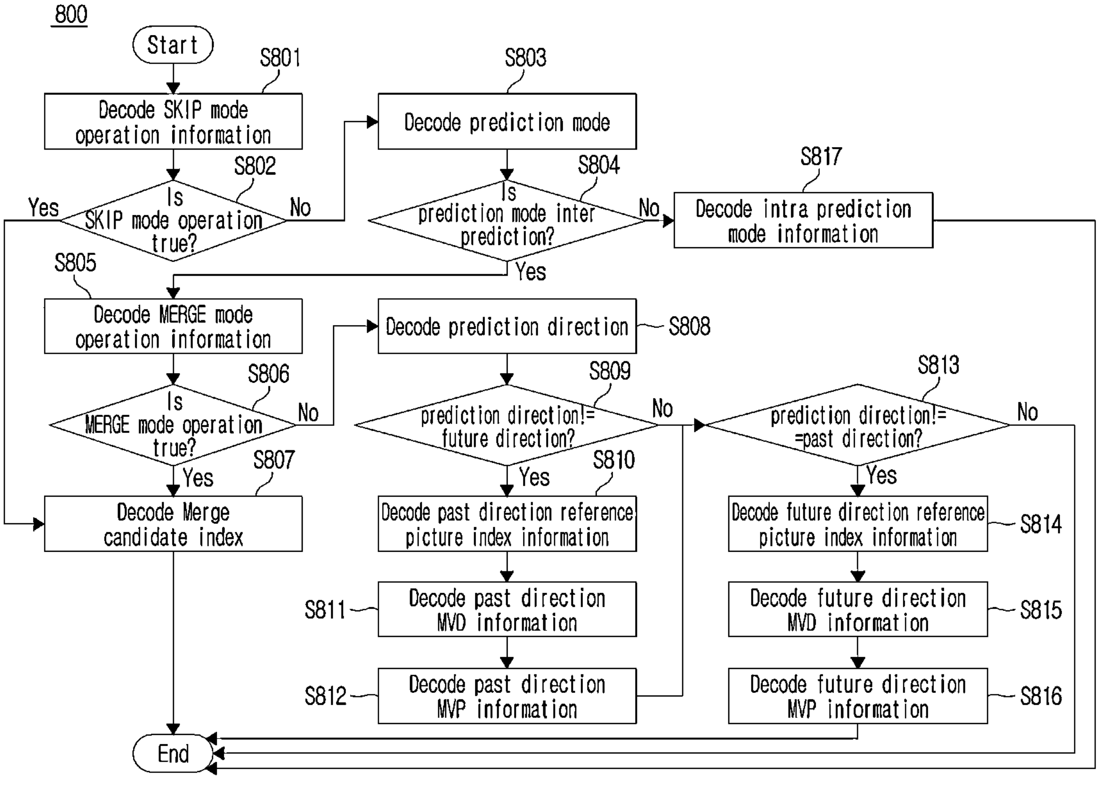
FIG. 8 is a flow chart showing a method of decoding prediction information.

FIG. 8 is a flow chart showing a decoding flow of coding information in an image decoding device. In step S801, operation information of a SKIP mode is decoded. In step S802, whether a SKIP mode operates is determined. When a SKIP mode operates in step S802, this flow chart is finished after decoding MERGE candidate index information for a SKIP mode in step S807. When a SKIP mode does not operate in step S802, a prediction mode is decoded in step S803. In step S803, whether a prediction mode is an inter prediction or intra prediction mode is determined. When a prediction mode is an inter prediction mode in step S804, operation information of a MERGE mode is decoded in step S805. In step S806, whether a MERGE mode operates is determined. When a MERGE mode operates in step S806, this flow chart is finished after moving to step S807 and decoding MERGE candidate index information for a MERGE mode. When a MERGE mode does not operate in step S806, a prediction direction is decoded in step S808. In this case, a prediction direction may be one of a past direction, a future direction, a bidirectional direction. In step S809, whether a prediction direction is a future direction or not is determined. When a prediction direction is not a future direction in step S809, reference picture index information in a past direction is decoded in step S810. In step S811, MVD (Motion Vector Difference) information in a past direction is decoded. In step S812, MVP (Motion Vector Predictor) information in a past direction is decoded. When a prediction direction is a future direction or a bidirectional direction in step S809 or when step S812 ends, whether a prediction direction is a past direction or not is determined in step S813. When a prediction direction is not a past direction in step S813, reference picture index information in a future direction is decoded in step S814. In step S815, MVD information in a future direction is decoded. In step S816, this flow chart is finished after decoding MVP information in a future direction. When a prediction mode is an intra prediction mode in step S804, this flow chart is finished after decoding intra prediction mode information in step S1317.

The following embodiment will describe a method of deriving candidate motion information for inter prediction of a current block in a MERGE candidate search unit 204, 704 and an AMVP candidate research unit 206, 706 of a prediction unit of an image encoding device and an image decoding device. Candidate motion information is immediately determined as motion information of a current block in a MERGE candidate search unit and is used as a predictor for transmitting the optimal motion information of a current block in an AMVP candidate search unit.

Figure 9:
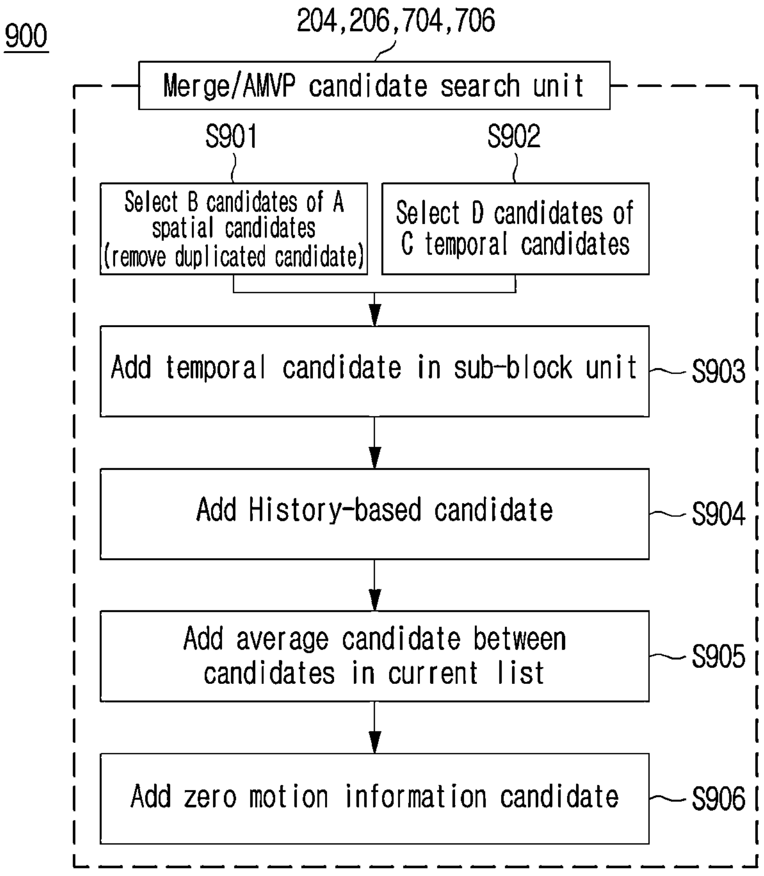
FIG. 9 is a flow chart for describing a method of configuring a MERGE/AMVP candidate list according to this embodiment.

FIG. 9 is a flow chart showing a method of deriving candidate motion information of a MERGE/AMVP mode. In this flow chart, a method of deriving candidate motion information of a MERGE mode and an AMVP mode is shown in the same flow chart, but some candidates may not be used per each mode. Accordingly, candidate motion information derived per mode may be different and the number of derived candidate motion information may be also different. For example, a MERGE mode may select 4(B) candidates of 5(A) spatial candidates and an AMVP mode may select only 2(B) candidates of 4(A) spatial candidates. In step S901, S902, A, B, C, D (A, B, C, D are an integer equal to or greater than 1) mean the number of spatial candidates, the number of selected spatial candidates, the number of temporal candidates and the number of selected temporal candidates, respectively.

A description of step S901 is the same as a description of the above-described step S305, S401. But, a position of surrounding blocks for a spatial candidate may be different. In addition, a surrounding block for a spatial candidate may belong to at least one of a first group, a second group or a third group. In this case, a first group may include at least one of a left block ($A_1$) or a bottom-left block ($A_4$) of a current block, a second group may include at least one of a top block ($A_2$) or a top-right block ($A_3$) of a current block and a third group may include at least one of a top-left block ($A_5$) of a current block, a block adjacent to the bottom of a top-left block or a block adjacent to the left of a top-left block.

A description of step S902 is the same as the description of the above-described step S306, S402. Likewise, a position of blocks for a temporal candidate may be different.

In step S903, a temporal candidate in a unit of a sub-block is added. But, when a temporal candidate in a unit of a sub-block is added in an AMVP candidate list, only candidate motion information of one arbitrary sub-block should be used as a predictor according to the above-described method of deriving a motion vector of an AMVP mode, but in some cases, candidate motion information of two or more sub-blocks may be used as a predictor. The contents of this step will be described in detail in the following embodiment 1.

In step S904, a History-based candidate is added. The contents of this step will be described in detail in the following embodiment 2.

In step S905, an average candidate between candidate motion information of a merge/AMVP list is added. The contents of this step will be described in detail in the following embodiment 3.

After step S905, when candidate motion information of a Merge/AMVP list does not reach the maximum number, this flow chart is finished after the maximum number is filled by adding zero motion information in step S906 and a candidate motion information list for each mode is configured. Candidate motion information described in this embodiment may be utilized in a variety of prediction modes except for a Merge/AMVP mode. In addition, in FIG. 9, a candidate list does not limit an order of added candidates. For example, a temporal candidate in a unit of a sub-block may be added to a candidate list in preference to a spatial candidate. Alternatively, an average candidate may be added to a candidate list in preference to a History-based candidate. In this specification, a candidate motion information list, a candidate motion information set, a motion information candidate group and a candidate list may be understood to have the same meaning.

In this embodiment, a method of deriving a temporal candidate and a temporal candidate in a unit of a sub-block in step S902, S903 of FIG. 9 will be described in detail. A temporal candidate means a temporal candidate in a unit of a block and may be distinguished from a temporal candidate in a unit of a sub-block. In this case, a sub-block is obtained by dividing a block to be currently encoded or decoded (hereinafter, a current block) into blocks of an arbitrary N×M (N, M≥0) size, and means a unit of a basic block for deriving motion information of a current block. A sub-block may have a size which is preset in an encoder and/or a decoder. For example, a sub-block may have a square shape having a fixed size such as 4×4 or 8×8. But, it is not limited thereto, and a shape of a sub-block may be non-square and at least one of a width and a height of a sub-block may be greater than 8. There may be a limit that a temporal candidate in a unit of a sub-block is added to a candidate list only when a current block is greater than N×M. For example, when N and M are 8, respectively, a temporal candidate in a unit of a sub-block may be added to a candidate list when a width and a height of a current block is greater than 8, respectively.

Figure 10:
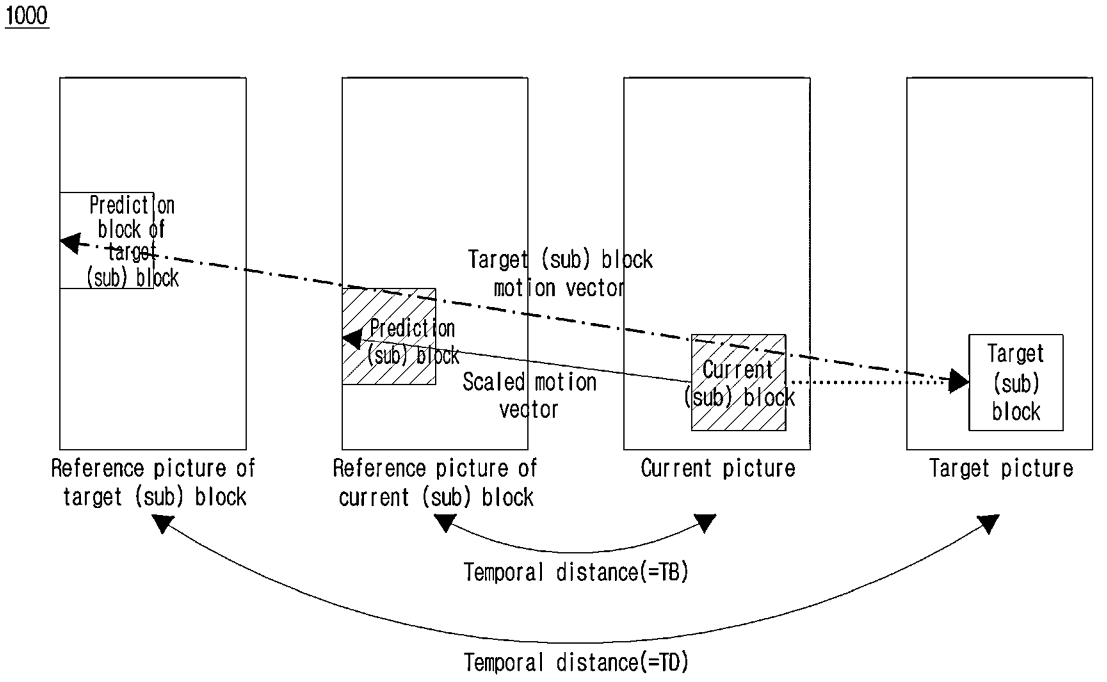
FIG. 10 is a diagram for describing a method of deriving temporal candidate motion information according to this embodiment.

FIG. 10 is a basic conceptual diagram for describing this embodiment. one current (sub) block of a current picture is shown in FIG. 10. A target (sub) block for a corresponding (sub) block is searched in a target picture. In this case, information on a target picture and a target (sub) block may be transmitted in a unit of a higher header or a current block, respectively and a target picture and a target (sub) block may be designated under the same conditions in an image encoding device and an image decoding device. After a target picture and a target (sub) block of a current (sub) block is determined, motion information of a current (sub) block is derived by using motion information of a target (sub) block.

Concretely, each sub-block of a current block has a corresponding relationship with each sub-block of a target block. A temporal candidate in a unit of a sub-block may have motion information per sub-block in a current block and motion information of each sub-block may be derived by using motion information of a sub-block with a corresponding relationship in a target block. But, there may be a case in which motion information of a sub-block with the corresponding relationship is unavailable. In this case, motion information of a corresponding sub-block may be set as default motion information. In this case, default motion information may mean motion information of a surrounding sub-block which is adjacent to a corresponding sub-block in a horizontal direction or in a vertical direction. Alternatively, default motion information may mean motion information of a sub-block including a central sample of a target block. But, it is not limited thereto, and default motion information may mean motion information of a sub-block including any one of n corner samples of a target block. n may be 1, 2, 3, or 4. Alternatively, among a sub-block including a central sample and/or sub-blocks including n corner samples, a sub-block having available motion information may be searched according to a predetermined priority and motion information of a sub-block which is searched first may be set as default motion information.

On the other hand, whether the above-described default motion information is available may be preemptively determined. As a result of a determination, when default motion information is unavailable, a process in which motion information of a temporal candidate in a unit of a sub-block is derived and is added to a candidate list may be omitted. In other words, only when default motion information is available, a temporal candidate in a unit of a sub-block may be derived and may be added to a candidate list.

On the other hand, a motion vector of motion information may mean a scaled motion vector. A temporal distance between a target picture and a reference picture of a target (sub) block is determined as TD, a temporal distance between a current picture and a reference picture of a current (sub) block is determined as TB and a motion vector (MV) of a target (sub) block is scaled by using Equation 2. A scaled motion vector ($MV_{scale}$) may be used when indicating a prediction (sub) block of a current (sub) block in a reference picture or may be used as a motion vector of a temporal candidate or a temporal candidate in a unit of a sub-block for a current (sub) block. But, variable MV used in Equation 2 when deriving a scaled motion vector means a motion vector of a target (sub) block and $MV_{scale}$ means a scaled motion vector of a current (sub) block.

In addition, reference picture information of a current (sub) block may be designated under the same conditions by an image encoding device and an image decoding device and reference picture information of a current (sub) block may be also transmitted in a unit of a current (sub) block.

A method in which a target (sub) block of a current (sub) block is determined under the same conditions in an image encoding device and an image decoding device will be described below in more detail. A target (sub) block of a current (sub) block may be indicated by using one of candidate motion information in a Merge/AMVP candidate list. In more detail, after figuring out a prediction mode of candidate motion information in a candidate list, it may be determined by giving priority to a prediction mode. For example, a target (sub) block may be indicated by selecting one of motion information in a candidate list according to a priority of an AMVP mode, a MERGE mode, SKIP mode.

In addition, simply, a target (sub) block may be indicated by unconditionally selecting the first candidate motion information in a candidate list. For candidate motion information coded by the same prediction mode, a variety of priority conditions, such as selecting according to a priority in a candidate list, may be used. But, when a reference picture of candidate motion information and a target picture are different, corresponding candidate motion information may be excluded. Alternatively, it may be determined as a target (sub) block in a target picture corresponding to the same position as a current (sub) block.

Concretely, a target (sub) block may be determined as a block at a position shifted by a predetermined temporal motion vector (temporal MV) from a position of a current (sub) block. In this case, a temporal motion vector may be set as a motion vector of a surrounding block which is spatially adjacent to a current block. The surrounding block may be any one of a left, top, bottom-left, top-right or top-left block of a current block. Alternatively, a temporal motion vector may be derived by using only a surrounding block at a fixed position which is pre-promised in an encoding/decoding device. For example, a surrounding block at the fixed position may be a left block (A1) of a current block. Alternatively, a surrounding block at the fixed position may be a top block (A2) of a current block. Alternatively, a surrounding block at the fixed position may be a bottom-left block (A3) of a current block. Alternatively, a surrounding block at the fixed position may be a top-right block (A4) of a current block. Alternatively, a surrounding block at the fixed position may be a top-left (A5) of a current block.

The setting may be performed only when a reference picture of a surrounding block and a target picture are the same (e.g., when a POC difference between a reference picture and a target picture is 0). When a reference picture of a surrounding block and a target picture are not the same, a temporal motion vector may be set as (0, 0).

The set temporal motion vector may be rounded based on at least one of a predetermined offset or a shift value. In this case, an offset may be derived based on a shift value and a shift value may include at least one of a shift value in a right direction (rightShift) or a shift value in a left direction (leftShift). A shift value may be an integer which is preset in an encoding/decoding device. For example, rightShift may be set as 4 and leftShift may be set as 0, respectively. For example, rounding of a temporal motion vector may be performed as in the following Equation 3.

$$\text{offset} = (rightShift == 0)\,?\,0 : (1 << (rightShift - 1)) \quad \text{[Equation 3]}$$

$$mvX_R[0] = ((mvX[0] + offset - (mvX[0] >= 0)) >> rightShift) << leftShift$$

$$mvX_R[1] = ((mvX[1] + offset - (mvX[1] >= 0)) >> rightShift) << leftShift$$

For a more detailed description, two conditions are assumed. First, motion information is stored and kept in a unit of a 4×4 sub-block in a picture which is already coded (hereinafter, boundaries in a unit of a 4×4 sub-block for storing motion information match boundaries of a target (sub) block in a target picture). Second, a size of a sub-block in a current block is set as 4×4. A size of the above-described blocks may be variously determined. In this case, when a position of a target (sub) block in a target picture corresponding to the same position in a current (sub) block or a position of a target (sub) block indicated in a target picture by using motion information in a Merge/AMVP candidate list of a current (sub) block is determined, a base coordinate of each sub-block may not correspond to a base coordinate of a current (sub) block in a unit of a 4×4 sub-block where motion information is stored in a target picture. For example, a mismatch may occur such as a coordinate of a top-left pixel of a current (sub) block is (12, 12) and a top-left coordinate of a target (sub) block may be (8, 8). It is an inevitable phenomenon which is generated because a block partitioning structure of a target picture is different from a current picture.

Figure 11:
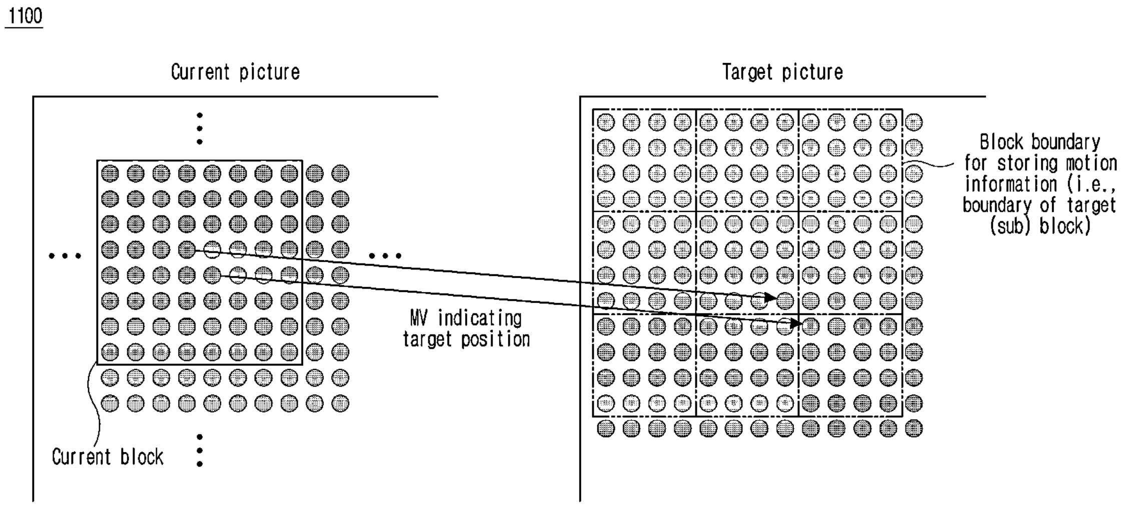
FIG. 11 is a diagram for describing a first method in which a target block is determined in a target picture when temporal candidate motion information according to this embodiment is derived.

FIG. 11 is an illustrative diagram for describing a method in which a target block is determined when temporal candidate motion information is derived in a unit of a current block, not in a unit of a sub-block. After a motion vector (a motion vector derived from the same position (i.e., a zero motion) or a candidate list) indicating a target position from a base coordinate of a current block is determined, a point indicated by a corresponding motion vector is found in a target picture. Motion information of a 4×4 target sub-block including a corresponding target point in a target picture may be used when deriving a scaled motion vector of a current block. Alternatively, when the target points indicated by each of a plurality of base coordinates for a current block indicate the same 4×4 target sub-block, motion information of a corresponding target sub-block is used when deriving a scaled motion vector of a current block. However, they indicate a plurality of 4×4 target sub-blocks, average motion information of each target sub-block may be used to derive a scaled motion vector of a current block. For a target position, two target positions in a central region of a current block may be used as in an example of FIG. 11, but more than two may be also used and any pixel position in other current block may be used. Naturally, more motion information for calculating average motion information may be two or more. Alternatively, a final prediction block may be generated by generating a plurality of prediction blocks after deriving a plurality of scaled motion vectors by using each of a plurality of target sub-blocks and performing weighted sum for corresponding prediction blocks.

Figure 12:
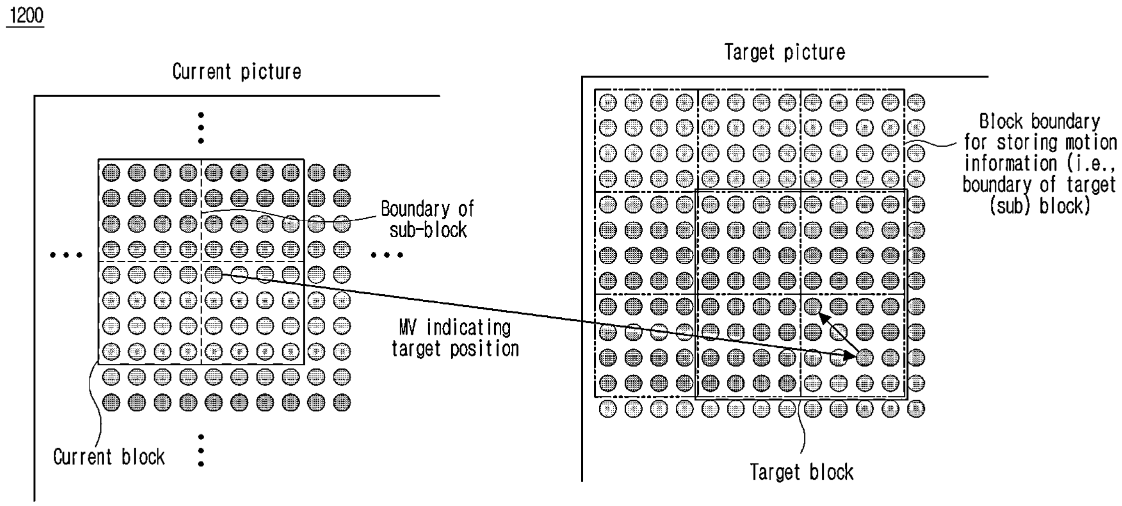
FIG. 12 is a diagram for describing a second method in which a target block is determined in a target picture when temporal candidate motion information according to this embodiment is derived.
Figure 13:
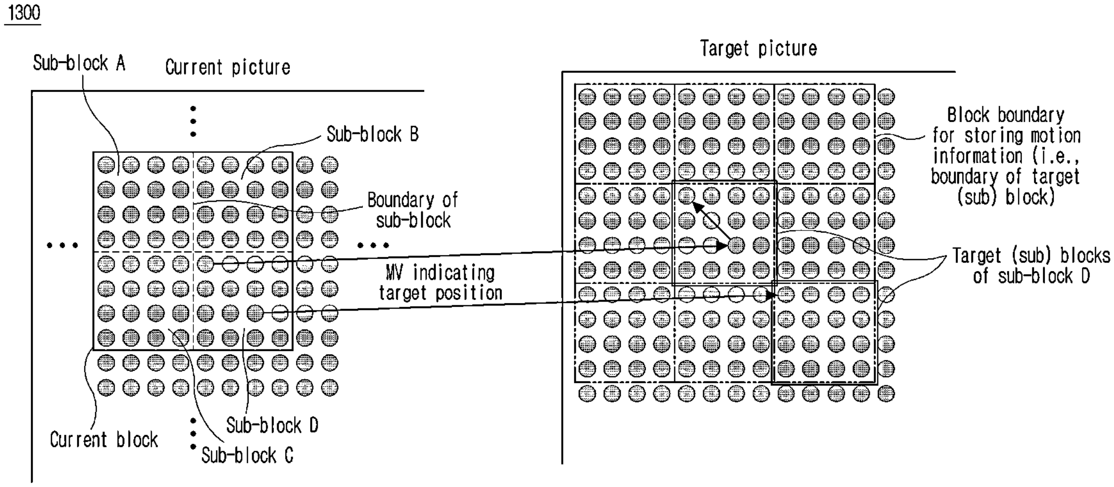
FIG. 13 is a diagram for describing a third method in which a target block is determined in a target picture when temporal candidate motion information according to this embodiment is derived.

FIGS. 12 and 13 are an illustrative diagram for describing a method in which a target block is determined when temporal candidate motion information is derived in a unit of a sub-block in a current block. FIG. 12 is an illustrative diagram for a case in which there is one base position in a unit of a sub-block and FIG. 13 is an illustrative diagram for a case in which a plurality of base positions are used in a unit of a sub-block.

FIG. 12 illustrated that a base position in a unit of a sub-block is a top-left pixel position of a sub-block. After determining a target block having the same size as a current block based on a 4×4 target sub-block of a target picture found based on a base coordinate of a bottom-right sub-block of a current block, each scaled motion vector of a current sub-block may be derived by using motion information of target sub-blocks between collocated sub-blocks of a target block and a current block. Alternatively, after figuring out a target position of a target picture through a motion vector indicating a target position at a base coordinate of a sub-block, motion information of a 4×4 target sub-block including the target position may be used when deriving a scaled motion vector of a current sub-block.

FIG. 13 is an illustrative diagram for describing a method in which a scaled motion vector is derived by using a plurality of target sub-blocks per current sub-block. When a scaled motion vector of sub-block D is derived as in an example of FIG. 13, a target position in a target picture is figured out based on a plurality of base coordinates in sub-block D. Subsequently, when a target position indicates the same target sub-block, a scaled motion vector of a current sub-block may be derived by using motion information of a corresponding target sub-block, but when target positions indicate a different target sub-block as in FIG. 13, a scaled motion vector of a current sub-block may be derived by calculating average motion information of each target sub-block. In addition, after separately deriving a different scaled motion vector by using motion information of each target sub-block, a final prediction block may be generated by generating a prediction sub-block respectively and performing weighted sum for each prediction sub-block. Other sub-blocks in a current block (sub-block A, B, C) may also generate a prediction sub-block in the above-described method.

In this embodiment, step 904 of FIG. 9 will be described in detail. For a History-based candidate (hereinafter, referred to as ‘a reconstructed information-based candidate’), there is a reconstructed information-based motion candidate storage buffer (hereinafter, referred to as ‘a H buffer’) for storing motion information encoded/decoded before a current block in a unit of a sequence, a picture or a slice. A corresponding buffer manages coded motion information while updating a butter by a FIFO (First-in First-out) method. A H buffer may be initialized in a unit of a CTU, a CUT row, a slice or a picture, and when a current block is predicted and coded by motion information, corresponding motion information is updated in a H buffer. Motion information stored in a H buffer may be used as a Merge/AMVP candidate in step S904 of FIG. 9. When candidate motion information of a H buffer is added to a candidate list, it may be added in an order of motion information which is most recently updated in a H buffer and vice versa. Alternatively, according to an inter prediction mode, an order of motion information in a H buffer to be added to a candidate list may be determined.

Concretely, in an example, through a redundance check between a H buffer and a candidate list, motion information of a H buffer may be added to a candidate list. In case of a merge mode, a redundance check may be performed for some of merge candidates of a candidate list and some of motion information of a H buffer. Some of a candidate list may include a left block and a top block of spatial merge candidates. But, it is not limited thereto, and it may be limited to any one block of spatial merge candidates or may further include at least one of a bottom-left block, a top-right block, a top-left block or a temporal merge candidate. On the other hand, some of a H buffer may mean m motion information which is most recently added to a H buffer. In this case, m may be 1, 2, 3 or more and may be a fixed value which is pre-promised in an encoding/decoding device. It is assumed that 5 motion information is stored in a H buffer and 1 to 5 indexes are assigned to each motion information. As an index is larger, it means motion information which is stored later. In this case, a redundance check between motion information having index 5, 4, and 3 and a merge candidate of the candidate list may be performed. Alternatively, a redundance check between motion information having index 5 and 4 and a merge candidate of the candidate list may be performed. Alternatively, excluding motion information of index 5 which is added last, a redundance check between motion information having index 4 and 3 and a merge candidate of the candidate list may be performed. As a result of a redundance check, when there is even one same motion information, the motion information of a H buffer may not be added to a candidate list. On the other hand, when there is no same motion information, the motion information of a H buffer may be added to a last position of a candidate list. In this case, it may be added to a candidate list in an order of motion information which is recently stored in a H buffer (i.e., in an order from a large index to a small index). But, there may be a limit that motion information which is stored last in a H buffer (motion information with the largest index) is not added to a candidate list.

On the other hand, in case of an AMVP mode, it may be added to a candidate list in an order of motion information which is stored first in a H buffer (in particular, a motion vector). In other words, motion information having a small index among motion information stored in a H buffer may be added to a candidate list before motion information having a large index.

On the other hand, a motion vector stored in a H buffer may be equally added to a candidate list and a motion vector to which the above-described rounding process is applied may be added to a candidate list. Rounding is to control accuracy of candidate motion information to correspond to accuracy of a motion vector of a current block. In reference to Equation 3, $mvX_R$ may mean a motion vector to which a rounding process is applied and mvX may mean a motion vector stored in a H buffer, respectively. In addition, at least one of rightShift or leftShift, a shift value, may be determined by considering accuracy (or resolution) of a motion vector. For example, when accuracy of a motion vector is a ¼ sample, a shift value may be determined to be 2 and when accuracy of a motion vector is a ½ sample, a shift value may be determined to be 3. When accuracy of a motion vector is 1 sample, a shift value may be determined to be 4 and when accuracy of a motion vector is 4 samples, a shift value may be determined to be 6. RightShift and leftShift may be set to be the same value.

When motion information stored in a H buffer is added to a Merge/AMVP candidate list, the number of motion information which may be added may be limited. For example, up to the maximum number of candidates of a Merge/AMVP candidate list may be filled by using motion information in a H buffer, but only up to (the maximum number of candidates—1) may be filled.

The number of candidate motion information stored in a H buffer may be determined under the same condition in an image encoding device and an image decoding device and may be transmitted to an image decoding device through a higher header.

Concretely, in case of a Merge candidate list, only up to (the maximum number of candidates—n) may be filled by using motion information of a H buffer. In this case, n may be an integer such as 1, 2, or more. The maximum number of candidates may be determined to be the fixed number which is predefined in an encoding/decoding device (e.g., 5, 6, 7, 8) or may be variably determined based on information signaled to indicate the maximum number of candidates. On the other hand, in case of a AMVP candidate list, up to the maximum number of candidates may be filled by using motion information of a H buffer. The maximum number of candidates of an AMVP candidate list may be 2, 3, 4, or more. In case of an AMVP candidate list, the maximum number of candidates may not be variable unlike a Merge candidate list.

Figure 14:
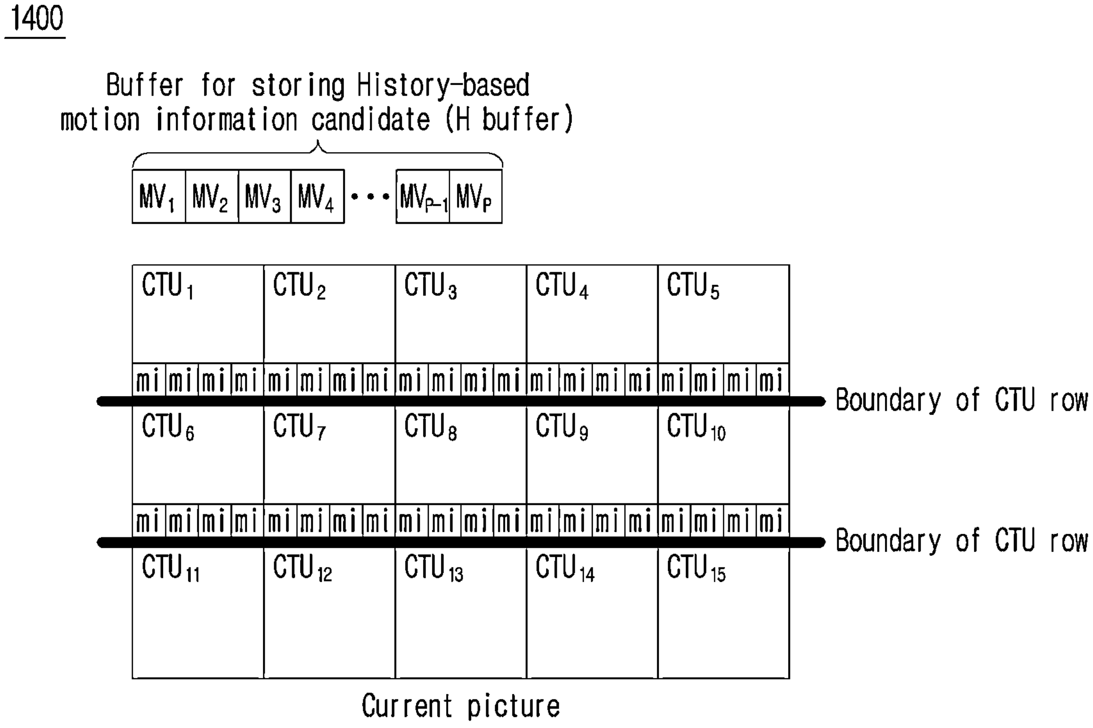
FIG. 14 is a diagram for describing a first method of deriving History-based candidate motion information according to this embodiment.

A first method of updating a H buffer refers to FIG. 14. A H buffer updates motion information in a coding order of a block in a first CTU row. For a second CTU row, updating motion information in a coding order of a block is the same, but a H buffer may be updated by additionally considering motion information stored in reconstructed blocks adjacent to a current CTU row in a top CTU. mi in a CTU is an abbreviation for Motion Information in FIG. 14 and is reconstructed motion information stored in bottom blocks in remaining CTU rows excluding a last CTU row. Up to P (P is an integer equal to or greater than 1) motion information may be updated in a H buffer and an update method may be different according to a unit that a H buffer is initialized. In this embodiment, a method of updating a H buffer will be described according to a case where it is initialized in a unit of a CTU and a case where it is initialized in a unit of a CTU row. First, each CTU in a second CTU row may initialize a H buffer by using mi before starting coding when a H buffer is initialized in a unit of a CTU. In this case, initialization means that any motion information is re-updated in a H buffer which is completely emptied. For example, a H buffer may be initialized by using 4 mi on the bottom of $CTU_3$ before coding $CTU_8$. An order of updating mi may be also variously determined. It may be updated from mi which is currently at a left position or conversely from mi which is at a right position. When a H buffer is initialized in a unit of a CTU row, only the first CTU in each CTU row may be updated by using mi in a top CTU. In addition, a H buffer may be entirely emptied and initialized in a unit of each initialization. On the other hand, when motion information which is most recently encoded/decoded is the same as motion information which is pre-stored in a H buffer, most recent motion information may not be added to a H buffer. Alternatively, the same motion information as most recent motion information may be removed from a H buffer and most recent motion information may be stored in a H buffer. In this case, most recent motion information may be stored in the last position of a H buffer.

Figures 15, 16:
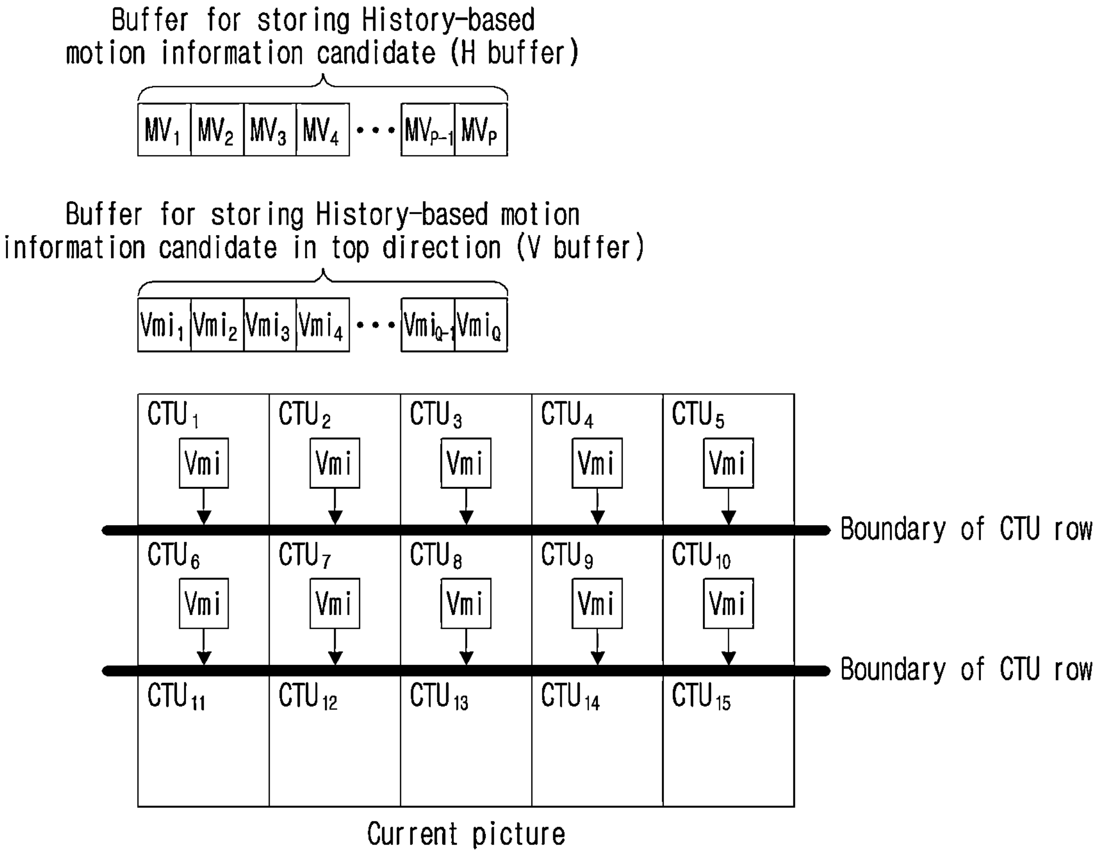
FIG. 15 is a diagram for describing a second method of deriving History-based candidate motion information according to this embodiment.
FIG. 16 is a diagram for describing a first method of deriving average candidate motion information according to this embodiment.

A second method of updating a H buffer refers to FIG. 15. A second method has an additional motion candidate storage buffer excluding a H buffer. This buffer is a buffer (hereinafter, referred to as 'a V buffer') which stores reconstructed motion information (hereinafter, referred to as 'Vmi') of a top CTU. This V buffer may be used when the above-described H buffer is initialized in a unit of a CTU row or a slice and a V buffer may be initialized in a unit of a CTU row. Vmi in a V buffer should be updated for a bottom CTU row in other CTU rows excluding a last CTU row in a current picture. In this case, up to Q (Q is an integer equal to or greater than 1) motion information may be updated in a V buffer and motion information corresponding to Vmi may be determined by a variety of methods. For example, Vmi may be reconstructed motion information of a block including a center coordinate of a CTU or may be most recent motion information included in a H buffer when coding a block including a center coordinate in a top CTU. The number of Vmi to be updated in one CTU may be one or more and updated Vmi is used when updating a H buffer of a bottom CTU. Vmi stored in a V buffer of a top CTU row is updated in a current H buffer per each CTU in remaining CTU rows excluding the first CTU row. When a plurality of Vmi are stored in a V buffer of a top CTU row, motion information which is updated first may be taken out and updated first in a H buffer and vice versa. Vmi in a top CTU stored in a V buffer may be updated in a H buffer at various times such as before coding each CTU or before coding blocks bordering a top CTU in each CTU. In addition, Vmi in a top-left CTU, a top-right CTU as well as a top CTU may be also updated in a H buffer.

Candidate motion information of the above-described V buffer may be independently added to a process of deriving a MERGE/AMVP candidate list of FIG. 9. When V buffer candidate motion information is added, a corresponding priority in a MERGE/AMVP candidate list may be variously determined. For example, when there is valid motion information in a V buffer after step S904, corresponding candidate motion information may be added between step S904 and step S905.

In this embodiment, step 905 of FIG. 9 will be described in detail. When motion information filled in a Merge/AMVP candidate list through steps S901~S904 is equal to or less than 1, this step is omitted. When motion information filled in a Merge/AMVP candidate list is equal to or greater than 2, a candidate list may be filled by generating average candidate motion information between candidates. A motion vector of average candidate motion information is derived per each prediction direction of motion information (List 0 or List 1), which means a motion vector generated by averaging a motion vector in the same direction stored in a candidate list. When reference picture index information of motion information used in averaging is different in deriving average candidate motion information, reference picture information of motion information with a high priority may be determined as reference picture index information of average candidate motion information. Alternatively, reference picture information of motion information with a low priority may be determined as reference picture index information of average candidate motion information.

When average candidate motion information is added to a Merge/AMVP candidate list, generated average candidate motion information may be used when generating another average candidate motion information. To describe this example, FIG. 16 is referred to. In FIG. 16, a left table is a Merge/AMVP candidate list before step S905 of FIG. 9 and a right table is a Merge/AMVP candidate list after step S905 of FIG. 9. In a left table, candidate motion information corresponding to No. 0, 1 is filled in 2 candidate lists. Average candidate motion information corresponding to No. 2 may be generated by using this 2 motion information. In an example of FIG. 16, motion information in a List 0 direction of No. 2 candidate is filled by averaging a motion vector in a List 0 direction of No. 0 candidate (1,1), motion information with a reference picture index of 1, and a motion vector in a List 0 direction of No. 1 candidate (3,−1), motion information with a reference picture index of 0. For a List 1 direction, there is no motion information of No. 0 candidate. In this case, motion information in a List 1 direction of No. 2 candidate is filled by bringing motion information of No. 1 candidate as it is that a candidate in a List 1 direction exists. When there is no motion information in any one direction in deriving average candidate motion information, a corresponding direction is not derived separately. Additional average candidate motion information may be generated by using average candidate motion information of No. 2 which is derived in this way. Average candidate motion information of No. 3 is average candidate motion information of No. 0,2 candidate and average candidate motion information of No. 4 is average candidate motion information of No. 1,2 candidate. A method of generating average candidate motion information is the same as described above.

Figures 17, 18:
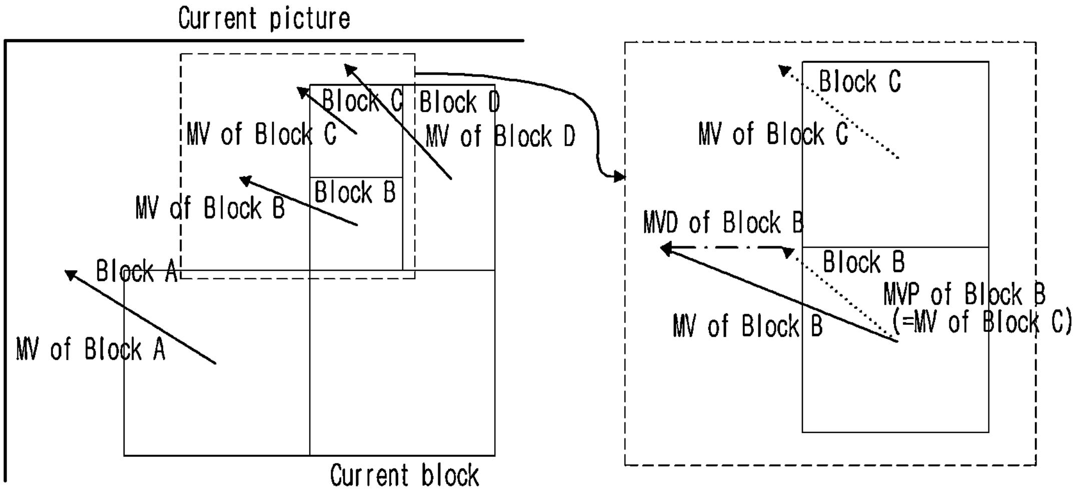
FIG. 17 is a diagram for describing a second method of deriving average candidate motion information according to this embodiment.
FIG. 18 is an illustrative diagram for describing a method of predicting MVD information.

There may be overlapping candidate motion information in a Merge/AMVP candidate list before step S905 of FIG. 9. Average candidate motion information may be used to remove such duplicated candidate motion information. FIG. 17 shows such an example. A left and right table are the same as described in FIG. 16. In a left table, candidate motion information of No. 0,2 is completely the same. In this case, candidate motion information of No. 2 with a low priority may be replaced with average candidate motion information. In an example of FIG. 17, the existing candidate motion information of No. 2 is replaced with average candidate motion information of No. 0,1 and No. 3 fills a candidate list with average candidate motion information of No. 0,2 and No. 4 fills a candidate list with average candidate motion information of No. 1,2.

The number which may fill a Merge/AMVP candidate list with average candidate motion information may be also limited. For example, up to the maximum number of candidates of a Merge/AMVP candidate list may be filled by using average candidate motion information, but only up to (the maximum number of a candidate list—1) may be filled. In addition, candidate motion information used when calculating average candidate motion information may be 3 or more and Median information, not information averaging 3 or more candidate motion information, may be determined as average candidate motion information.

In the following embodiment, a method of effectively transmitting a motion vector of motion information will be described. In the above-described AMVP mode, motion vector difference (MVD in FIG. 5,8) information obtained by subtracting a motion vector predictor (MVP in FIG. 5,8) information from a motion vector of a current block determined in an image encoding device is transmitted to an image decoding device. In addition, in the above-described MERGE mode, motion information of a selected merge candidate is set as motion information of a current block without transmitting MVD information. But, if additional MVD information is transmitted in a MERGE mode, prediction efficiency may be improved by increasing accuracy of motion information. In this case, MVD information is generally known as random information that a certain pattern may not be found. But, when a specific situation is premised, such MVD information may be also changed into predictable information.

The above-described specific situation will be described by using FIG. 18. In FIG. 18, there is a current block to be coded in a current picture. There are reconstructed blocks A~D around a current block. In this case, when it is assumed that a specific object penetrates a current block while performing a uniformly accelerated motion from a top direction to a bottom direction, it may be predicted that a motion vector will increase in a certain size through block C, block B, a current block. Alternatively, the same principle may be also considered to be applied to a uniformly decelerated motion. Going back here, if a motion vector increases in a certain size when a specific object penetrates a current block while performing a uniformly accelerated motion, a motion vector indicating a point where MVD of a corresponding block is added to a motion vector of a surrounding block is highly likely to be determined as the optimal motion information in a current block. FIG. 18 is observed in detail from a viewpoint of an AMVP mode on the premise of the above-described situation. If MVD information of a difference between an optimal motion vector of block B and a motion vector of block C (that is, MVP of block B) is similar to MVD information of a difference between an optimal motion vector of a current block and MVP of block B, motion information may be encoded more efficiently using it. Herein, the motion vector of block C is used as MVP information of block B and a current block uses a motion vector of block B as MVP. From a viewpoint of a MERGE mode, more effective coding may be performed by additionally transmitting MVD information.

In the following embodiment, a method in which such MVD information is effectively predicted and encoded/decoded will be described in detail.

FIG. 19 is a candidate list example table of a MERGE candidate search unit and an AMVP candidate search unit in a prediction unit in an image encoding device and an image decoding device.

A left table of FIG. 19 is a Merge/AMVP candidate list which may be generated after step S307 of FIG. 3 or step S403 of FIG. 4. A right table is a candidate list after generating a new motion candidate using motion information of which MVD is not (0,0) among motion information which already exists in a Merge/AMVP candidate list. New candidate motion information is generated by adding MVD and a motion vector of motion information of which MVD is not (0,0) and is filled in a candidate list. Candidate motion information of bidirectional prediction may generate new candidate motion information by the above-described method when even one MVD is not (0,0). As such methods do not need new encoding, decoding information, motion information may be coded by using the above-described flow chart in FIGS. 5 and 8. Alternatively, a motion vector adding a motion vector in a Merge/AMVP candidate list and that MVD may be determined as a final candidate motion vector without generating such new candidate motion information and in this case, information indicating that a candidate motion vector is obtained by adding MVD and a motion vector in current candidate motion information may be additionally transmitted.

FIG. 20 is an example table for describing a method in which MVD of a reconstructed region is used as MVD of a current block by additionally generating a Merge/AMVP candidate list for MVD, not a Merge/AMVP candidate list for a motion vector. A left table of FIG. 20 is an example table that a Merge/AMVP candidate list for a motion vector is completed and a right table is a MVD Merge/AMVP candidate list made by using MVD information in a Merge/AMVP candidate list for a motion vector. No. 0,1 MVD of a right table are determined by using MVD in candidate motion information of No. 0,1 of a left table and No. 2,3 MVD of a right table are determined by using MVD in candidate motion information of NO. 4,5. Additionally, an image encoding device and an image decoding device may add another candidate MVD information to a MVD Merge/AMVP candidate list by using reconstructed motion information. MVD information may be additionally transmitted in a Merge mode by using MVD Merge/AMVP candidate list information derived in this way or may be merged without transmitting MVD information in an AMVP mode. An encoding/decoding flow of detailed motion information refers to FIGS. 21 and 22.

Figure 21:
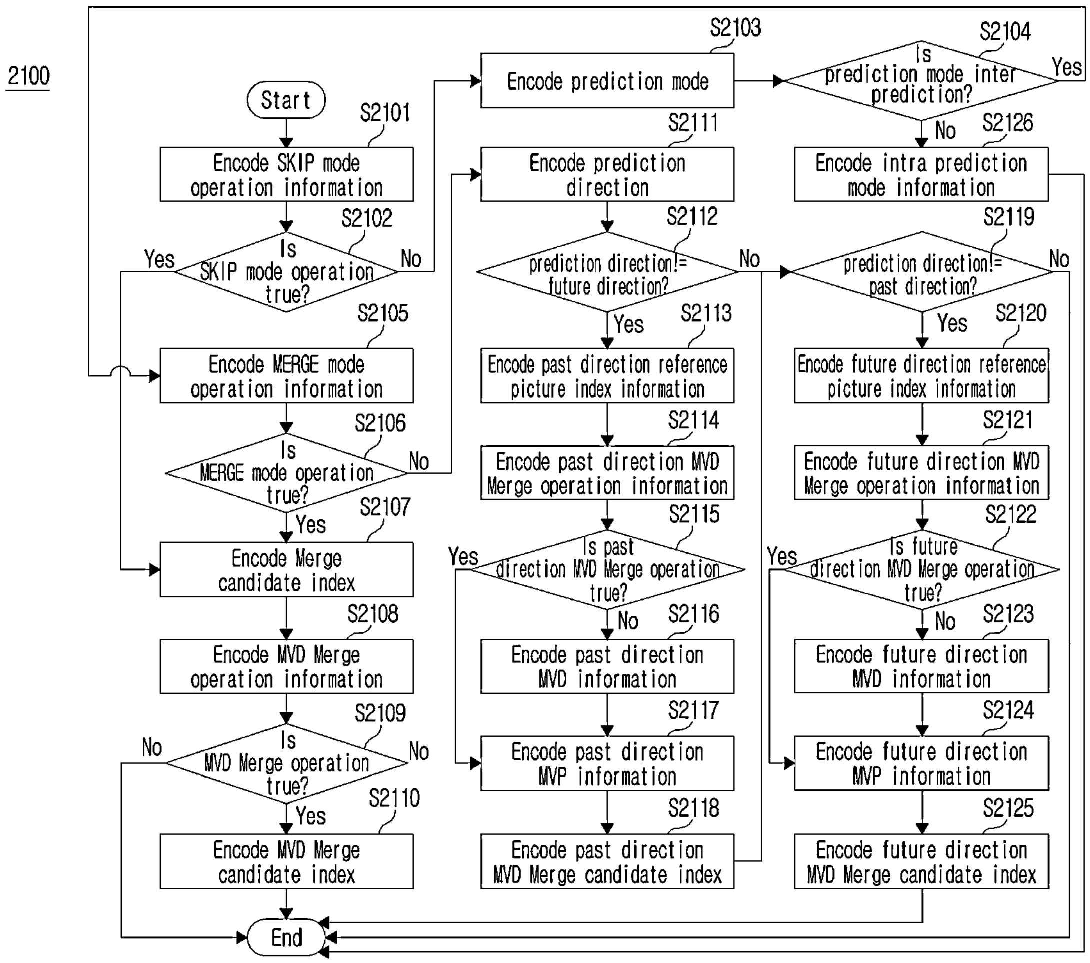
FIG. 21 is a flow chart showing a flow of encoding prediction information including MVD candidate motion information according to an embodiment of the present disclosure.

FIG. 21 is a flow chart encoding motion information using MVD Merge/AMVP candidate list information. A description in steps S2101~S2107 is the same as a description in steps S501~S507 of FIG. 5. In step S2108, operation information indicating whether MVD merge is performed or not is encoded. MVD Merge may mean that a final motion vector is derived by adding predetermined MVD to a motion vector which is reconstructed through a MERGE mode or an AMVP mode. In step S2109, whether corresponding operation information is true or false is determined, and if corresponding operation information is false, this flow chart is finished and if corresponding operation information is true, candidate index information indicating which MVD information in a MVD merge candidate list is added to a current motion vector is encoded and this flow chart is finished. Steps S2111~S2113 are the same as a description in steps S508~S510 of FIG. 5. In step S2114, operation information determining whether MVD in a past direction is transmitted or not is encoded. In step S2115, whether corresponding operation information is true or false is determined and if it is true, it moves to step S2116 and if it is false, it moves to step S2117. A description in steps S2116, S2117 is the same as a description in steps S511, S512 of FIG. 5. In step S2118, candidate index information indicating MVD of motion information in a past direction in a MVD AMVP candidate list is encoded. A description in steps S2119, S2120 is the same as a description in steps S513, S514 of FIG. 5. In step S2121, operation information determining whether MVD in a future direction is transmitted or not is encoded. In step S2122, whether corresponding operation information is true or false is determined and if it is true, it moves to step S2123 and if it is false, it moves to step S2124. In step S2125, candidate index information indicating MVD of motion information in a future direction in a MVD AMVP candidate list is encoded and this flow chart is finished. A description in step S2126 is the same as a description in step S517.

Figure 22:
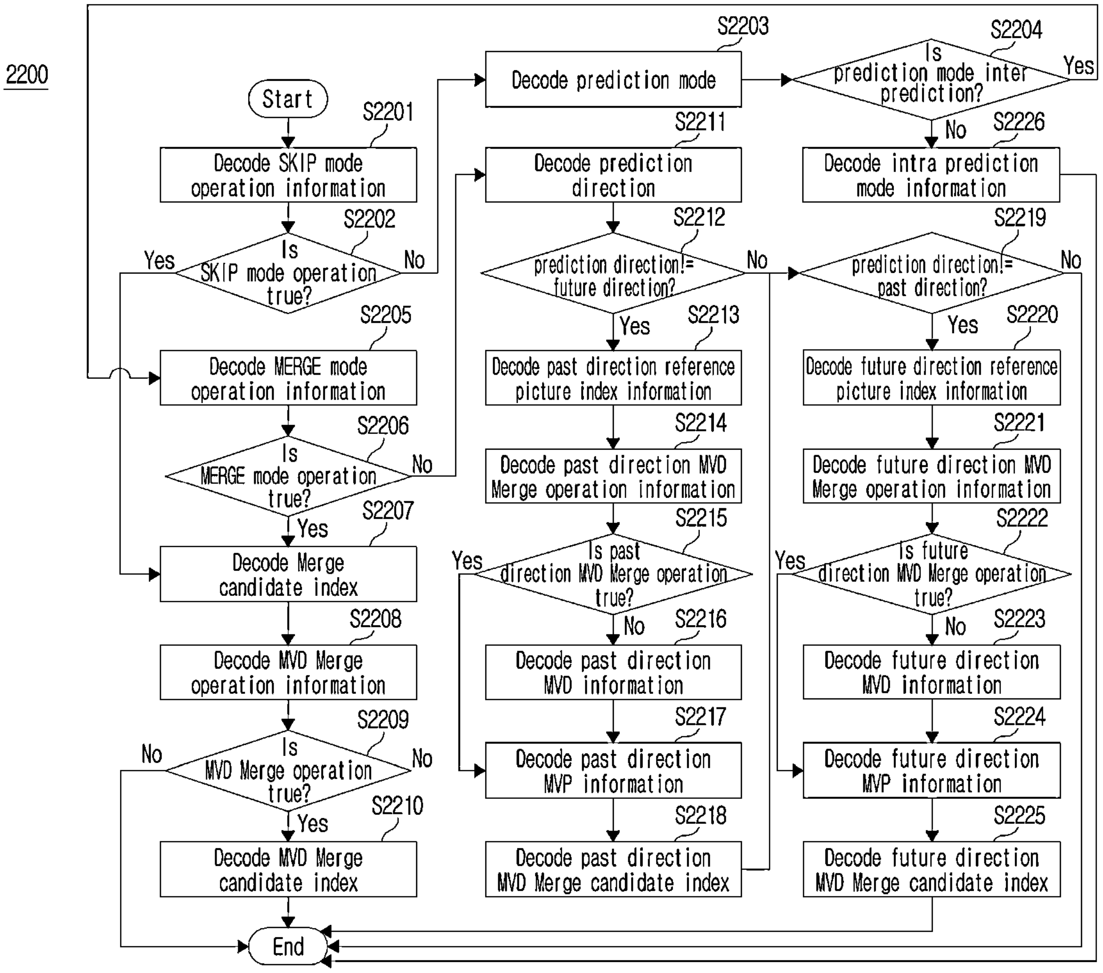
FIG. 22 is a flow chart showing a flow of decoding prediction information including MVD candidate motion information according to an embodiment of the present disclosure.

FIG. 22 is a flow chart decoding motion information using MVD Merge/AMVP candidate list information. A description in steps S2201~S2207 is the same as a description in steps S801~S807 of FIG. 8. In step S2208, operation information indicating whether MVD merge is performed or not is decoded. MVD Merge may mean that a final motion vector is derived by adding predetermined MVD to a motion vector which is reconstructed through a MERGE mode or an AMVP mode. In step S2209, whether corresponding operation information is true or false is determined, and if corresponding operation information is false, this flow chart is finished and if corresponding operation information is true, candidate index information indicating which MVD information in a MVD merge candidate list is added to a current motion vector is decoded and this flow chart is finished. Steps S2211~S2213 are the same as a description in steps S808~S810 of FIG. 8. In step S2214, operation information determining whether MVD in a past direction is transmitted or not is decoded. In step S2215, whether corresponding operation information is true or false is determined and if it is true, it moves to step S2216 and if it is false, it moves to step S2217. A description in steps S2216, S2217 is the same as a description in steps S811, S812 of FIG. 8. In step S2218, candidate index information indicating MVD of motion information in a past direction in a MVD AMVP candidate list is decoded. A description in steps S2219, S2220 is the same as a description in steps S813, S814 of FIG. 8. In step S2221, operation information determining whether MVD in a future direction is transmitted or not is decoded. In step S2222, whether corresponding operation information is true or false is determined and if it is true, it moves to step S2223 and if it is false, it moves to step S2224. In step S2225, candidate index information indicating MVD of motion information in a future direction in a MVD AMVP candidate list is decoded and this flow chart is finished. A description in step S2226 is the same as a description in step S817.

In a Merge mode, a motion vector may be determined by transmitting additional MVD information with motion information indicated by Merge candidate index information and adding additional MVD information to a motion vector of motion information indicated by a Merge candidate index. In this case, a candidate list for a Merge mode may be configured with k merge candidates and in this case, k may be a natural number such as 4,5,6 or more. An index is assigned to each merge candidate and an index has a value of 0 to (k−1). But, when MVD Merge is applied, Merge candidate index information may have only a value of 0 or 1. In other words, when MVD Merge is applied, according to Merge candidate index information, motion information of a current block may be derived from any one of the first merge candidate or the second merge candidate belonging to a candidate list. Additional MVD information may be transmitted in a variety of shapes. MVD may be expressed by direction information such as a top, bottom, left, right, bottom-right diagonal, bottom-left diagonal, top-right diagonal, top-left diagonal direction, etc. and distance information indicating how far it is separated in each direction based on a motion vector of motion information indicated by current Merge candidate index information without transmitting MVD in a vector shape such as (x, y).

Concretely, MVD of a current block may be derived based on an offset vector (offsetMV). MVD may include at least one of MVD(MVD0) in a L0 direction or MVD(MVD1) in a L1 direction and each of MVD0 and MVD1 may be derived by using an offset vector.

An offset vector may be determined based on a length (mvdDistance) and a direction (mvdDirection) of an offset vector. For example, an offset vector (offsetMV) may be determined as in the following Equation 4.

$$offsetMV[x0][y0][0] = (mvdDistance[x0][y0] << 2) * mvdDirection[x0][y0][0]$$ [Equation 4]

$$offsetMV[x0][y0][1] = (mvdDistance[x0][y0] << 2) * mvdDirection[x0][y0][1]$$

In this case, mvdDistance may be determined by considering at least one of a distance index (distance_idx) or a predetermined flag (pic_fpel_mmvd_enabled_flag). A distance index (distance_idx) may mean an index which is encoded to specify a length or a distance of MVD. pic_fpel_mmvd_enabled_flag may indicate whether a motion vector uses integer pixel precision in a merge mode of a current block. For example, when pic_fpel_mmvd_enabled_flag is a first value, a merge mode of a current block uses integer pixel precision. In other words, it may mean that motion vector resolution of a current block is an integer sample (integer-pel). On the other hand, when pic_fpel_mmvd_enabled_flag is a second value, a merge mode of a current block may use decimal pixel precision. In other words, when pic_fpel_mmvd_enabled_flag is a second value, a merge mode of a current block may use integer pixel precision and decimal pixel precision. Alternatively, when pic_fpel_mmvd_enabled_flag is a second value, there may be a limit that a merge mode of a current block uses only decimal pixel precision. As an example of decimal pixel precision, there may be a ½ sample, a ¼ sample, a ⅛ sample, a 1/16 sample, etc. At least one of a distance index (distance_idx) or the above-described flag (pic_fpel_mmvd_enabled_flag) may be encoded in an encoding device and transmitted.

For example, mvdDistance may be determined as in the following Table 1.

TABLE 1

| | MmvdDistance[ x0 ][ y0 ] | |
|---|---|---|
| distance_ idx[ x0 ][ y0 ] | pic_fpel_mmvd_ enabled_flag = = 0 | pic_fpel_mmvd_ enabled_flag = = 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

In addition, mvdDirection may represent a direction of an offset vector and may be determined based on a direction index (direction_idx). In this case, a direction may include at least one of a left, right, top, bottom, top-left, bottom-left, top-right or bottom-right direction. For example, mvdDirection may be determined as in the following Table 2. A direction index (direction_idx) may be encoded in an encoding device and transmitted.

TABLE 2

| direction_ idx[ x0 ][ y0 ] | mvdDirection[ x0 ][ y0 ][0] | mvdDirection[ x0 ][ y0 ][1] |
|---|---|---|
| 0 | +1 | 0 |
| 1 | −1 | 0 |
| 2 | 0 | +1 |
| 3 | 0 | −1 |

In Table 2, mvdDirection [x0][y0][0] may mean a sign of a x-component of MVD and mvdDirection [x0][y0][1] may mean a sign of a y-component of MVD. When direction_idx is 0, a direction of MVD may be determined as a right direction, when direction_idx is 1, a direction of MVD may be determined as a left direction, when direction_idx is 2, a direction of MVD may be determined as a bottom direction and when direction_idx is 3, a direction of MVD may be determined as a top direction, respectively.

On the other hand, MVD may be set the same as the above-determined offset vector. Alternatively, an offset vector may be modified by considering a POC difference (PocDiff) between a reference picture of a current block and a current picture to which a current block belongs and a modified offset vector may be set as MVD. In this case, a current block may be encoded/decoded by bidirectional prediction and a reference picture of the current block may include a first reference picture (a reference picture in a L0 direction) and a second reference picture (a reference picture in a L1 direction). For convenience of description, hereinafter, a POC difference between a first reference picture and a current picture is referred to as PocDiff0 and a POC difference between a second reference picture and a current picture is referred to as PocDiff1.

When PocDiff0 and PocDiff1 are the same, MVD0 and MVD1 of a current block may be equally set as an offset vector, respectively.

In case that PocDiff0 and PocDiff1 are not the same, MVD0 may be equally set as an offset vector when an absolute value of PocDiff0 is greater than or the same as an absolute value of PocDiff1. On the other hand, MVD1 may be derived based on pre-set MVD0. For example, when first and second reference pictures are a long-term reference picture, MVD1 may be derived by applying a first scaling factor to MVD0. A first scaling factor may be determined based on PocDiff0 and PocDiff1. On the other hand, when at least one of a first or second reference picture is a short-term reference picture, MVD1 may be derived by applying a second scaling factor to MVD0. A second scaling factor may be a fixed value (e.g., −½, −1, etc.) which is pre-promised in an encoding/decoding device. But, a second scaling factor may be applied only when a sign of PocDiff0 is different from a sign of PocDiff1. If a sign of PocDiff0 is the same as a sign of PocDiff1, MVD1 may be set the same as MVD0 and separate scaling may not be performed.

On the other hand, in case that PocDiff0 and PocDiff1 are not the same, MVD1 may be equally set as an offset vector when an absolute value of PocDiff0 is less than an absolute value of PocDiff1. On the other hand, MVD0 may be derived based on pre-set MVD1. For example, when first and second reference pictures are a long-term reference picture, MVD0 may be derived by applying a first scaling factor to MVD1. A first scaling factor may be determined based on PocDiff0 and PocDiff1. On the other hand, when at least one of a first or second reference picture is a short-term reference picture, MVD0 may be derived by applying a second scaling factor to MVD1. A second scaling factor may be a fixed value (e.g., −½, −1, etc.) which is pre-promised in an encoding/decoding device. But, a second scaling factor may be applied only when a sign of PocDiff0 is different from a sign of PocDiff1. If a sign of PocDiff0 is the same as a sign of PocDiff1, MVD0 may be set the same as MVD1 and separate scaling may not be performed. A detailed encoding, fdecoding flow for MVD refers to FIGS. 23 and 24.

Figure 23:
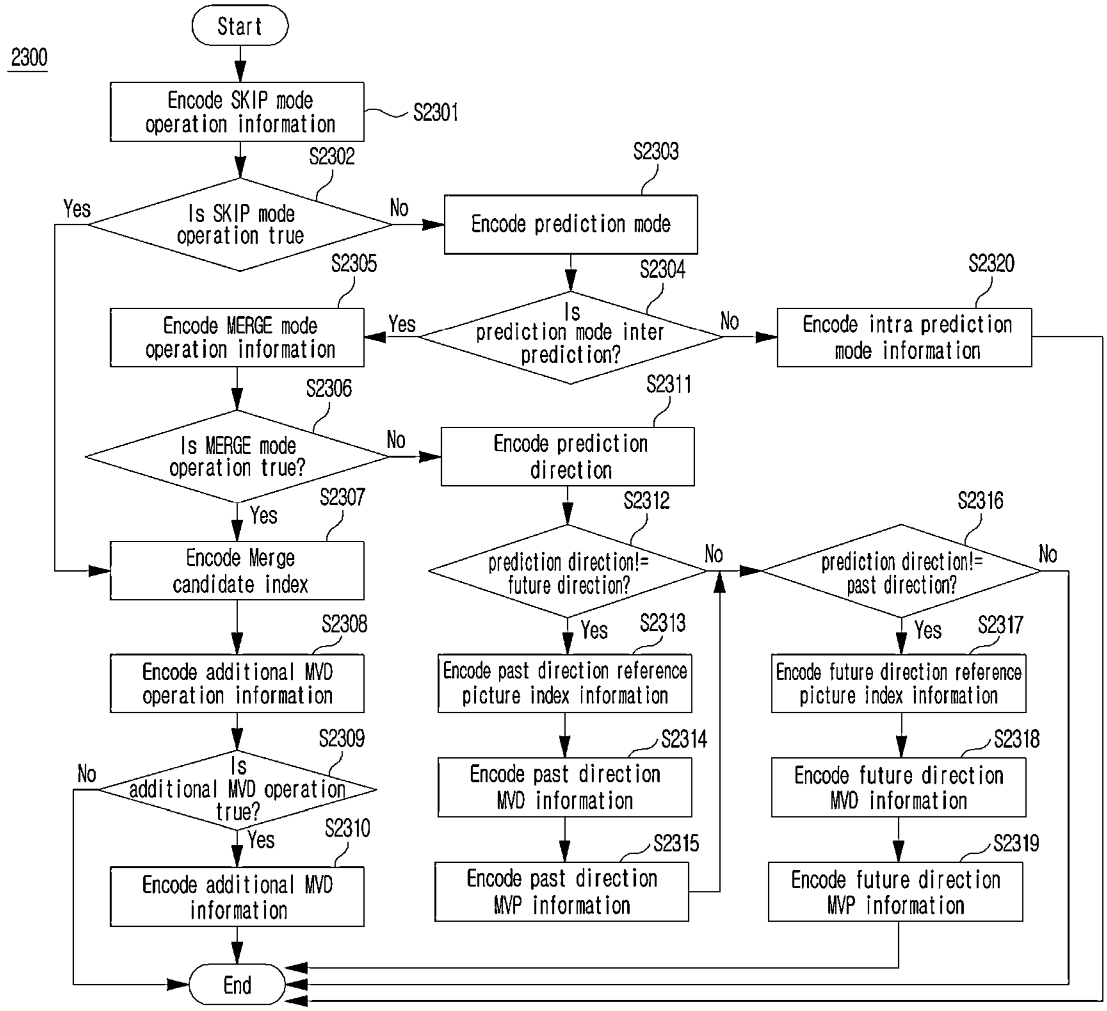
FIG. 23 is a flow chart showing a flow of encoding prediction information including additional MVD information according to an embodiment of the present disclosure.

FIG. 23 is a flow chart encoding motion information including additional MVD in a Merge mode. A description in steps S2301~S2307 is the same as a description in steps S501~S507 of FIG. 5. In step S2308, operation information indicating whether additional MVD information is encoded in a Skip mode or a Merge mode is encoded. In step S2309, whether corresponding operation information is true or false is determined and if it is true, this flow chart is finished after encoding additional MVD information in step S2310 and if it is false, this flow chart is finished without delay. A description in steps S2311~S2320 is the same as a description in step S508~S517 of FIG. 5.

Figure 24:
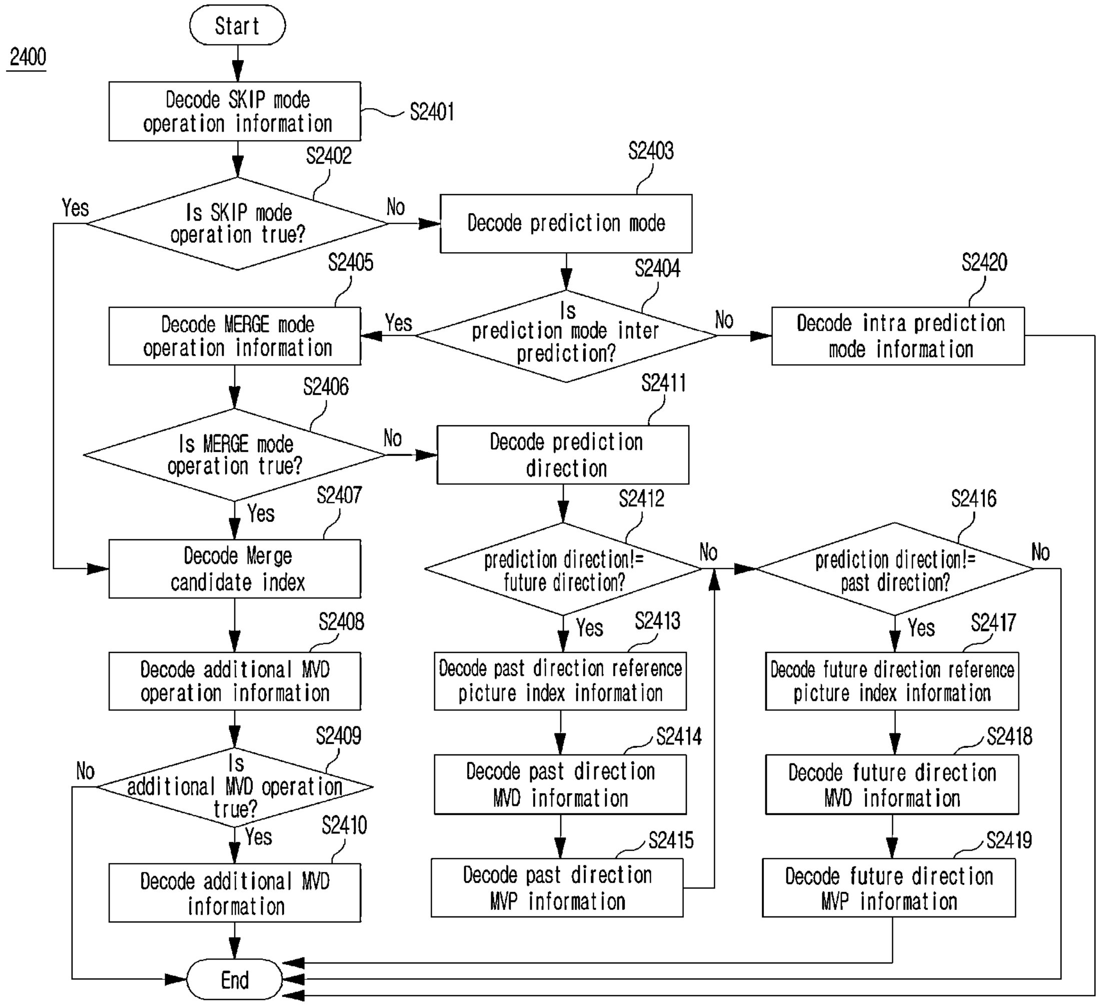
FIG. 24 is a flow chart showing a flow of decoding prediction information including additional MVD information according to an embodiment of the present disclosure.

FIG. 24 is a flow chart decoding motion information including additional MVD in a Merge mode. A description in step S2401~S2407 is the same as a description in steps S801~S807 of FIG. 8. In step S2408, operation information indicating whether additional MVD information is decoded in a Skip mode or a Merge mode is decoded. In step S2409, whether corresponding operation information is true or false is determined and if it is true, this flow chart is finished after decoding additional MVD information in step S2410 and if it is false, this flow chart is finished without delay. A description in step S2411~S2420 is the same as a description in step S808~S817 of FIG. 8.

In this embodiment, a binarization method of reference picture index information and prediction direction information among components of motion information will be described in detail when motion information is encoded.

For prediction direction information and reference picture index information, a binarization method may be changed according to a configuration state of a reference picture set (hereinafter, referred to as 'RPS'). RPS information may be transmitted in a higher header. A component of RPS information may include the number of reference pictures per prediction direction, a reference picture corresponding to a reference picture index and difference POC information between a corresponding reference picture and a current picture, etc. FIG. 25 is examples for RPS information and how RPS is configured is shown. RPS is configured with reference pictures used for list 0 and list 1 directions, respectively. A binarization method of prediction direction information and reference picture index information per each example of FIG. 25 will be described by using these examples in FIG. 26.

There are 3 steps which check out a RPS configuration state. The first step (hereinafter, referred to as 'a first RPS check') determines whether reference pictures in list 0 and list 1 directions are stored in RPS in the same index order. But, the number of reference pictures in a list 0 direction should be greater than or the same as the number of reference pictures in a list 1 direction. The second step (hereinafter, referred to as 'a second RPS check') determines whether all reference pictures in a list 1 direction are included regardless of a reference picture index order of RPS in a list 0 direction. The third step (hereinafter, referred to as 'a third RPS check') determines whether the number of reference pictures in a list 0 direction is the same as the number of reference pictures in a list 1 direction. A binarization method of prediction direction information and reference picture index information may be changed based on the above-described 3 determinations.

For a binarization method of prediction direction information, a first RPS check, a limit of bidirectional prediction according to a block size, etc. may be considered. For example, bidirectional prediction may be limited when a sum of a width and a length is equal to or less than a predetermined threshold length. In this case, as a threshold length is a value which is preset in an encoding/decoding device, it may be 8, 12, 16, etc. For a block that a first RPS check is false and bidirectional prediction is allowed, binarization may be performed by assigning 1 to bidirectional prediction, 00 to a list 0 direction and 01 to a list 1 direction. For a block that a first RPS check is false and bidirectional prediction is limited, binarization may be performed by assigning 0 to a list 0 direction and 1 to a list 1 direction. For a block that a first RPS check is true and bidirectional prediction is allowed, binarization may be performed by assigning 1 to bidirectional prediction and 0 to a list 0 direction. This is because reference pictures in a list 1 direction already exist in a list 0 direction, so there is no need to perform list 1 direction prediction. For a block that a first RPS check is true and bidirectional prediction is limited, there is no need to send prediction direction information, there is no need to perform binarization of corresponding information. In this case, when a first RPS check is false, RPS A in FIG. 25 is referred to and when a first RPS check is true, RPS B or C in FIG. 25 is referred to.

Figure 28:
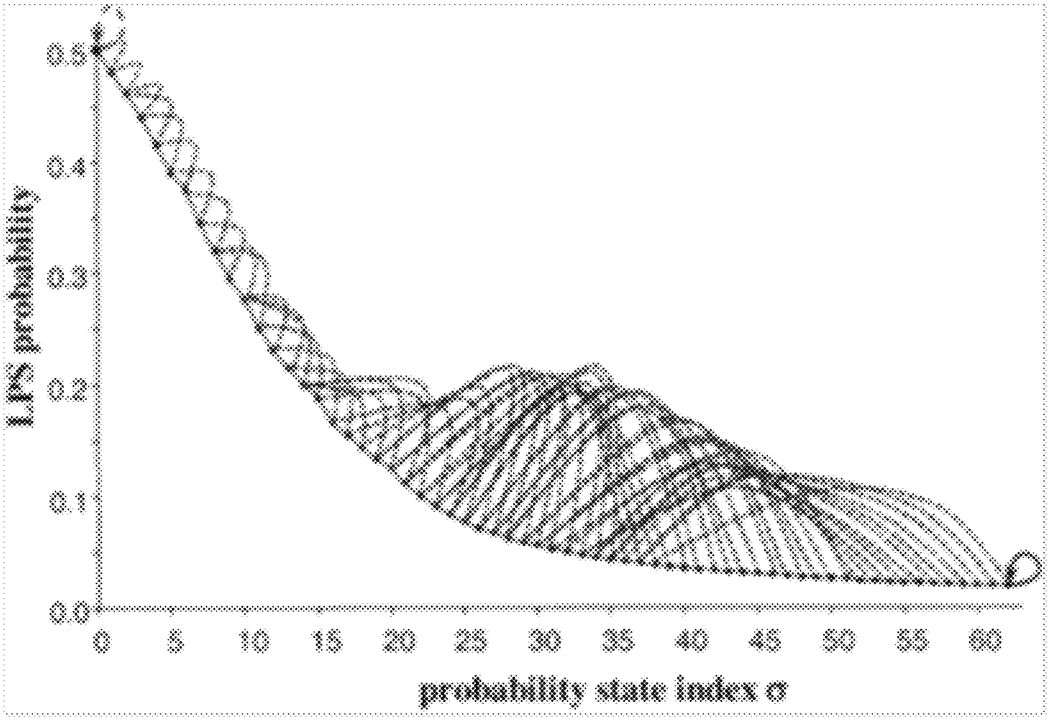
FIG. 28 is a picture showing an update rule of LPS occurrence probability according to an embodiment of the present disclosure.

Prediction direction information may be binarized only by a method when a first RPS check is false regardless of a first RPS check result. In this case, the second bin indicating whether a prediction direction is list 0 or list 1 should be coded when bidirectional prediction is not limited, and in this case, entropy encoding/decoding using CABAC may be performed by considering a first RPS check. For example, when considering a first RPS check condition as a context of the second bin of prediction direction information, an occurrence probability state of MPS (Most Probable Symbol), LPS (Least Probable Symbol) may be updated by using an initial probability of which context index information is No. 4 in a context initial probability table of FIG. 27 because list 1 prediction may not occur if the corresponding condition is true. An occurrence probability state of MPS (Most Probable Symbol), LPS (Least Probable Symbol) may be updated by using an initial probability of which context index information is No. 1 if the corresponding condition is false. In this example, the second bin indicating (FIG. 17) list 0 is 0, so MPS information is 0 and LPS information is 1. Probability information may be updated by a rule of LPS occurrence probability changes in FIG. 28. In FIG. 28, a probability state index (σ) on a horizontal axis is index information shown by presetting a change level of an occurrence probability of LPS and a vertical axis represents an occurrence probability of LPS. For example, when σ is 5, a LPS occurrence probability is about 40%, and if update is performed to improve a LPS occurrence probability, it may be updated to a probability of about 44%, a LPS occurrence probability when σ is 3, according to a rule of LPS occurrence probability changes in FIG. 19. Looking at FIG. 27 again in this way, an initial occurrence probability of LPS is 5% when context index information is No. 4, which is the same as when σ is No. 31 if checking it out in FIG. 28 and an initial occurrence probability of LPS is 35% when context index information is No. 1, which is the same as when σ is No. 7 if checking it out in FIG. 28. While considering such an occurrence probability state as initial information, an occurrence probability state of MPS, LPS may be consistently updated by considering a context of a second bin of prediction direction information.

Reference picture index information may be binarized by considering all of a first, second and third RPS check. Reference picture index information may be binarized based on the number of reference pictures in RPS per each prediction direction. In reference to FIG. 26, when a first RPS check is false, a second RPS check is true and a third RPS check is false, a binarization method of reference picture index information is different and it is the same for other conditions.

In this case, for other conditions, binarization may be performed according to an index order of reference pictures and the number of reference pictures. For example, when the number of reference pictures is 5, reference picture index information may be binarized to 0, 10, 110, 1110, 1111.

For other cases, (a first RPS check is false, a second RPS check is true and a third RPS check is false), reference pictures in a list 1 direction also exist in a reference picture in a list 0 direction in the same way, but an index order of each reference picture is different. In this case, binarization may be performed by 2 methods.

In a first method, binarization may be separately performed by division into a common reference picture group and a non-common reference picture group per prediction direction in RPS. In a table representing a binarization method of reference picture index information, a RPS common POC is a common reference picture group and a RPS non-common POC is a non-common reference picture group. Referring to RPS D in FIG. 25, there are 3 reference pictures of No. 1,3,4 in a common reference picture group and there are 2 reference pictures of No. 0,2 in a non-common reference picture group. Accordingly, reference picture index information may be binarized to 00, 010, 011 for No. 1,3,4 reference picture in RPS common POC and reference picture index information may be binarized to 10, 11 for No. 0,2 reference picture in RPS non-common POC.

A second method corresponds to a case in which a prediction direction is not bidirectional prediction. Like a first method, reference pictures per prediction direction of RPS are divided into a common reference picture group and a non-common reference picture group. But, the first bin indicating a group to which a current reference picture belongs (an underlined bin in a table for a binarization method of reference picture index information in FIG. 26) in reference picture index information is not transmitted, and it is transmitted using a bin indicating whether it is list 0 or list 1 of prediction direction information (an underlined bin in a table for a binarization method of prediction direction information in FIG. 26). A meaning of an underlined bin in a table for a binarization method of prediction direction information in FIG. 26 is used as information indicating whether a reference picture of a current block is a common reference picture group, not indicating whether a prediction direction is a list 0 direction or a list 1 direction. In this case, only a bin indicating whether a prediction direction is bidirectional prediction is transmitted when prediction direction information is binarized. When bidirectional prediction is limited, prediction direction information is not transmitted.

Figure 29:
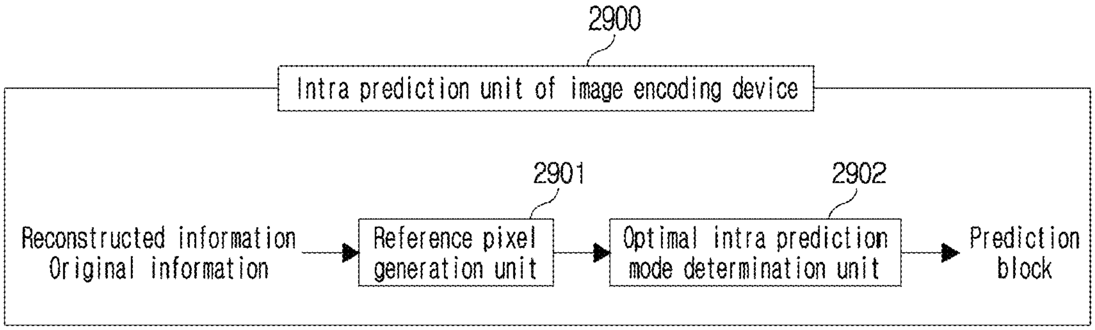
FIG. 29 is a block diagram showing an intra prediction unit of an image encoding device.

FIG. 29 is a block diagram showing an intra prediction unit of an image encoding device.

After a prediction mode of a current block selects intra prediction, a reference pixel around a current block is derived and filtered in a reference pixel generation unit 2901. A reference pixel is determined by using a reconstructed pixel around a current block. When some reconstructed pixels may not be used or there are no reconstructed pixels around a current block, an available reference pixel or an intermediate value among a range of values that a pixel may have may be padded to an unavailable region. After deriving all reference pixels, filtering is performed by using an AIS (Adaptive Intra Smoothing) filter.

The optimal intra prediction mode determination unit is a device which determines one prediction mode among M intra prediction modes 2902. In this case, M represents the total number of intra prediction modes. An intra prediction mode generates a prediction block generated by using a reference pixel filtered according to a directional prediction mode and a nondirectional prediction mode. One intra prediction mode with the lowest cost value is selected by comparing a RD-Cost per intra prediction mode.

Figure 30:
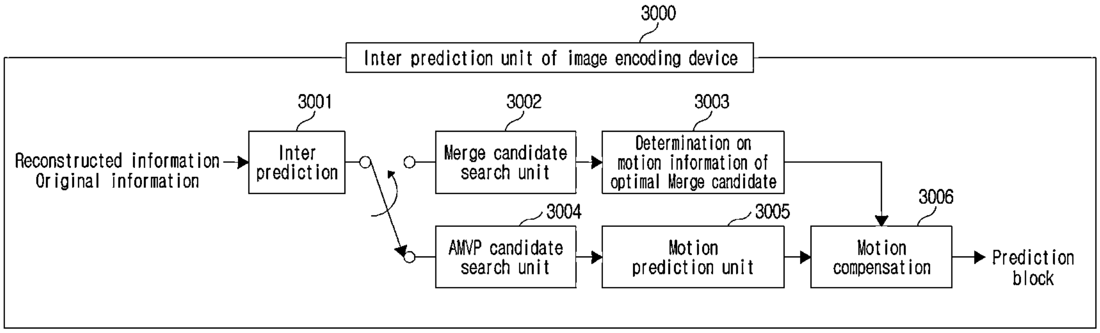
FIG. 30 is a block diagram showing an inter prediction unit of an image encoding device.

FIG. 30 is a block diagram showing an inter prediction unit 3000 of an image encoding device in detail.

An inter prediction unit may be divided into a Merge candidate search unit 3002 and an AMVP candidate search unit 3004 according to a method of deriving motion information. A Merge candidate search unit S302 sets a reference block that inter prediction is used among reconstructed blocks around a current block as a Merge candidate. A Merge candidate is derived by the same method in an encoding/decoding device, the same number is used and the number of Merge candidates is transmitted from an encoding device to a decoding device. In this case, when as many Merge candidates as the promised number are not set from reconstructed reference blocks around a current block, motion information of a block at the same position as a current block is brought from other picture, not a current picture. Alternatively, motion information in a past direction and in a future direction from a current picture is combined and is filled as a candidate or a block at the same position of other reference picture is set as motion information to set a Merge candidate.

An AMVP candidate search unit 3004 determines motion information of a current block in a motion estimation unit 3005. A motion estimation unit 3005 finds a prediction block which is most similar to a current block among reconstructed pictures.

In an inter prediction unit, a prediction block is generated through motion compensation 3006 after determining motion information of a current block by using one of a Merge candidate search unit and an AMVP candidate search unit.

Figure 31:
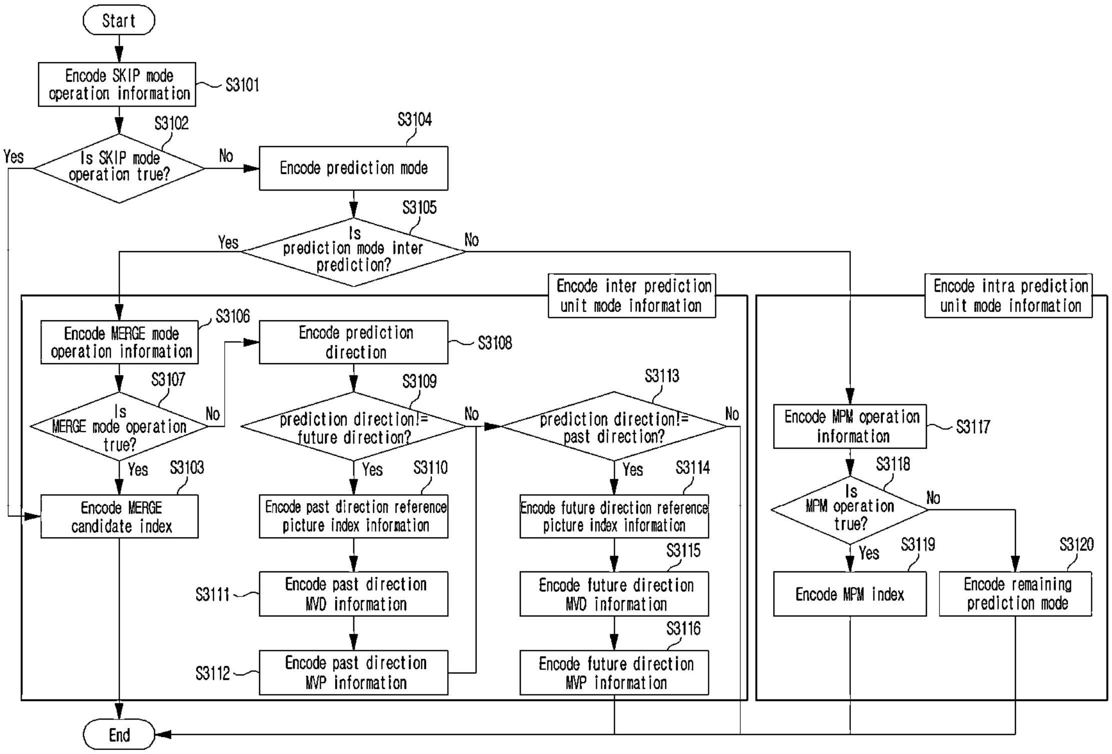
FIG. 31 is a method of encoding prediction mode information.

FIG. 31 is a method of encoding prediction mode information.

Skip mode operation information encoding S3101 is information indicating whether prediction mode information of a current block uses Merge information of inter prediction and a prediction block is used as a reconstructed block in a decoding device.

If a Skip mode operates, determined Merge candidate index encoding S3103 is performed and if it does not operate, prediction mode encoding S3104 is performed.

Prediction mode encoding S3104 encodes whether a prediction mode of a current block is inter prediction or intra prediction. When an inter prediction mode is selected, Merge mode operation information is encoded S3106. When a Merge mode operates S3107, Merge candidate index encoding is performed S3103. When a Merge mode does not operate, prediction direction encoding is performed S3108. Prediction direction encoding S3108 indicates whether a direction of a used reference picture is in a past direction or in a future direction or uses both directions based on a current picture. Inter prediction motion information of a current block may be indicated by encoding reference picture index information in a past direction S3110, encoding MVD information in a past direction S3111 and encoding MVP information in a past direction S3112 when a prediction direction is past or bidirectional S3109 and by encoding reference picture index information in a future direction S3114, encoding MVD information in a future direction S3115 and encoding MVP information in a future direction S3116 when a prediction direction is future or bidirectional S3113. Information encoded in an inter prediction process is referred to as inter prediction unit mode information encoding.

When a prediction mode is an intra prediction mode, MPM operation information is encoded S3117. MPM operation information encoding is information indicating that the same prediction mode information as a reconstructed block is used without encoding prediction mode information of a current block when having the same prediction mode information as a current block among reconstructed blocks around a current block. When a MPM operation is performed S3118, a prediction mode of which reconstructed block is used as a prediction mode of a current block is indicated by MPM index encoding S3119 and when a MPM operation is not performed S3118, remaining prediction mode encoding is performed S3120. Remaining prediction mode encoding encodes a prediction mode index used as a prediction mode of a current block among remaining prediction modes excluding a prediction mode selected as a MPM candidate. Information encoded in an intra prediction process is referred to as intra prediction unit mode information encoding.

Figure 32:
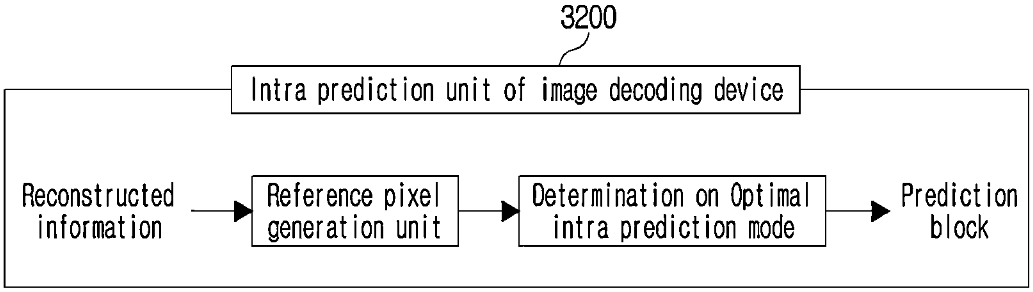
FIG. 32 shows an intra prediction unit of an image decoding device.
Figure 33:
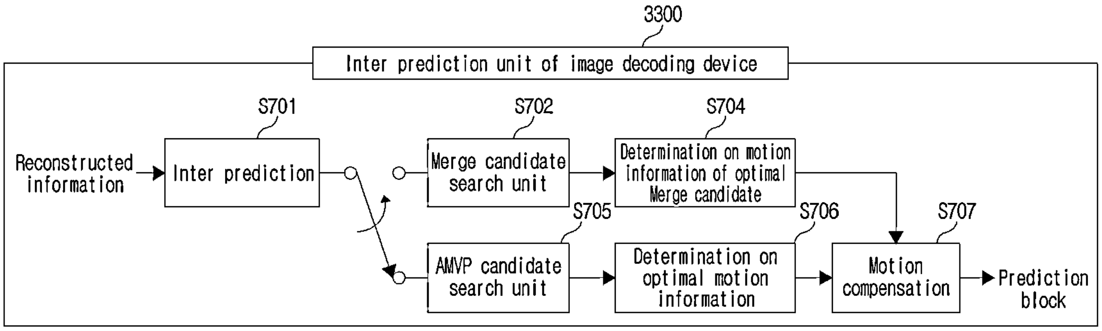
FIG. 33 shows an inter prediction unit of an image decoding device.

FIGS. 32 and 33 show an intra prediction unit and an inter prediction unit of an image decoding device.

For an intra prediction unit 3200, only a process in which the optimal prediction mode of FIG. 29 is determined is omitted and a process in which a prediction block is generated based on the optimal prediction mode operates substantially in the same way as an intra prediction unit of an image encoding device.

For an inter prediction unit 3300, only a process in which the optimal prediction mode of FIG. 30 is determined is omitted and a process in which a prediction block is generated based on the optimal prediction mode operates substantially in the same way as an inter prediction unit of an image encoding device.

Figure 34:
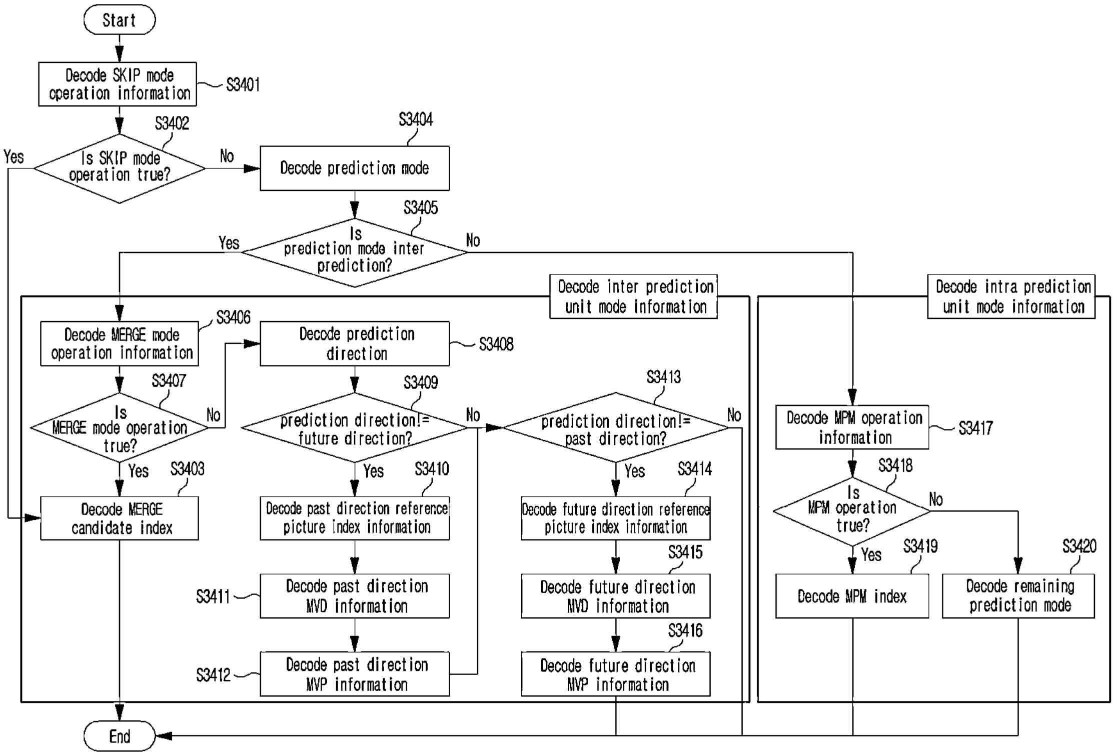
FIG. 34 is a method of decoding prediction mode information.

FIG. 34 is a method of decoding prediction mode information. It operates substantially in the same way as a method of encoding prediction mode information in FIG. 31.

Figure 35:
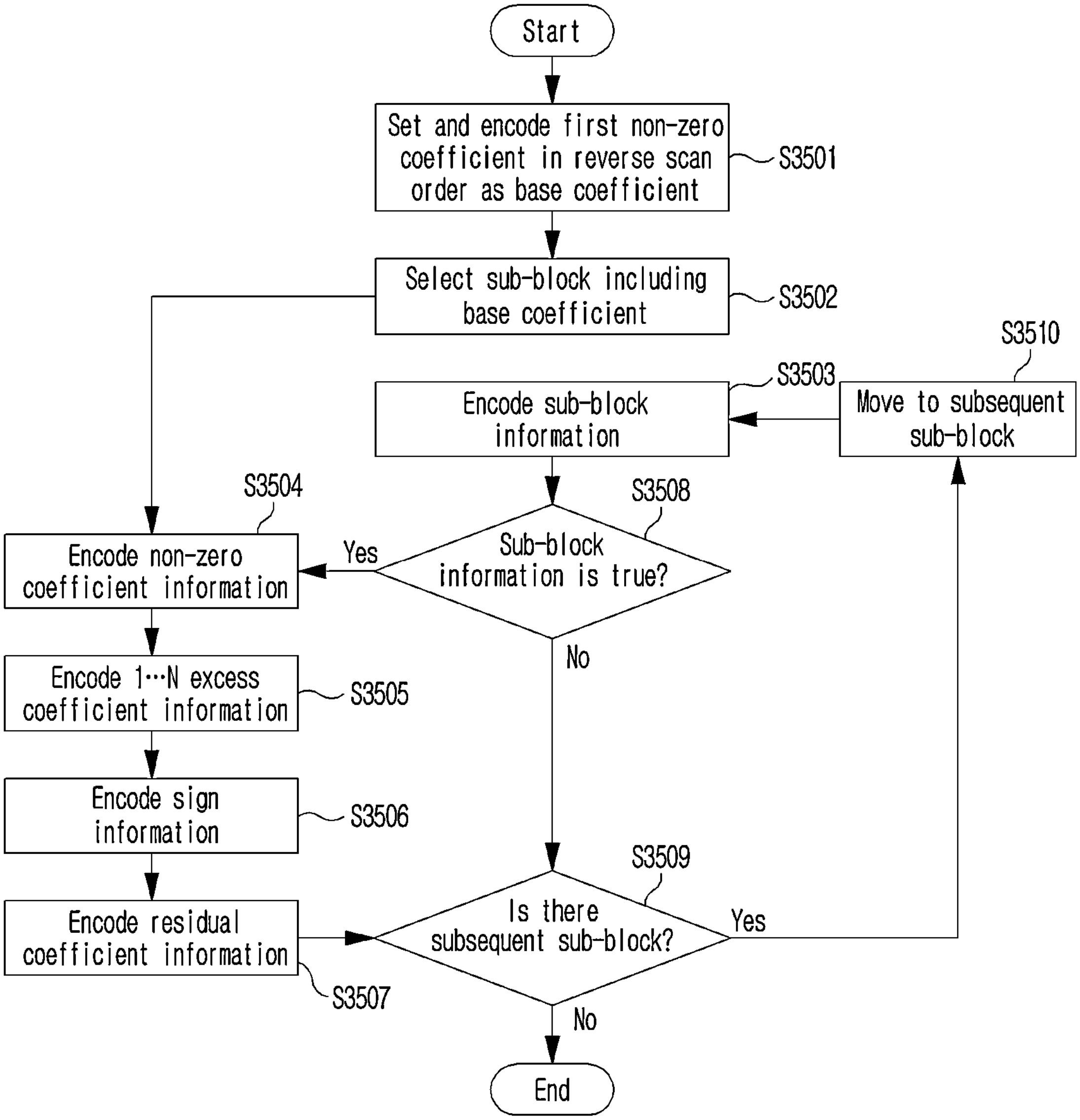
FIG. 35 is a flow chart showing an encoding method of a transform block.

FIG. 35 is a flow chart showing an encoding method of a transform block.

An encoding method of a transform block in FIG. 35 may be performed by an entropy encoding unit 105 of an image encoding device 100.

First, when transform coefficients are scanned according to a reverse scan order, the first non-zero coefficient is determined as a base coefficient and that position information, Last_sig, is encoded S3501.

A sub-block in which a base coefficient is included is selected S3502 and transform coefficient information in the corresponding sub-block is encoded. When it is not a sub-block in which a base coefficient is included, sub-block information is encoded before encoding a coefficient in a transform block S3503. Coded_sub_blk_flag, sub-block information, is a flag indicating whether there are at least one or more non-zero coefficients in a current sub-block. Subsequently, non-zero coefficient information is encoded S3504. In this case, Sig_coeff_flag, non-zero coefficient information, represents whether a value of each coefficient in a sub-block is 0 or not.

And, N excess coefficient information is encoded S3505. In this case, N excess coefficient information represents that an absolute value of each coefficient is greater than each of values from 1 to N respectively for all coefficients in a sub-block. N may be an arbitrary preset value in encoding and decoding, but it may be allowed to use the same value in encoding and decoding by encoding a value of N. The number of N excess coefficient information may be an arbitrary preset value or may be different according to a position of a base coefficient. N excess coefficient information may be encoded for all or some of coefficients in a sub-block and may be sequentially encoded in a scan order of each coefficient.

For example, when N is set as 3, whether an absolute value of each coefficient is greater than 1 is encoded for all non-zero coefficients in a sub-block. For it, Abs_greater1_flag, a flag indicating whether an absolute value of a coefficient is greater than 1, is used. Subsequently, whether it is a value greater than 2 is encoded only for a coefficient which is determined as a value greater than 1. For it, Abs_greater2_flag, a flag indicating whether an absolute value of a coefficient is greater than 2, is used. Last, whether it is a value greater than 3 is encoded only for a coefficient which is determined as a value greater than 2. For it, Abs_greater3_flag, a flag indicating whether an absolute value of a coefficient is greater than 3, is used.

Alternatively, whether an absolute value of each coefficient is greater than 1 is encoded for a non-zero coefficient in a sub-block. For it, Abs_greater1_flag, a flag indicating whether an absolute value of a coefficient is greater than 1, is used. Subsequently, whether the coefficient is an even number or an odd number may be encoded only for a coefficient which is determined as a value greater than 1. For it, Parity information representing whether a coefficient is an even number or an odd number may be used. Further, whether an absolute value of the coefficient is greater than 3 may be encoded. For it, Abs_greater3_flag, a flag indicating whether an absolute value of a coefficient is greater than 3, may be used.

As described above, N excess coefficient information may include at least one of Abs_greaterN_flag or a flag representing whether it is an even number. In this case, N may be 1, 2, 3, but it is not limited thereto. N may be a natural number greater than 3 such as 4, 5, 6, 7, 8, 9, etc.

Subsequently, sign information representing whether it is a negative number or a positive number is encoded for each coefficient determined to be non-zero S3506. For sign information, Sign_flag may be used.

And, a residual value subtracting N from only a coefficient of which an absolute value is determined to be greater than N is defined as residual coefficient information and remaining_coeff, residual value information of this coefficient, is encoded S3507. In this case, encoding of information for each coefficient may be performed by a method of moving to a subsequent coefficient after performing S3504, S3505, S3506, S3507 processes per coefficient. Alternatively, information for coefficients in a sub-block may be encoded at a time per each step. For example, when there are 16 coefficients in a sub-block, S3504 for each of 16 coefficients may be encoded first, a S3505 process may be entirely performed only for a coefficient of which an absolute value of a coefficient is determined to be non-zero in S3504 and a S3506 process may be performed. Subsequently, when it is impossible to express an absolute value of a current coefficient in a S3505 process, a S3507 process may be performed. An absolute value of a non-zero coefficient may be derived by decoding at least one of Sig_coeff_flag, one or more Abs_greaterN_flag, Parity information or residual value information.

After encoding all coefficient information for a current sub-block, whether there is a subsequent sub-block is checked S3509. When there is a subsequent sub-block, it moves to a subsequent sub-block S3510 and sub-block information is encoded S3503. The sub-block information, Coded_sub_blk_flag, is checked S3508, when it is checked that a value of Coded_sub_blk_flag is true, non-zero coefficient information, Sig_coeff_flag, is encoded. When a value of the sub-block information, Coded_sub_blk_flag, is false, it means that a coefficient to be encoded does not exist in the corresponding sub-block, so whether there is a subsequent sub-block is checked. Alternatively, after moving to a subsequent sub-block, when the sub-block is a sub-block positioned at the lowest frequency, it may be also equally set to be true in encoding and decoding without encoding and decoding of sub-block information on the assumption that there will be a non-zero coefficient.

In FIG. 35, encoding of sign information S3506 is described as a process after S3505 for convenience of description, but a S3506 process may be performed between S3504 and S3505 or after S3507.

Figure 36:
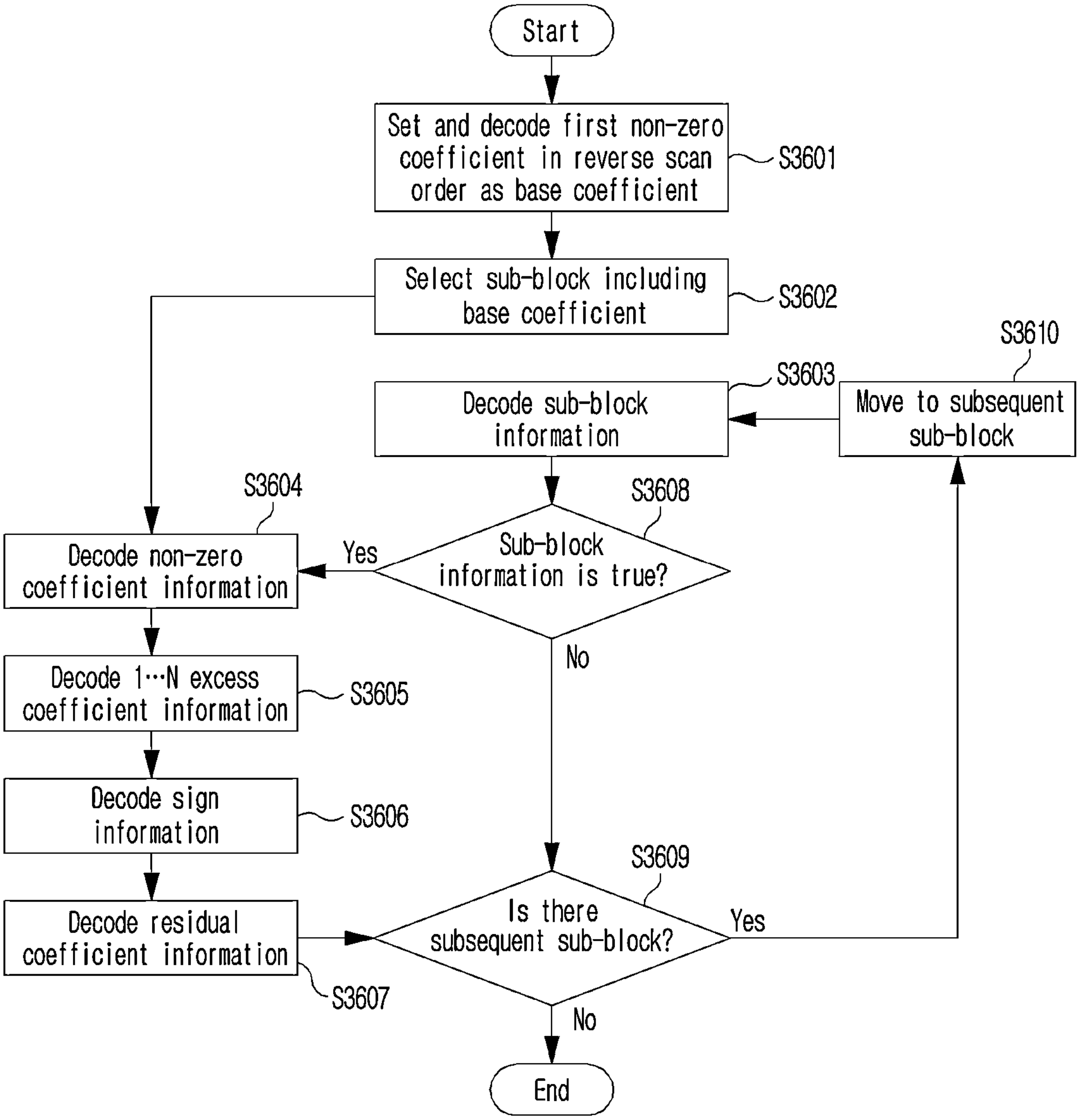
FIG. 36 is a flow chart showing a decoding method of a transform block.

FIG. 36 is a flow chart showing a decoding method of a transform block.

A method of decoding a transform block in FIG. 36 corresponds to a method of encoding a transform block in FIG. 35. A decoding method of a transform block in FIG. 36 may be performed by an entropy decoding unit 601 of an image decoding device 600 in FIG. 6.

For information to be encoded, a context-adaptive binarization arithmetic process is performed through a binarization process. A context-adaptive binarization arithmetic process refers to a process in which encoded information in a block is symbolized and encoded by applying an occurrence probability of a symbol differently using probability information according to a situation. In this example, only 0 and 1 are used as a symbol for convenience of description, but for the number of symbols, N (N is a natural number equal to or greater than 2) may be used.

Probability information refers to an occurrence probability of 0 and 1 in binarized information. An occurrence probability of two information may be set equally or differently according to pre-reconstructed information. According to information, it may have M probability information. In this case, M probability information may be implemented as a probability table.

Figure 37:
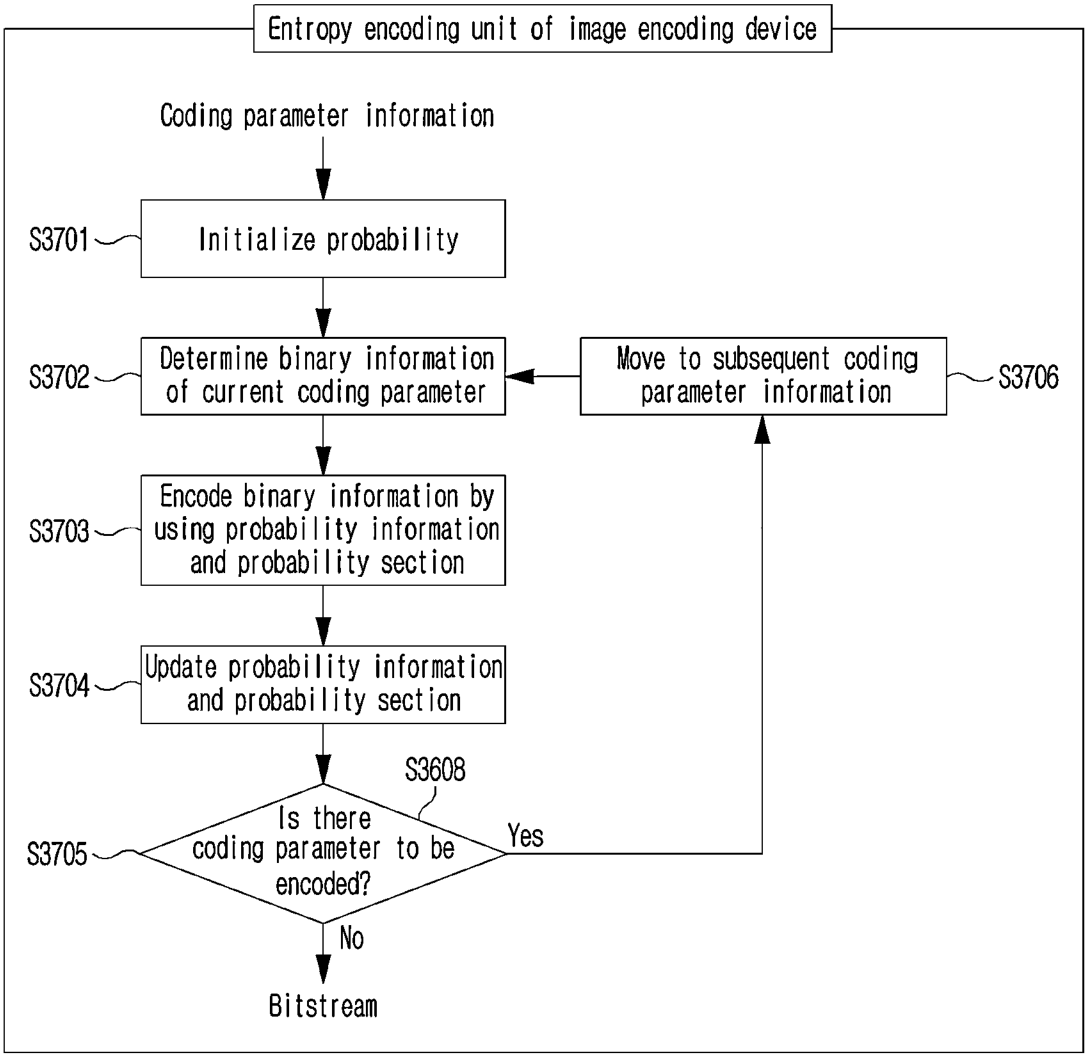
FIG. 37 is a flow chart showing a context-adaptive binarization arithmetic encoding method.

FIG. 37 is a flow chart showing a context-adaptive binarization arithmetic encoding method. First, probability initialization is performed S3701. Probability initialization is a process of dividing a probability section for binarized information by a probability set in probability information. But, for which probability information will be used, the same condition may be used by a rule which is arbitrarily preset in an encoding device or a decoding device and probability information may be separately encoded. An initial probability section may be equally determined by a preset rule in an encoding/decoding process. Alternatively, an initial probability section may be newly encoded and used. Alternatively, a probability section and probability information of a coding parameter which is previously used may be brought without performing probability initialization.

When binary information of a current coding parameter to be encoded is determined S3702, binarized information of a current coding parameter is encoded by using a probability section state until a previous step of S3702 and previous probability information of the same coding parameter S3703. And, probability information and a probability section may be updated for binary information which will be subsequently encoded S3704. And, when there is coding parameter information which will be subsequently encoded S3705, the above-described process is repeated by moving to subsequent coding parameter information S3706. If there is no coding parameter information which will be subsequently encoded, this flow chart is finished.

Figures 38, 39:
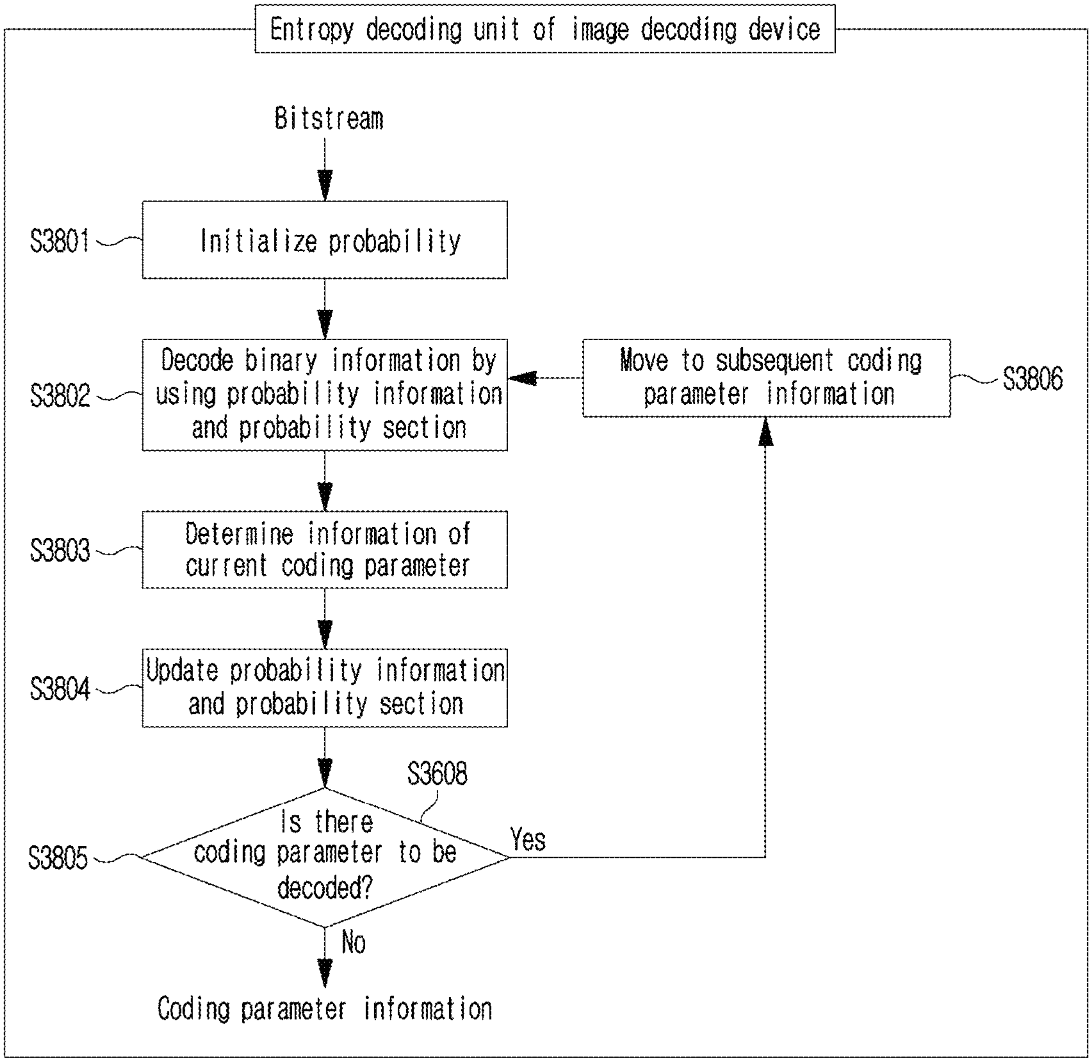
FIG. 38 is a flow chart showing a context-adaptive binarization arithmetic decoding method.
FIG. 39 is a diagram showing an example in which probability information is differently applied according to information of surrounding coefficients.

FIG. 38 is a flow chart showing a context-adaptive binarization arithmetic decoding method. Unlike an encoding device, a decoding device determines information of a current coding parameter S3803 after decoding binary information of a coding parameter by using probability information and a probability section S3802. In addition, as a decoding method in FIG. 38 corresponds to an encoding method in FIG. 37, a detailed description is omitted.

In the above-described steps S3703 and S3802 in FIGS. 37 and 38, encoding or decoding may be performed by selectively using the optimal probability information among M probability information preset by using information (or coding parameters) which is already reconstructed around per each coding parameter.

For example, probability information having a high occurrence probability of information according to a size of a transform block is used as probability information of a coding parameter.

Alternatively, probability information may be differently applied according to information of surrounding coefficients of a coefficient to be currently encoded or decoded and probability information of information to be currently encoded or decoded may be selected by using probability information of information which is previously encoded or decoded.

Figures 40, 41:
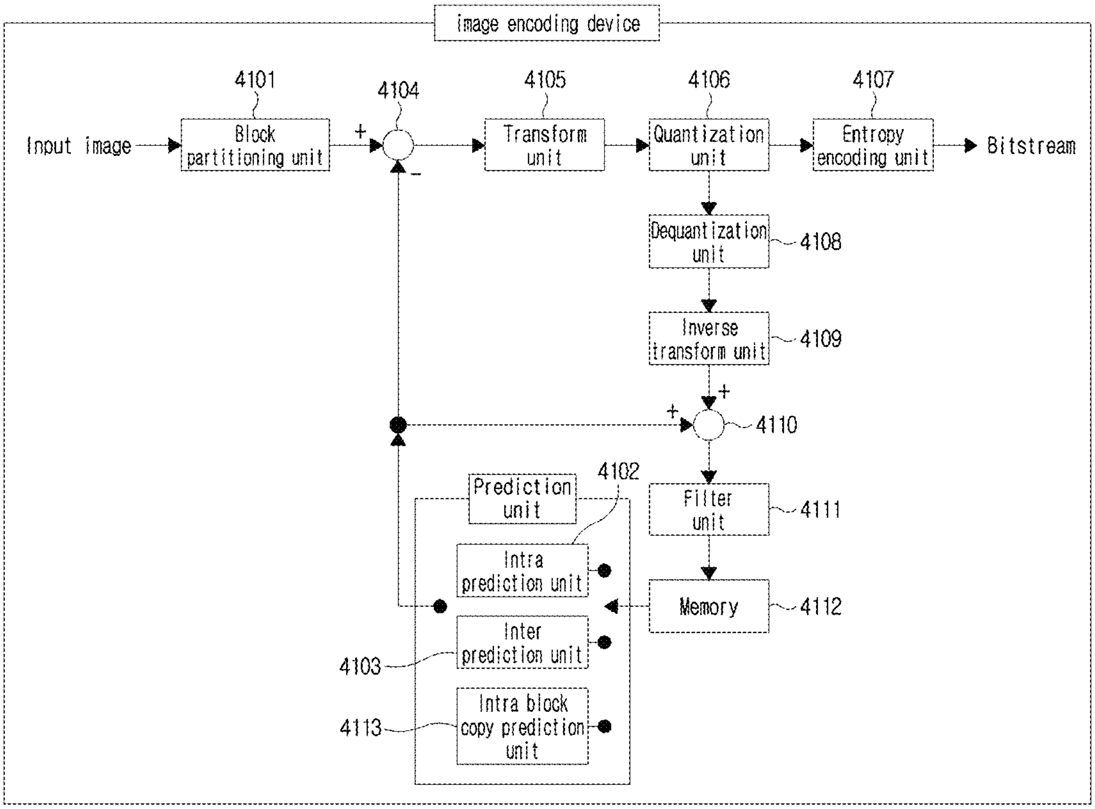
FIG. 40 is a diagram showing an example in which probability information is differently applied according to information of surrounding coefficients.
FIG. 41 is a block diagram showing an image encoding device according to an embodiment of the present disclosure.
Figure 42:
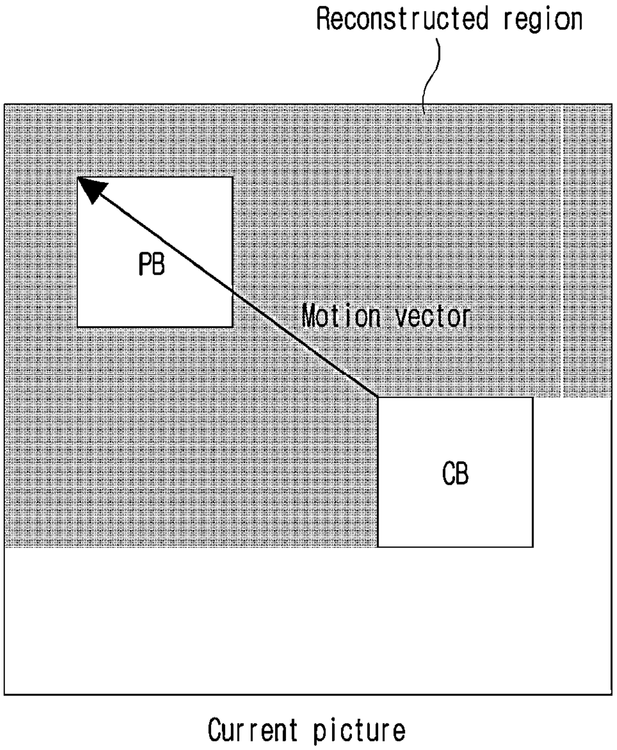
FIG. 42 shows a method of generating a prediction block by using intra block copy prediction according to an embodiment of the present disclosure.
Figure 43:
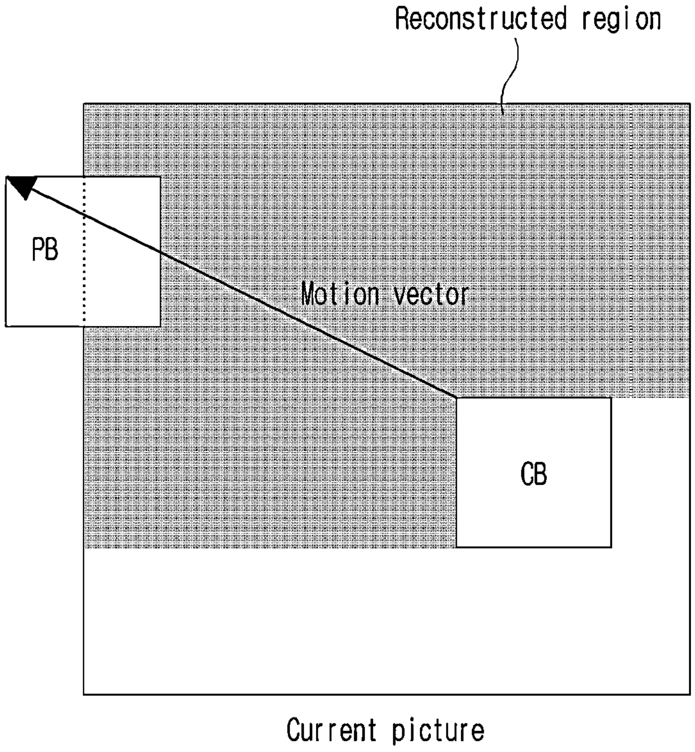
FIG. 43 shows a method of generating a prediction block by using intra block copy prediction according to an embodiment of the present disclosure.
Figure 44:
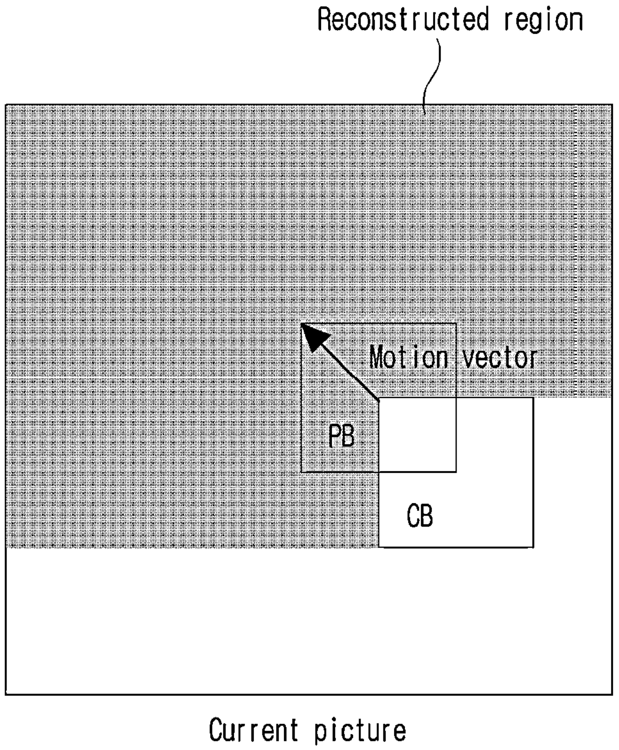
FIG. 44 shows a method of generating a prediction block by using intra block copy prediction according to an embodiment of the present disclosure.

FIGS. 39 and 40 are a diagram showing an example in which probability information is differently applied according to information of surrounding coefficients.

FIG. 39 is an example of a probability information table used for encoding or decoding a Sig_coeff_flag information value of a current coefficient. When the number of coefficients having the same information value as a Sig_coeff_flag information value of a current coefficient among coefficients adjacent to a coefficient to be currently encoded or decoded is 1, index 8 is assigned to a current coefficient. In this case, a probability of symbol 1, Sig_coeff_flag binary information of a current coefficient, is 61% and a probability of symbol 0 is 39%. When the number of surrounding coefficients having the same information value as a Sig_coeff_flag information value of a current coefficient is 2, index 5 is assigned to a current coefficient, and in this case, a probability of symbol 1, Sig_coeff_flag binary information of a current coefficient, is 71% and a probability of symbol 0 is 29%. When the number of surrounding coefficients having the same information value as a Sig_coeff_flag information value of a current coefficient is 3, index 2 is assigned to a current coefficient, and in this case, a probability of symbol 1, Sig_coeff_flag binary information of a current coefficient, is 87% and a probability of symbol 0 is 13%.

After a current coefficient is encoded or decoded by using a probability information table shown in FIG. 39, probability information may be updated as in FIG. 40.

On the other hand, for non-zero coefficient information, Sig_coeff_flag, as it is closer to a low-frequency domain, probability information with a high occurrence probability of non-zero coefficient information, Sig_coeff_flag, may be used.

And, in case of probability information of N excess coefficient information, probability information of current N excess coefficient information may be set by using probability information of N excess coefficient information which is encoded/decoded right before or probability information of N excess coefficient information which is encoded/decoded first in a unit of a sub-block may be used as it is. As described above, N excess coefficient information may include at least one of Abs_greater1_flag, Abs_greater2_flag, Abs_greater3_flag, . . . , or Abs_greaterN_flag.

And, sub-block information, Coded_sub_blk_flag, may use probability information of M surrounding sub-blocks which are encoded/decoded or use probability information of a sub-block which is encoded/decoded right before.

FIG. 41 is a diagram in which an intra block copy prediction unit is added to an image encoding device 100 of FIG. 1. An intra block copy prediction unit may generate a prediction block of a block to be currently encoded by using a reconstructed region in a current picture.

FIG. 42 to FIG. 47 are an example in which a prediction block is generated in an intra block copy prediction unit. In a diagram, CB represents a current block and PB represents a prediction block.

A motion search range may be limited within a reconstructed region. For example, a motion search range may be limited only within a reconstructed region in a current picture as in FIG. 42 and when even some of a prediction block belongs to a reconstructed region as in FIG. 43, it may be set as a motion search range. Alternatively, when a current block and a prediction block are partially overlapped as in an example of FIG. 44, it may be set as a motion search range. A corresponding region which is partially overlapped may be padded by using an adjacent reconstructed pixel, but an overlapping region may be predicted by using a reconstructed pixel.

Figure 45:
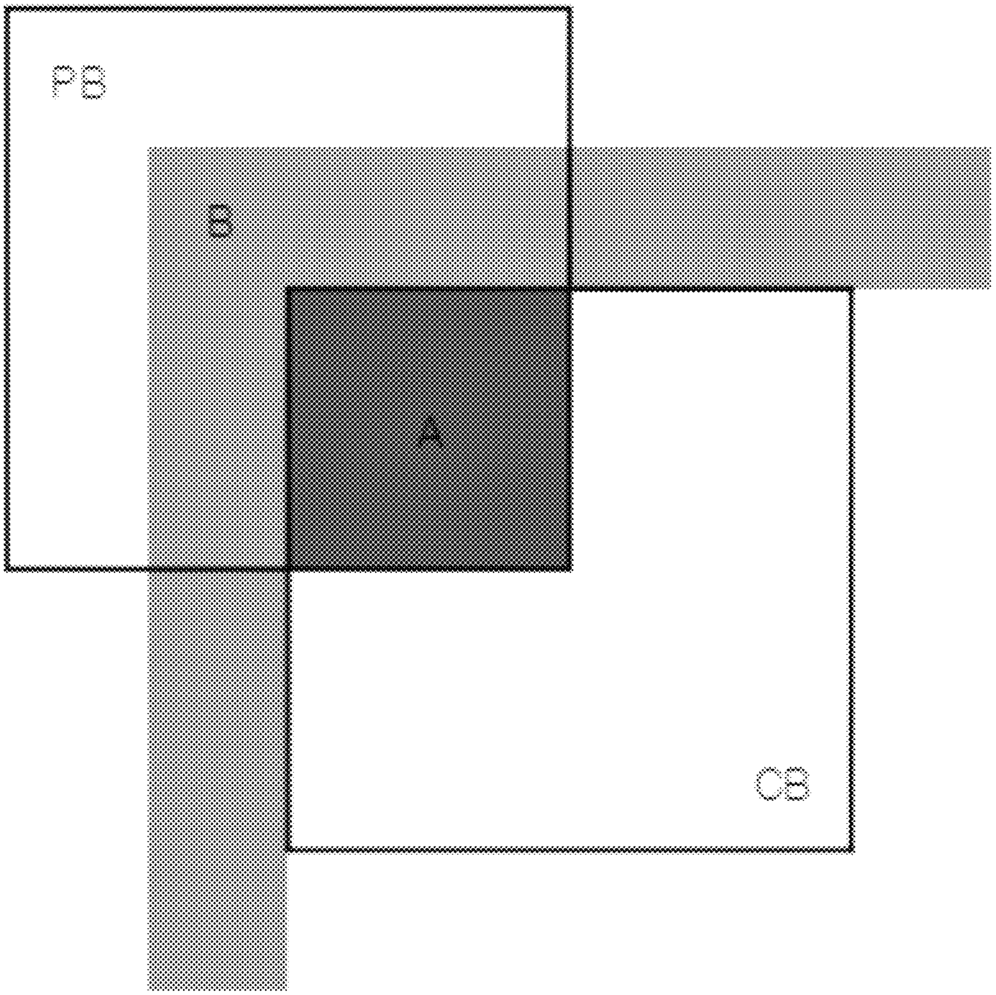
FIG. 45 shows a method of generating a prediction block by using intra block copy prediction according to an embodiment of the present disclosure.
Figure 46:
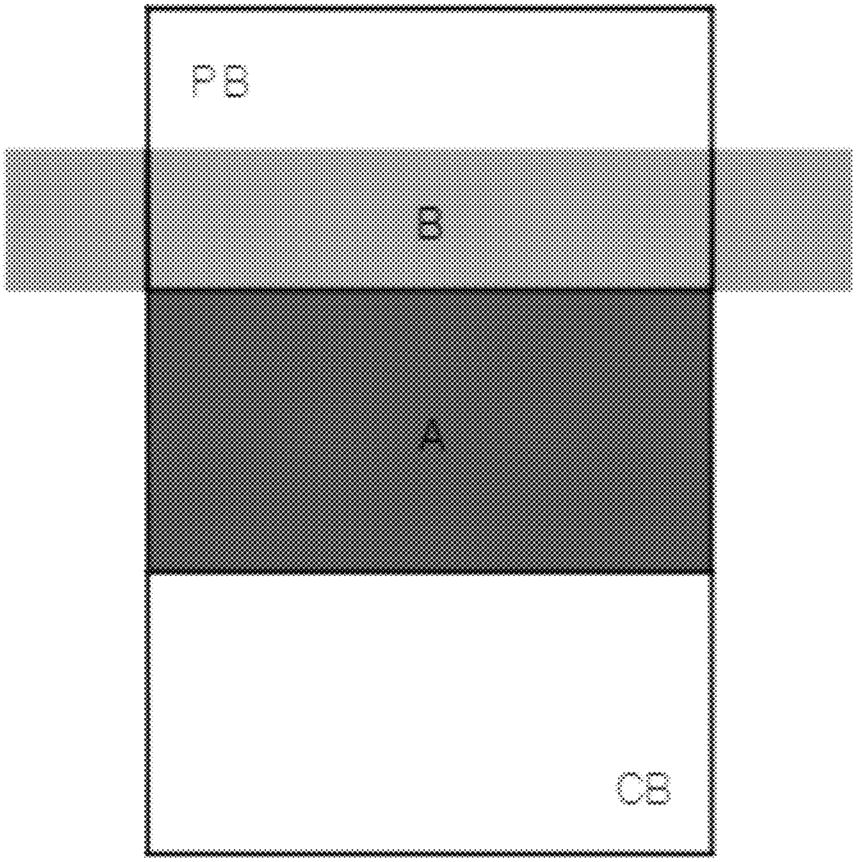
FIG. 46 shows a method of generating a prediction block by using intra block copy prediction according to an embodiment of the present disclosure.
Figure 47:
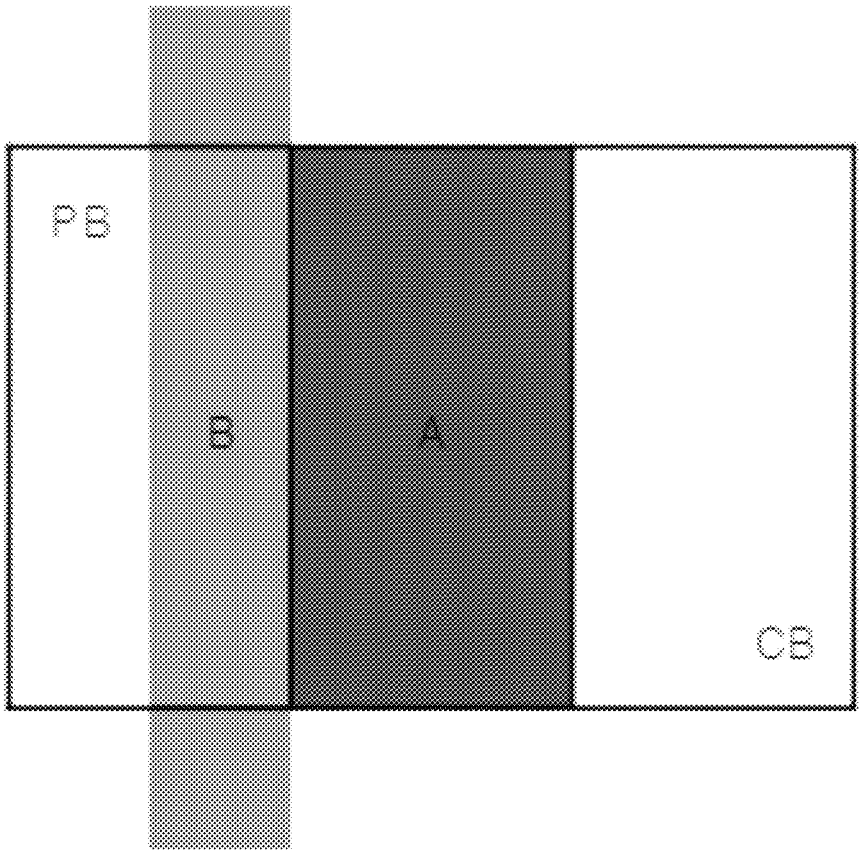
FIG. 47 shows a method of generating a prediction block by using intra block copy prediction according to an embodiment of the present disclosure.
Figure 48:
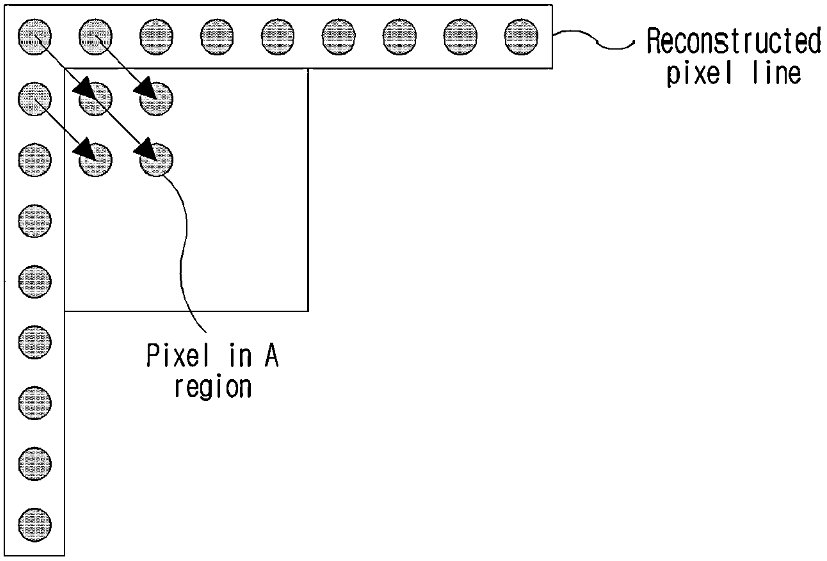
FIG. 48 shows a method of generating a prediction block by using intra block copy prediction according to an embodiment of the present disclosure.

FIGS. 45 to FIG. 47 are an example showing a method of generating a prediction block when a prediction block and a current block are overlapped. A means a region where a current block and a prediction block are overlapped and B is surrounding adjacent reconstructed pixels used to predict A. According to in which direction of a top-left, top, top-right, left direction, etc. of a current block a prediction block exists, a reconstructed pixel which may be used may be different. In this case, A region may be predicted by using M (M is an integer equal to or greater than 1) intra prediction modes. M is the number of prediction modes of intra prediction available for a current block. FIG. 48 is an illustrative diagram showing pixel prediction in A region by using a reconstructed pixel line which may be used for pixel prediction in A region and a top-left direction mode among M available intra prediction modes.

Figure 49:
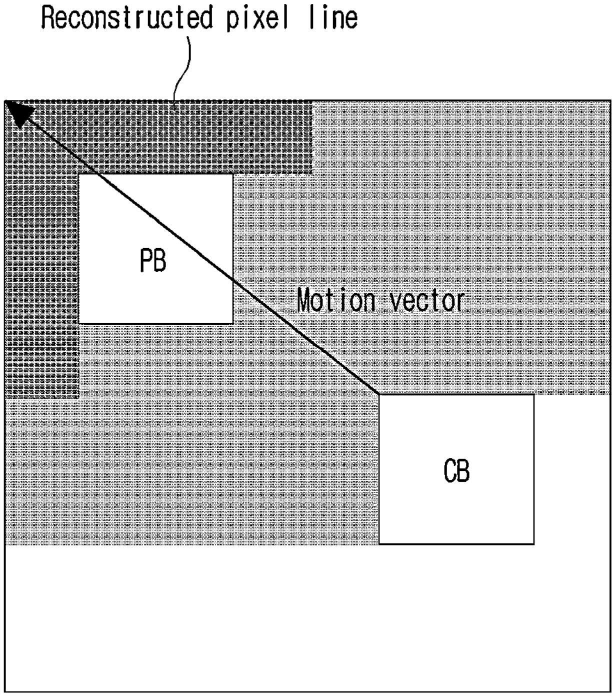
FIG. 49 shows a method of generating a prediction block by using intra block copy prediction according to an embodiment of the present disclosure.

A motion vector of a current block may be used to indicate a reconstructed pixel line for deriving a reference pixel line of a current block, not to indicate a prediction block of a current block in a reconstructed region within a current picture as in a diagram of FIG. 49. Intra prediction may be performed, base on M prediction modes, by using a reference pixel line of a reconstructed region which is not adjacent to a current block and a prediction mode generating the optimal prediction block may be selected. In this case, a prediction block may be generated by using a prediction mode and the optimal reference pixel line among W (W is an integer equal to or greater than 1) reference pixel lines and the optimal prediction block may be generated by performing weighted sum for generated prediction blocks after prediction blocks are generated by using a different prediction mode or the same prediction mode for W reference pixel lines.

Alternatively, the optimal prediction block may be generated by performing weighted sum for generated prediction blocks after prediction blocks are respectively generated by using intra block copy prediction and intra prediction. The optimal prediction block may be generated by performing weighted sum for generated prediction blocks after prediction blocks are respectively generated by using intra block copy prediction and inter prediction.

In addition, a reference pixel line may use only a reconstructed pixel on the top or a reconstructed pixel on the left. In this case, when a prediction block and a current block are overlapped, a prediction block may be generated by using a reference pixel line used in generating a prediction block.

In a diagram of FIGS. 42 to FIG. 48, a motion search range is a current picture as an example, but it may be limited to a CTU or a CTU row to which a current block belongs or may be limited to a neighboring CTU in addition to the current CTU. For example, a prediction block (PB) indicated by a motion vector of a current block (CB) may be restricted to belong to the same CTU or CTU row as a current block.

Figure 50:
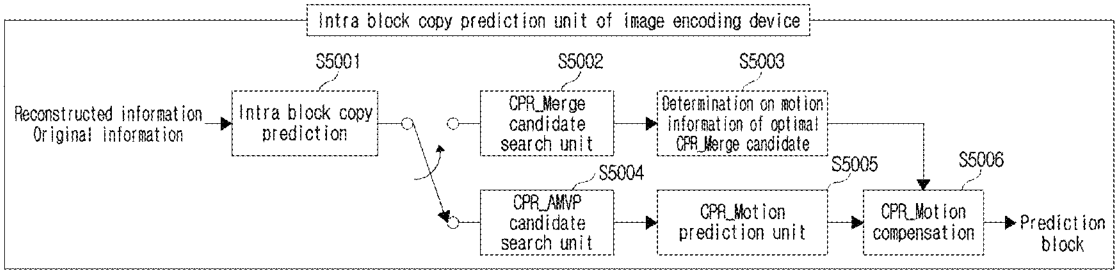
FIG. 50 is a block diagram showing an intra block copy prediction unit of an image encoding device according to an embodiment of the present disclosure.

FIG. 50 is a block diagram showing an intra block copy prediction unit of an image encoding device in detail and intra block copy prediction S5001 may be divided into a CPR_Merge candidate search unit S5002 and a CPR_AMVP candidate search unit S5004. A CPR_Merge candidate search unit S5002 may use reconstructed blocks as a CPR_Merge candidate. The reconstructed block may be a block which is encoded/decoded by inter prediction or may be limited to a block which is encoded/decoded by an intra block copy (IBC) mode among surrounding blocks. The maximum number of CPR_Merge candidates may be equally used in an encoding/decoding device or may be transmitted from a higher header. In this case, the maximum number may be 2, 3, 4, 5, or more. A higher header means higher header information including picture and block information such as a video parameter level, a sequence parameter level, a picture parameter level, a slice level, etc. A method of deriving a CPR_Merge candidate is described by using FIG. 50.

Figure 51:
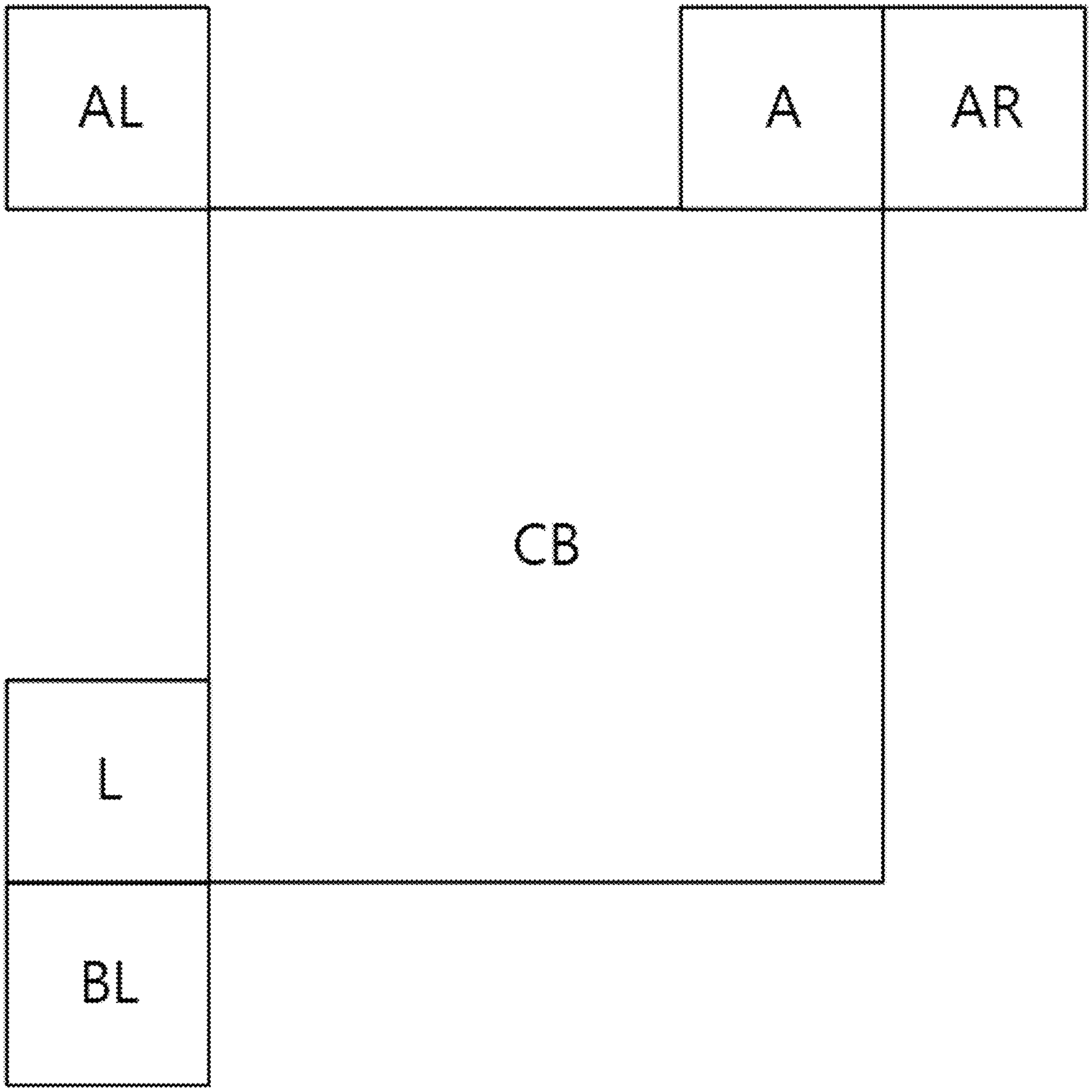
FIG. 51 shows a position of an adjacent spatial candidate around a current block.

FIG. 51 represents a spatial candidate adjacent to a current block. AL, A, AR, L, BL are a position of a reconstructed block which belongs to the same picture as a current block and may be used as a CPR_Merge candidate. For example, when inter prediction or intra block copy prediction is used in a reconstructed block at a position of AL, A, AR, L, BL, it may be used as a CPR_Merge candidate. The order in which reconstructed blocks are considered may be determined by an order of L, A, AR, BL, AL or other various priorities. A reconstructed block which is spatially adjacent may be used as a CPR_Merge candidate only when a size of a current block is greater than a predetermined threshold size. A size of a current block may be expressed as a width, a height, a sum of a width and a height, a multiplication of a width and a height, the minimum value/the maximum value of a width and a height, etc. of a block. For example, when a multiplication of a width and a height of a current block is greater than 16, the reconstructed block may be used as a CPR_Merge candidate and otherwise, the reconstructed block may not be used as a CPR_Merge candidate.

When the maximum number of candidates is not filled in a CPR_Merge candidate list, motion information stored in H buffer may be added to a CPR_Merge candidate list. A H buffer may store motion information of a block which is encoded/decoded before a current block. Alternatively, when the maximum number of candidates is not filled in a CPR_Merge candidate list and an intra block copy prediction technology is used for a reconstructed block at the same position as a current block in a pre-reconstructed picture, motion information of a corresponding reconstructed block may be added as a CPR_Merge candidate.

Alternatively, when the number of CPR_MVP candidates which are added so far is less than the maximum number of candidates, a default vector candidate may be added. A default vector may mean a vector which is determined equally by an encoding/decoding device. For example, when a default vector is (0, 0), (−10, 0), (0, −10), (−15, 0), (0, −15) and 2 CPR_Merge candidates are deficient, 2 default vectors may be added to a CPR_Merge candidate list sequentially from the front. Subsequently, a RD-cost of each motion information in a CPR_Merge candidate list is calculated and motion information with the optimal RD-cost is determined S5003.

A CPR_AMVP candidate search unit S5004 may determine at least one of a CPR_MVP candidate or CPR_MVD information by using motion information of a surrounding block after generating a prediction block within a motion search range. The maximum number of CPR_MVP candidates may be equally used in an encoding/decoding device or may be transmitted from a higher header. In this case, the maximum number may be 2, 3, 4, 5, or more. The number of CPR_MVP information may be equally used in an encoding/decoding device or may be transmitted from a higher header. A method of deriving a CPR_MVP candidate is described by using FIG. 50. AL, A, AR, L, BL are a position of a reconstructed block which belongs to the same picture as a current block and may be used as a CPR_MVP candidate. When inter prediction or intra block copy prediction is used in a reconstructed block at a position of AL, A, AR, L, BL, it may be used as a CPR_MVP candidate. The order in which reconstructed blocks are considered may be determined by an order of L, A, AR, BL, AL or a variety of priorities. A reconstructed block which is spatially adjacent may be used as a CPR_MVP candidate only when a size of a current block is greater than a predetermined threshold size. A size of a current block may be represented as a width, a height, a sum of a width and a height, a multiplication of a width and a height, the minimum value/the maximum value of a width and a height, etc. of a block. For example, when a multiplication of a width and a height of a current block is greater than 16, the reconstructed block may be used as a CPR_MVP candidate and otherwise, the reconstructed block may not be used as a CPR_MVP candidate.

When the maximum number of candidates is not filled in a CPR_MVP candidate list, motion information stored in a H buffer may be added to a CPR_MVP candidate list. A H buffer may store motion information of a block which is encoded/decoded before a current block. Alternatively, when the maximum number of candidates is not filled in a CPR_MVP candidate list and an intra block copy prediction technology is used for a reconstructed block at the same position as a current block in a pre-reconstructed picture, motion information of a corresponding reconstructed block may be added as a CPR_MVP candidate.

When the number of CPR_MVP candidates which are added so far is less than the maximum number of candidates, a default vector may be added to a CPR_MVP candidate list. CPR_MVD information may be a difference value between motion information of a current block and motion information stored in a CPR_MVP candidate. For example, when a motion vector of a current block is (−14, −14) and a motion vector of a CPR_MVP candidate is (−13, −13), CPR_MVD information may be (1, 1), a difference value of ((−14)−(−13), (−14)−(−13)). Alternatively, when a current block and a prediction block may not be overlapped in a motion search range, a motion vector may be expressed as the following Equation 5 and 6 according to a size of a current block.

$$MV.x = Curr.MV.x - Curr.blk.\text{width} \quad \text{[Equation 5]}$$

$$MV.y = Curr.MV.y - Curr.blk.\text{height} \quad \text{[Equation 6]}$$

In Equations 5 and 6, Curr_MV.x and Curr_MV.y are x and y components of a motion vector of a current block. Curr_blk_width and Curr_blk_height may be determined as a variety of values such as a horizontal, vertical size of a current block, ½ of a horizontal size, ½ of a vertical size, etc. MV is a motion vector of a current block which is finally derived. For example, when a motion vector of a current block is (−14, −14) and a size of a current block is (4, 4), a motion vector may be set as (−10, −10). What subtracts only half of a horizontal and vertical length of a current block from a motion vector of a current block may be determined as a motion vector of a current block. Subsequently, a RD-cost of each motion information in a CPR_MVP candidate list is calculated and motion information with the optimal RD-cost is determined S5005.

In an intra block copy prediction unit, a prediction block is generated through motion compensation S5006 after motion information of a current block is determined by using one of a CPR_Merge candidate search unit and an CPR_AMVP candidate search unit.

Figure 52:
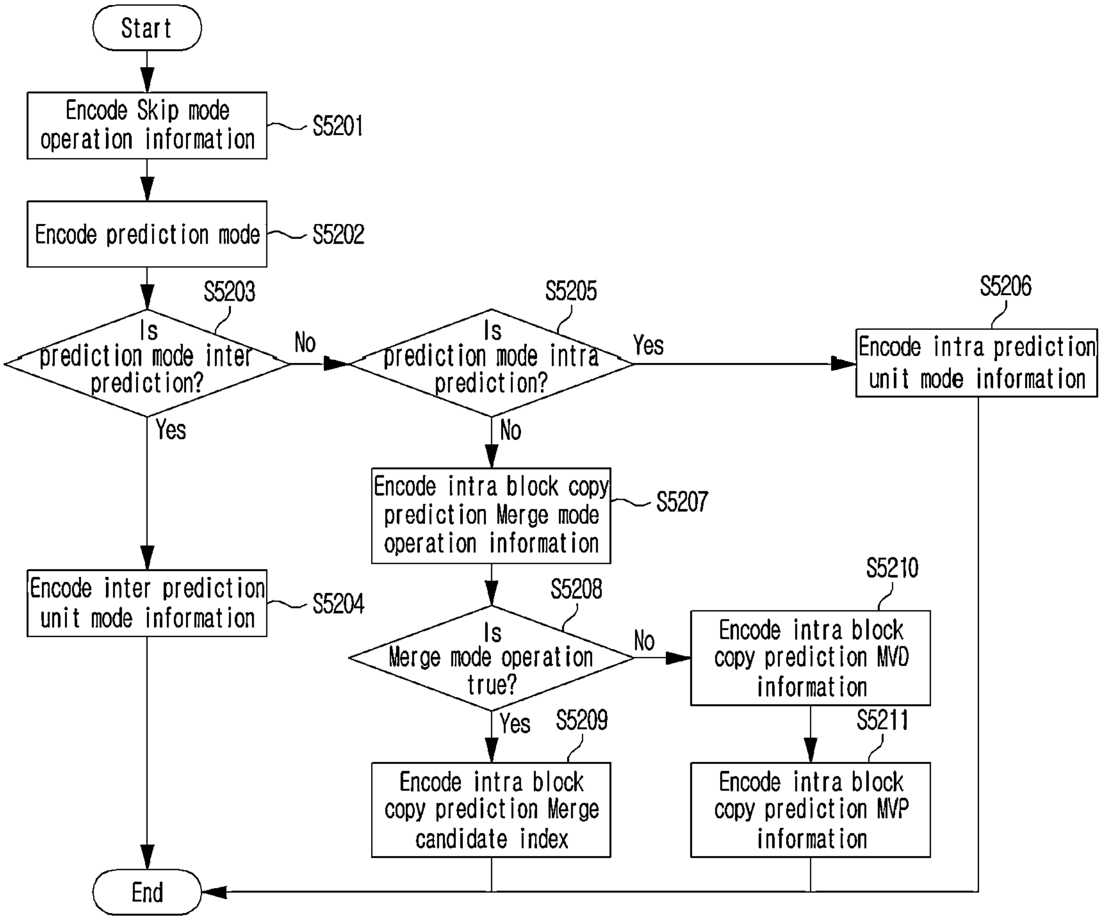
FIG. 52 is a method of encoding prediction mode information according to an embodiment of the present disclosure.

FIG. 52 is a method of encoding prediction mode information.

Skip mode operation information encoding S5201 is information indicating whether a prediction block is used as a reconstructed block in an encoding device.

Prediction mode encoding S5202 may encode whether a prediction mode of a current block is inter prediction, intra prediction, or intra block copy prediction. When it is encoded by inter prediction S5203, inter prediction unit mode information may be encoded S5204. Inter prediction unit mode information encoding S5204 may play the same role as inter prediction unit mode information encoding in FIG. 31. When a prediction mode is encoded by intra prediction S5205, intra prediction unit mode information may be encoded S5206. Intra prediction unit mode information encoding may play the same role as intra prediction unit mode information encoding in FIG. 31. When an intra block copy prediction mode is selected, CPR_Merge mode operation information may be encoded S5207. When a CPR_Merge mode operates S5208, CPR_Merge candidate index encoding S5209 may be performed. When a CPR_Merge mode does not operate, CPR_MVD information encoding S5210 may be performed and a CPR_MVP candidate may be encoded S5211. When it is determined that a current block and a prediction block are overlapped by using a CPR_MVP candidate and CPR_MVD information, a prediction mode for an overlapping region may be additionally encoded. In addition, when intra prediction is performed by an example in FIG. 49, intra prediction mode information encoding S5206 may be performed after CPR_Merge candidate encoding S5209 and CPR_MVP candidate encoding S5211.

In this case, when there is no pre-reconstructed picture which may be used in a current picture due to a higher header setting, inter prediction unit mode information may be omitted in prediction mode encoding S5202.

Prediction mode information encoding may be performed by using FIG. 31.

Intra block copy prediction unit mode information may be expressed as inter prediction unit mode information. It may be expressed by adding current picture information to reference picture index information which is set for inter prediction information. For example, when there is a reference picture index from No. 0 to No. 4, No. 0 to No. 3 may mean a pre-reconstructed picture and No. 4 may mean a current picture. In Merge candidate index encoding S3103, an intra block copy prediction technology may be performed when past direction reference picture index information is a current picture while using past direction information and for other cases, an inter prediction technology may be performed. In addition, in encoding AMVP mode information, when a past direction is encoded for prediction direction information S3108 and past direction reference picture index information is encoded as a current picture S3110, past direction MVD information S3111 and a past direction MVP candidate S3112 may be information for intra block copy prediction and for other cases, it may be information for inter prediction technology. In this case, when there is no pre-reconstructed picture which may be used by a current picture due to a higher header setting, a process of prediction direction encoding S3108, past direction reference picture index information encoding S3110, future direction reference picture index information encoding S3114, future direction MVD information encoding S3115 and future direction MVP information encoding S3116 may be omitted and when inter prediction is encoded in a prediction mode encoding step, it may mean intra block copy prediction, not inter prediction.

Figure 53:
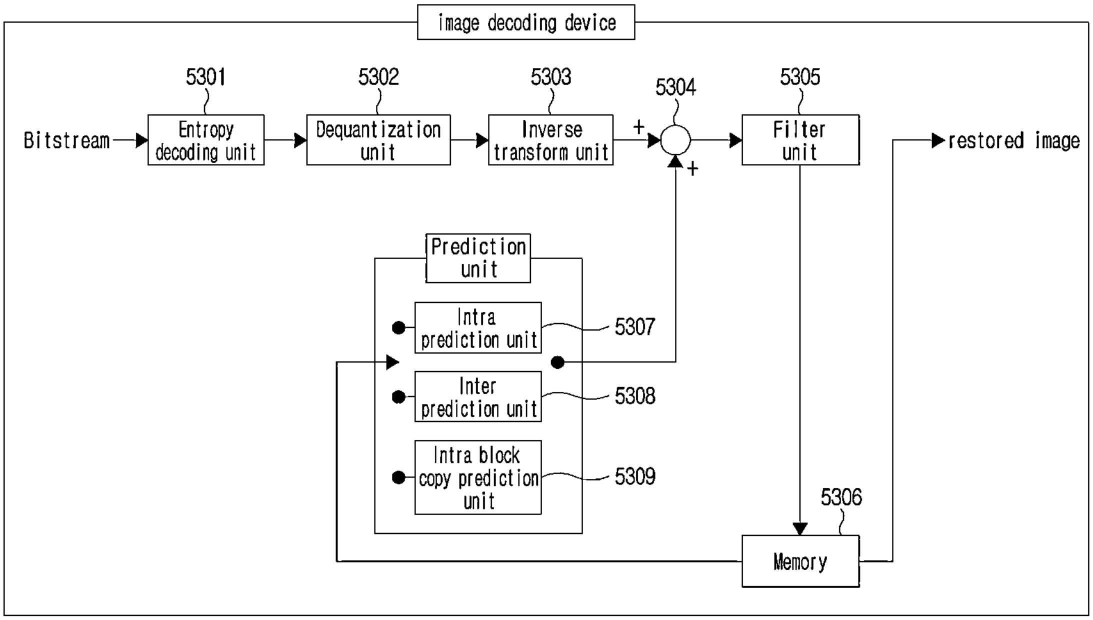
FIG. 53 is a block diagram showing an intra block copy prediction unit of an image decoding device according to an embodiment of the present disclosure.

FIG. 53 is a diagram in which an intra block copy prediction unit is added to an image decoding device 600 of FIG. 6.

Figure 54:
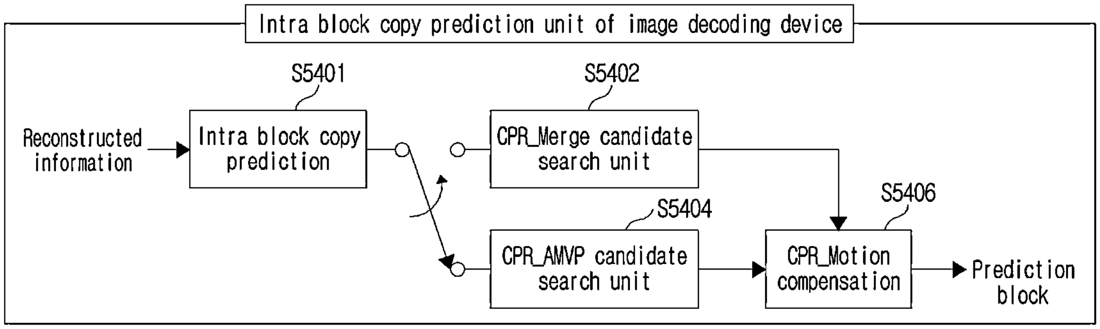
FIG. 54 is a block diagram showing an intra block copy prediction unit of an image decoding device according to an embodiment of the present disclosure.

FIG. 54 shows an intra block copy prediction unit of an image decoding device.

For an intra block copy prediction unit, only a process in which the optimal prediction mode of FIG. 50 is determined is omitted and a process in which a prediction block is generated by receiving a prediction mode determined to be optimal operates substantially in the same way as an intra block copy prediction unit of an image encoding device.

Figure 55:
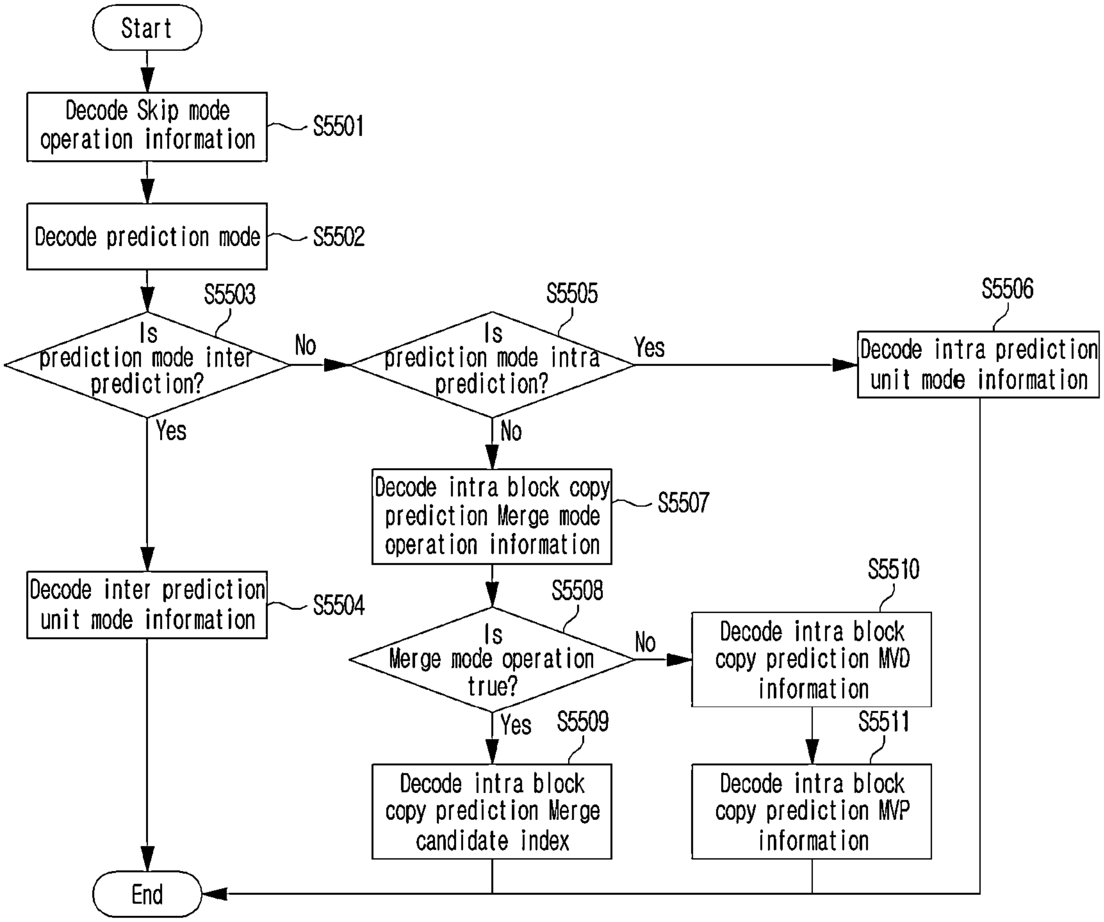
FIG. 55 is a method of decoding prediction mode information according to an embodiment of the present disclosure.

FIG. 55 is a method of decoding prediction mode information.

Skip mode operation information decoding S5501 is information indicating whether a prediction block is used as a reconstructed block in a decoding device.

Prediction mode decoding S5502 may decode whether a prediction mode of a current block is inter prediction, intra prediction, or intra block copy prediction. When it is decoded by inter prediction S5503, inter prediction unit mode information may be decoded S5504. Inter prediction unit mode information decoding S5504 may play the same role as inter prediction unit mode information decoding in FIG. 34. When a prediction mode is decoded as intra prediction S5505, intra prediction unit mode information may be decoded S5506. Intra prediction unit mode information decoding may play the same role as intra prediction unit mode information decoding in FIG. 34. When an intra block copy prediction mode is selected, CPR_Merge mode operation information may be decoded S5507. When a CPR_Merge mode operates S5508, CPR_Merge candidate index decoding S5509 may be performed. When a CPR_Merge mode does not operate, CPR_MVD information decoding S5510 may be performed and a CPR_MVP candidate may be decoded S5511. When it is determined, by using a CPR_MVP candidate and CPR_MVD information, that a current block and a prediction block are overlapped by using, a prediction mode for an overlapping region may be additionally decoded. In addition, when intra prediction is performed by an example in FIG. 49, intra prediction mode information decoding S5506 may be performed after CPR_Merge candidate decoding S5509 and CPR_MVP candidate decoding S5511.

In this case, when there is no pre-reconstructed picture which may be used by a current picture due to a higher header setting, inter prediction unit mode information may be omitted in prediction mode decoding S5502.

Prediction mode information decoding may be performed by using FIG. 34.

Intra block copy prediction unit mode information may be expressed as inter prediction unit mode information. It may be expressed by adding current picture information to reference picture index information which is set in inter prediction information. For example, when there are reference picture indexes from No. 0 to No. 4, No. 0 to No. 3 may mean pre-reconstructed pictures and No. 4 may mean a current picture. In Merge candidate index decoding S3403, an intra block copy prediction technology may be performed when past direction information is used and past direction reference picture index information is a current picture and for other cases, an inter prediction technology may be performed. In addition, in decoding AMVP mode information, past information MVD information S3411 and a past direction MVP candidate S3412 may be information for intra block copy prediction when prediction direction information is decoded S3408 to indicate a past direction and past direction reference picture index information is decoded to indicate a current picture S3410 and for other cases, it may be inter prediction technology information. In this case, when there is no pre-reconstructed picture which may be used by a current picture due to a higher header setting, a process of prediction direction decoding S3408, past direction reference picture index information decoding S3410, future direction reference picture index information decoding S3414, future direction MVD information decoding S3415 and future direction MVP information decoding S3416 may be omitted and when inter prediction is decoded in a prediction mode decoding step, it may mean intra block copy prediction, not inter prediction.

Figure 56:
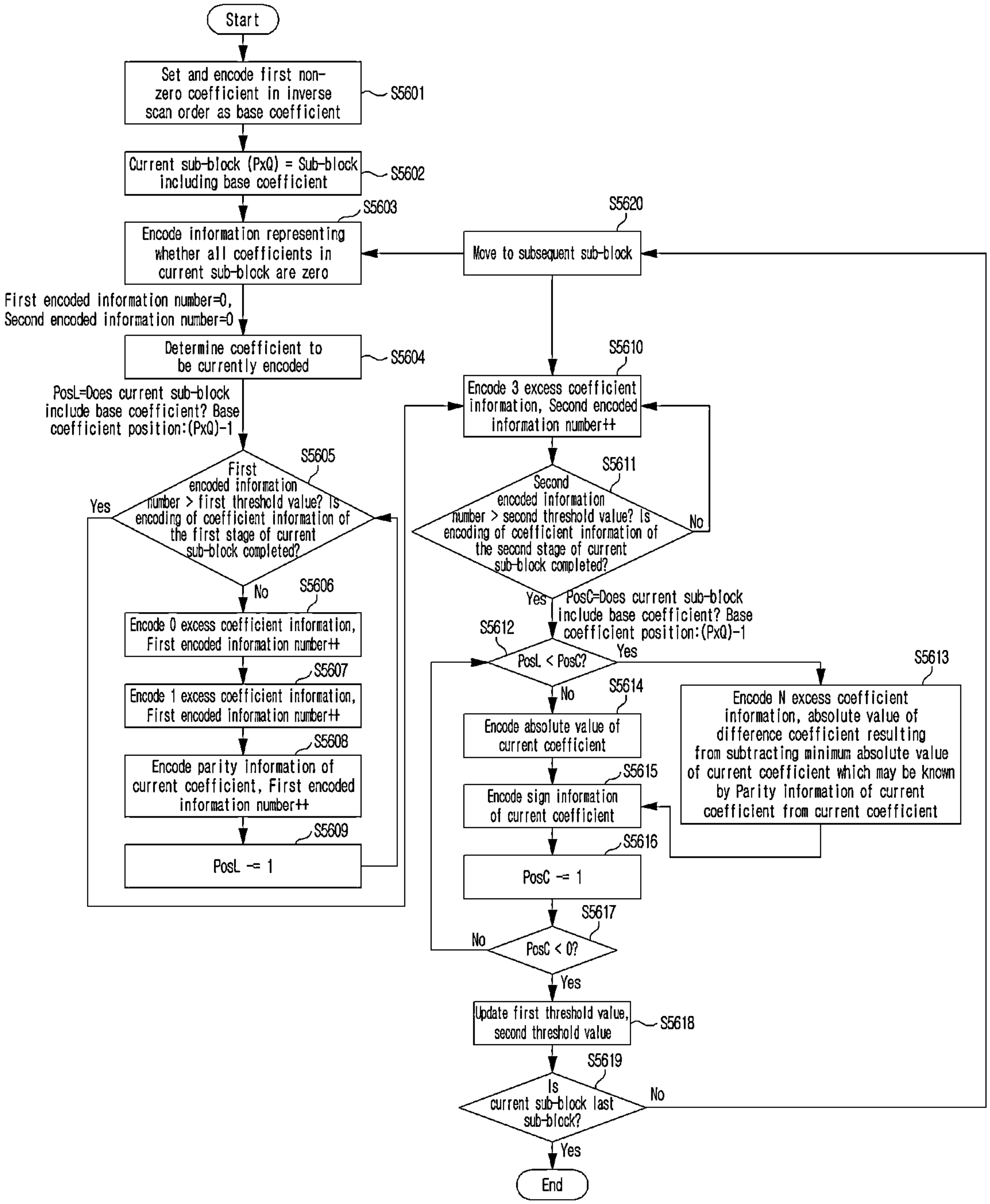
FIG. 56 is a flow chart showing a method of encoding a quantized transform coefficient according to an embodiment of the present disclosure.

FIG. 56 is a flow chart showing an encoding method of a quantized transform coefficient (hereinafter, referred to as 'a transform coefficient'). It may be performed by an entropy encoding unit of an image encoding device.

First, when transform coefficients are scanned according to a reverse scan order, the first non-zero coefficient may be determined as a base coefficient and that position information (Last_sig) is encoded S5601.

A sub-block in which a base coefficient is included is selected S5602 and transform coefficient information in the sub-block may be encoded. When it is not a sub-block in which a base coefficient is included, sub-block information may be encoded before encoding a coefficient in a transform block S5603. Coded_sub_blk_flag, sub-block information, is a flag indicating whether there are at least one or more non-zero transform coefficients in a current sub-block. Before coefficient information in a sub-block is encoded, a first encoded information number and a second encoded information number may be initialized to 0. First encoded information is the number of encoded 0 excess coefficient information S5606, 1 excess coefficient information S5606, Parity information S5607. Second encoded information is the number of encoded 3 excess coefficient information S5610. First step coefficient information encoding means a step of encoding 0 excess coefficient information, 1 excess coefficient information, Parity information S5006, S5607, S5608. Second step coefficient information encoding is a step of encoding 3 excess coefficient information S5610.

Subsequently, a transform coefficient to be currently encoded may be selected in a reverse scan order S5604. PosL means the first position of a transform coefficient in a current sub-block in a reverse scan order which is not encoded by the first step coefficient information encoding process. After selecting a transform coefficient which will be encoded first in a sub-block, 0 excess coefficient information S5606 representing whether an absolute value of a current transform coefficient is greater than 0 may be encoded. Subsequently, when a current transform coefficient is determined to be non-zero, 1 excess coefficient information representing whether an absolute value of a current transform coefficient is greater than 1 may be encoded S5607. Subsequently, when an absolute value of a current transform coefficient is determined to be greater than 1 according to 1 excess coefficient information, Parity information is encoded S5608 to indicate Parity of a current transform coefficient. For example, Parity information may represent whether an absolute value of a current transform coefficient is an even number or an odd number.

In this case, when 0 excess coefficient information, 1 excess coefficient information and Parity information are encoded, the first encoded information number is increased S5606, S5607, S5608. For example, when at least one of 0 excess coefficient information, 1 excess coefficient information or Parity information is encoded, the first encoded information number may be increased by 1. Alternatively, whenever at least one of 0 excess coefficient information, 1 excess coefficient information or Parity information is encoded respectively, the first encoded information number may increase by 1.

In other words, the first encoded information number may mean the maximum number of coefficient information allowed for one block. In this case, a block may mean a transform block or a sub-block of a transform block. In addition, the coefficient information may include at least one of 0 excess coefficient information, 1 excess coefficient information or Parity information. The first encoded information number may be defined in a unit of a video sequence, a picture, a slice, a coding tree block (CTU), a coding block (CU), a transform block (TU) or a sub-block of a transform block. In other words, the same first encoded information number may be determined/set for all transform blocks or sub-blocks belonging to a corresponding unit.

Subsequently, a transform coefficient which will be encoded is changed into a subsequent coefficient by decreasing a PosL value by 1. In this case, when the first encoded information number exceeds a first threshold value or first step coefficient information encoding in a current sub-block is completed, it may move to a 3 excess coefficient information encoding step. Otherwise, subsequent coefficient information may be encoded. A first threshold value is the maximum number of at least one of 0 excess coefficient information, 1 excess coefficient information, or Parity information which may be encoded in a unit of a sub-block S5606, S5607, S5608.

3 excess coefficient information may be encoded only for a transform coefficient of which Parity information is encoded in a reverse scan order S5610. When 3 excess coefficient information is encoded, the second encoded information number may be increased. When the second encoded information number exceeds a second threshold value or second step coefficient information encoding in a current sub-block is completed, it may move to a subsequent step S5611. A second threshold value is the maximum number of 3 excess coefficient information which may be encoded in a unit of a sub-block.

Alternatively, first encoded information may mean the maximum number of coefficient information which may be encoded in a predetermined unit. Coefficient information may include at least one of 0 excess coefficient information, 1 excess coefficient information, Parity information or 3 excess coefficient information. In this case, a step of encoding 3 excess coefficient information may be included in a first step coefficient information encoding step.

Concretely, 0 excess coefficient information representing whether an absolute value of a current transform coefficient is greater than 0 may be encoded. When a current transform coefficient is determined to be non-zero, 1 excess coefficient information representing whether an absolute value of a current transform coefficient is greater than 1 may be encoded. Subsequently, when an absolute value of a current transform coefficient is determined to be greater than 1 according to 1 excess coefficient information, Parity information may be encoded and 3 excess coefficient information may be encoded.

In this case, when 0 excess coefficient information, 1 excess coefficient information, Parity information, 3 excess coefficient information are encoded, the first encoded information number is increased. For example, when at least one of 0 excess coefficient information, 1 excess coefficient information, Parity information or 3 excess coefficient information is encoded, the first encoded information number may be increased by 1. Alternatively, whenever at least one of 0 excess coefficient information, 1 excess coefficient information, Parity information or 3 excess coefficient information is encoded respectively, the first encoded information number may be increased by 1.

In other words, the first encoded information number may mean the maximum number of coefficient information allowed for one block. In this case, a block may mean a transform block or a sub-block of a transform block. In addition, the coefficient information may include at least one of 0 excess coefficient information, 1 excess coefficient information, Parity information or 3 excess coefficient information. The first encoded information number may be defined in a unit of a video sequence, a picture, a slice, a coding tree block (CTU), a coding block (CU), a transform block (TU) or a sub-block of a transform block. In other words, the same first encoded information number may be determined/set for all transform blocks or sub-blocks belonging to a corresponding unit.

PosC means a position of a transform coefficient to be currently encoded. When PosL is less than PosC S5612, it may be shown that first step coefficient information is encoded. After encoding N excess coefficient information, an absolute value of a difference coefficient resulting from subtracting the minimum absolute value of a current transform coefficient which may be known by Parity information of a current transform coefficient from a current coefficient value may be encoded S5613. In this case, N represents a number equal to or greater than 3 and the same value may be used in an encoding/decoding device or may be transmitted from a higher header. When a value of N is 5, 4 excess coefficient information may be encoded for a coefficient that an absolute value of a current coefficient is determined to be 4 or more. When an absolute value of a current coefficient is determined to be 5 or more by 4 excess coefficient information, 5 excess coefficient information may be encoded. When a value of a current transform coefficient is completely encoded by encoding up to N excess coefficient information, a step of encoding an absolute value of a difference coefficient may be omitted S5613. When PosL is greater than PosC, an absolute value of a current transform coefficient itself may be encoded S5614. Subsequently, sign information representing sign information of a current transform coefficient may be encoded S5615. When all information for a current transform coefficient is encoded, a subsequent transform coefficient in a sub-block may be selected as a current transform coefficient by decreasing a PosC value by 1 S5617 and when a current transform coefficient is a last transform coefficient in a sub-block, a first threshold value and a second threshold value may be updated S5618.

For a first threshold value and a second threshold value, corresponding threshold values may be adjusted when the number of transform coefficients in a current sub-block that an absolute value of a current coefficient itself is encoded is equal to or greater than C (C is an integer equal to or greater than 0). For example, when a first threshold value is 13, the first encoded information number is 15, a second threshold value is 2 and the second encoded information number is 2, it means that first and second encoded information number reach a first and second threshold value, so it may be updated to increase a first and second threshold value. In addition, for example, when a first threshold value is 13, the first encoded information number is 15, a second threshold value is 2 and the second encoded information number is 1, it means that first encoded information number exceeds a first threshold value, but second encoded information number does not reach a second threshold value, so it may be updated to increase a first threshold value and decrease a second threshold value. Alternatively, when both first and second encoded information number do not reach a first and second threshold value, it may be updated to decrease a first and second threshold value. Alternatively, it may be updated to maintain a first and second threshold value.

When a current sub-block is not a last sub-block S5619, it may move to a subsequent sub-block S5620 and when a current sub-block is a last sub-block S5619, transform block encoding may be finished.

Figure 57:
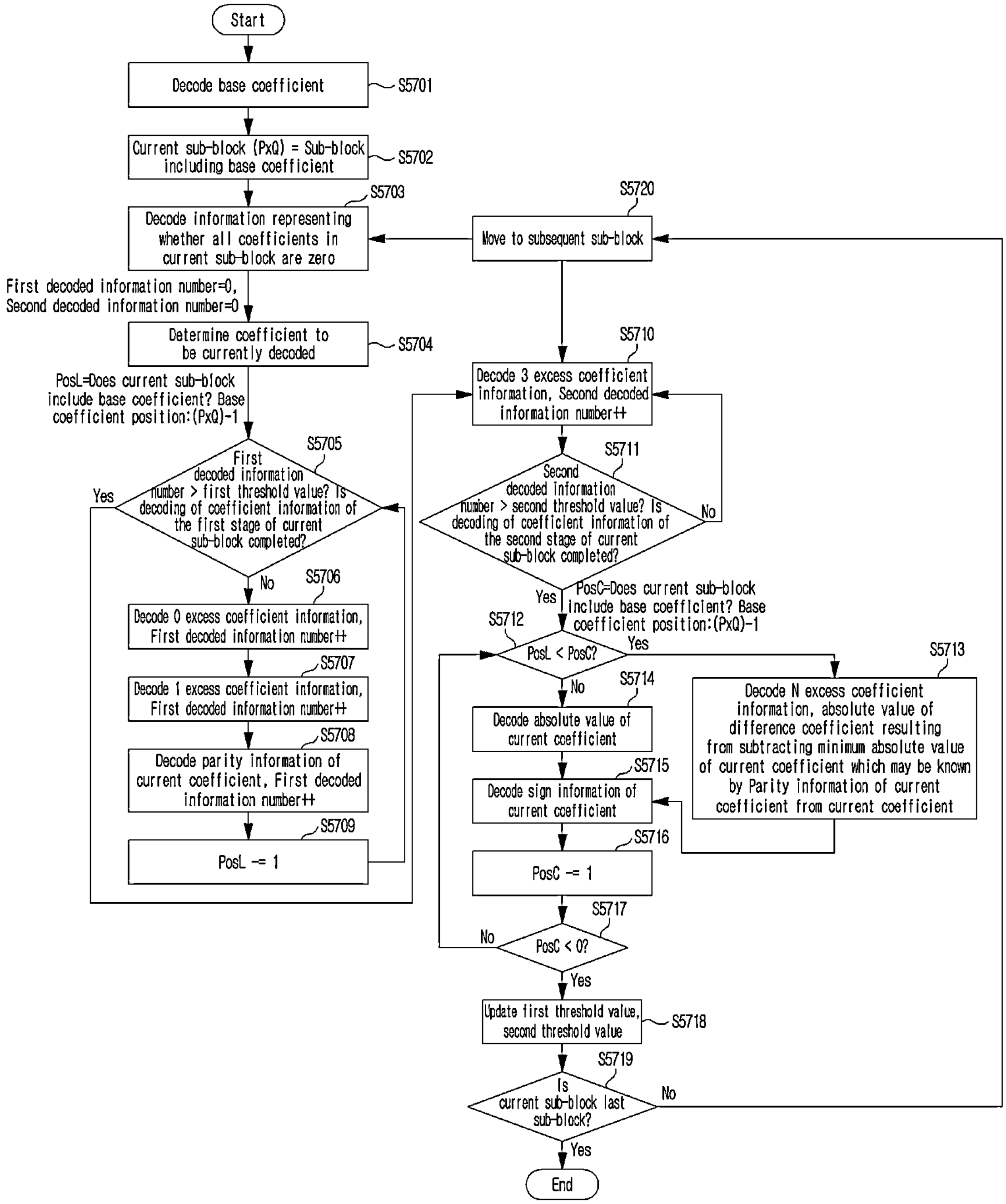
FIG. 57 is a flow chart showing a method of decoding a quantized transform coefficient according to an embodiment of the present disclosure.

FIG. 57 is a flow chart showing a decoding method of a quantized transform coefficient. It may be performed by an entropy decoding unit of an image decoding device.

First, by decoding Last_sig to, the first non-zero coefficient when scanning transform coefficients according to a reverse scan order may be determined as a base coefficient S5701.

A sub-block including a base coefficient may be selected S5702 and transform coefficient information in the sub-block may be decoded. When it is not a sub-block including a base coefficient, sub-block information may be decoded before decoding a coefficient in a transform block S5703. Coded_sub_blk_flag, sub-block information, is a flag indicating that there are at least one or more non-zero coefficients in a current sub-block. Before coefficient information in a sub-block is decoded, the first decoded information number and the second decoded information number may be initialized to 0. First decoded information number is the number of decoded 0 excess coefficient information S5706, 1 excess coefficient information S5706, and Parity information S5707. Second decoded information number is the number of decoded 3 excess coefficient information S5710.

Subsequently, a transform coefficient to be currently decoded may be selected in a reverse scan order S5704. PosL means the first position of a transform coefficient in a current sub-block in a reverse scan order which is not decoded by a first step coefficient information decoding process. After selecting a transform coefficient which will be decoded first in a sub-block, 0 excess coefficient information S5706 representing whether an absolute value of a current transform coefficient is greater than 0 may be decoded. When a current transform coefficient is determined to be non-zero, 1 excess coefficient information representing whether an absolute value of a current transform coefficient is greater than 1 may be decoded S5707. Subsequently, when an absolute value of a current transform coefficient is determined to be greater than 1 according to 1 excess coefficient information, Parity of a current transform coefficient may be known by decoding Parity information S5708. In this case, when 0 excess coefficient information, 1 excess coefficient information and Parity information are decoded, the first decoded information number is decreased S5706, S5707, S5708. For example, when at least one of 0 excess coefficient information, 1 excess coefficient information or Parity information is decoded, the first decoded information number may be decreased by 1. Alternatively, whenever at least one of 0 excess coefficient information, 1 excess coefficient information or Parity information is decoded respectively, the first decoded information number may be decreased by 1. In other words, the first decoded information number may mean the maximum number of coefficient information transmitted for one block. In this case, a block may mean a transform block or a sub-block of a transform block. In addition, the coefficient information may include at least one of 0 excess coefficient information, 1 excess coefficient information or Parity information. The first decoded information number may be defined in a unit of a video sequence, a picture, a slice, a coding tree block (CTU), a coding block (CU), a transform block (TU) or a sub-block of a transform block. In other words, the same first decoded information number may be set for all transform blocks or sub-blocks belonging to a corresponding unit.

Subsequently, a coefficient which will be decoded is changed into a subsequent transform coefficient by decreasing a PosL value by 1. In this case, when the first decoded information number exceeds a first threshold value or first step coefficient information decoding in a current sub-block is completed, it may move to a 3 excess coefficient information decoding step. Otherwise, subsequent transform coefficient information may be decoded. A first threshold value is the maximum number of 0 excess coefficient information, 1 excess coefficient information, and Parity information which may be decoded in a unit of a sub-block S5706, S5707, S5708. First step coefficient information decoding means a step of decoding 0 excess coefficient information, 1 excess coefficient information, Parity information S5706, S5707, S5708.

3 excess coefficient information may be decoded only for a transform coefficient of which Parity information is decoded in a reverse scan order S5710. When 3 excess coefficient information is decoded, the second decoded information number may be increased. When the second decoded information number exceeds a second threshold value or second step coefficient information decoding in a current sub-block is completed, it may move to a subsequent step S5711. A second threshold value is the maximum number of 3 excess coefficient information which may be decoded in a unit of a sub-block. Second step coefficient information decoding is a step of decoding 3 excess coefficient information S5710.

Alternatively, first decoded information number may mean the maximum number of coefficient information which may be transmitted in a predetermined unit. In this case, coefficient information may include at least one of 0 excess coefficient information, 1 excess coefficient information, Parity information or 3 excess coefficient information. In this case, a step of decoding 3 excess coefficient information may be included in a first step coefficient information decoding step.

Concretely, 0 excess coefficient information representing whether an absolute value of a current transform coefficient is greater than 0 may be decoded. When a current transform coefficient is determined to be non-zero, 1 excess coefficient information representing whether an absolute value of a current transform coefficient is greater than 1 may be decoded. Subsequently, when an absolute value of a current transform coefficient is determined to be greater than 1 according to 1 excess coefficient information, Parity information and 3 excess coefficient information may be decoded.

In this case, when 0 excess coefficient information, 1 excess coefficient information, Parity information, 3 excess coefficient information are decoded, the first decoded information number is decreased. For example, when at least one of 0 excess coefficient information, 1 excess coefficient information, Parity information or 3 excess coefficient information is decoded, the first decoded information number may be decreased by 1. Alternatively, whenever at least one of 0 excess coefficient information, 1 excess coefficient information, Parity information or 3 excess coefficient information is decoded respectively, the first decoded information number may be decreased by 1.

In other words, the first decoded information number may mean the maximum number of coefficient information allowed for one block. In this case, a block may mean a transform block or a sub-block of a transform block. In addition, the coefficient information may include at least one of 0 excess coefficient information, 1 excess coefficient information, Parity information or 3 excess coefficient information. The first decoded information number may be defined in a unit of a video sequence, a picture, a slice, a coding tree block (CTU), a coding block (CU), a transform block (TU) or a sub-block of a transform block. In other words, the same first decoded information number may be set for all transform blocks or sub-blocks belonging to a corresponding unit.

PosC means a position of a transform coefficient to be currently decoded. When PosL is less than PosC S5712, it may be shown that information on a current transform coefficient is decoded in first step coefficient information decoding. After decoding N excess coefficient information, an absolute value of a difference coefficient resulting from subtracting the minimum absolute value of a current transform coefficient which may be known by Parity information of a current transform coefficient from a current coefficient value may be decoded S5713. When a value of a current coefficient is completely decoded by decoding up to N excess coefficient information, a step of decoding an absolute value of a difference coefficient may be omitted S5713. When PosL is greater than PosC, decoding of an absolute value which decodes current transform coefficient information at a time may be performed S5714. Subsequently, sign information representing sign information of a current transform coefficient may be decoded S5715. When all information for a current transform coefficient is decoded, a subsequent coefficient in a sub-block may be selected as a current coefficient by decreasing a PosC value by 1 S5717 and when a current transform coefficient is a last coefficient in a sub-block, a first threshold value and a second threshold value may be updated S5718.

For a first and second threshold value, corresponding threshold values may be adjusted when the number of transform coefficients in a current sub-block that an absolute value of a current coefficient itself is decoded is equal to or greater than C (C is an integer equal to or greater than 0). For example, when a first threshold value is 13, the first decoded information number is 15, a second threshold value is 2 and the second decoded information number is 2, it means that first and second decoded information number reach a first and second threshold value, so it may be updated to increase a first and second threshold value. In addition, for example, when a first threshold value is 13, the first decoded information number is 15, a second threshold value is 2 and the second decoded information number is 1, it means that first decoded information number exceeds a first threshold value, but second decoded information number does not reach a second threshold value, so it may be updated to increase a first threshold value and decrease a second threshold value. Alternatively, when both first and second decoded information number do not reach a first and second threshold value, it may be updated to decrease a first and second threshold value. Alternatively, it may be updated to maintain a first and second threshold value.

When a current sub-block is not a last sub-block S5719, it may move to a subsequent sub-block S5720 and when a current sub-block is a last sub-block S5719, transform block decoding may be finished.

A variety of embodiments of the present disclosure do not enumerate all possible combinations, but are to describe the representative aspect of the present disclosure and matters described in various embodiments may be independently applied or may be applied by two or more combinations.

In addition, a variety of embodiments of the present disclosure may be implemented by a hardware, a firmware, a software, or their combination, etc. For implementation by a hardware, implementation may be performed by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processors, controllers, microcontrollers, microprocessors, etc.

A range of the present disclosure includes software or machine-executable instructions (e.g., an operating system, an application, a firmware, a program, etc.) which execute an action according to a method of various embodiments in a device or a computer and a non-transitory computer-readable medium that such software or instructions, etc. are stored and are executable in a device or a computer.

INDUSTRIAL APPLICABILITY

The present disclosure may be used for encoding/decoding an image.

What is claimed is:

1. An image decoding method, comprising:
- generating a candidate list of a current block; and
- performing inter prediction of the current block based on a plurality of candidates belonging to the candidate list,
- wherein the plurality of candidates includes a temporal candidate in a unit of a sub-block,
- wherein the temporal candidate in the unit of the sub-block is a candidate for deriving motion information for each sub-block of the current block, and has motion information of a target block which is temporally adjacent to the current block,
- wherein the sub-block is an N×M block having a fixed size pre-set in an image decoding device,
- wherein a sub-block of the target block is determined as a block shifted by a predetermined temporal motion vector from a position of the sub-block of the current block,
- wherein the temporal motion vector is set using only a neighboring block at a specific position among spatial neighboring blocks of the current block, and
- wherein the neighboring block at the specific position is a block to a left of the current block.

2. The method of claim 1, wherein the temporal motion vector is set only when a reference picture of the neighboring block at the specific position and a target picture to which the target block belongs are the same.

3. An image encoding method, comprising:
- generating a candidate list of a current block; and
- performing inter prediction of the current block based on a plurality of candidates belonging to the candidate list,
- wherein the plurality of candidates includes a temporal candidate in a unit of a sub-block,
- wherein the temporal candidate in the unit of the sub-block is a candidate for deriving motion information for each sub-block of the current block, and has motion information of a target block which is temporally adjacent to the current block,
- wherein the sub-block is an N×M block having a fixed size pre-set in an image encoding device,
- wherein a sub-block of the target block is determined as a block shifted by a predetermined temporal motion vector from a position of the sub-block of the current block,
- wherein the temporal motion vector is set using only a neighboring block at a specific position among spatial neighboring blocks of the current block, and
- wherein the neighboring block at the specific position is a block to a left of the current block.

4. The method of claim 3, wherein the temporal motion vector is set only when a reference picture of the neighboring block at the specific position and a target picture to which the target block belongs are the same.

5. A method of transmitting a bitstream, the method comprising:
- generating a candidate list of a current block;
- performing inter prediction of the current block based on a plurality of candidates belonging to the candidate list; and
- transmitting the bitstream generated based on the inter prediction,
- wherein the plurality of candidates includes a temporal candidate in a unit of a sub-block,
- wherein the temporal candidate in the unit of the sub-block is a candidate for deriving motion information for each sub-block of the current block, and has motion information of a target block which is temporally adjacent to the current block,
- wherein the sub-block is an N×M block having a fixed size pre-set in an image encoding device,
- wherein a sub-block of the target block is determined as a block shifted by a predetermined temporal motion vector from a position of the sub-block of the current block,
- wherein the temporal motion vector is set using only a neighboring block at a specific position among spatial neighboring blocks of the current block, and
- wherein the neighboring block at the specific position is a block to a left of the current block.

* * * * *